(12) United States Patent
Gage

(10) Patent No.: US 10,367,716 B2
(45) Date of Patent: Jul. 30, 2019

(54) INFORMATION DISTRIBUTION IN A WIRELESS COMMUNICATION SYSTEM

(71) Applicant: BlackBerry Limited, Waterloo (CA)

(72) Inventor: William Anthony Gage, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/198,639

(22) Filed: Jun. 30, 2016

(65) Prior Publication Data

US 2016/0330101 A1    Nov. 10, 2016

Related U.S. Application Data

(63) Continuation of application No. 12/820,638, filed on Jun. 22, 2010, now Pat. No. 9,385,938.

(51) Int. Cl.
*H04L 12/751* (2013.01)
*H04L 29/08* (2006.01)
*H04W 40/24* (2009.01)

(52) U.S. Cl.
CPC .............. *H04L 45/02* (2013.01); *H04L 67/16* (2013.01); *H04W 40/24* (2013.01)

(58) Field of Classification Search
CPC ......... H04L 41/12; H04L 45/02; H04L 67/16; H04W 40/24
See application file for complete search history.

(56) References Cited

U.S. PATENT DOCUMENTS

| 5,727,160 A | * | 3/1998 | Ganesan | ............... H04W 84/14 370/364 |
| 5,734,982 A | * | 3/1998 | Endo | ..................... H04W 84/14 455/11.1 |
| 7,024,487 B2 | | 4/2006 | Mochizuki et al. | |
| 7,124,183 B2 | | 10/2006 | Pekary et al. | |
| 7,565,407 B1 | | 7/2009 | Hayball | |
| 7,640,580 B1 | | 12/2009 | Plotnikov et al. | |

(Continued)

FOREIGN PATENT DOCUMENTS

| CN | 1957568 A | 5/2007 |
| WO | 2009112079 A1 | 9/2009 |

OTHER PUBLICATIONS

Gundavelli, S., et al.; "Proxy Mobile IPv6;" RFC 5213; Aug. 2008; 93 pages.

(Continued)

*Primary Examiner* — Chirag G Shah
*Assistant Examiner* — Joshua Smith
(74) *Attorney, Agent, or Firm* — Conley Rose, P.C.; J. Robert Brown. Jr.; Albert A. Abbou

(57) ABSTRACT

Methods, devices, and systems for information distribution in a wireless communication system is provided. In one embodiment, a method of information distribution in a wireless communication system comprises receiving an information advertisement signal by a propagator node, wherein said information advertisement signal identifies information available from a distributor node; storing said information advertisement signal by said propagator node in a distributor routing table; and forwarding said information advertisement signal by said propagator node to another propagator node, a selector node, or both.

19 Claims, 27 Drawing Sheets

(56) References Cited

U.S. PATENT DOCUMENTS

| | | |
|---|---|---|
| 7,953,830 B2 | 5/2011 | Foster et al. |
| 8,019,888 B2 | 9/2011 | Miller-Cushon |
| 8,050,623 B2 | 11/2011 | Singer et al. |
| 8,570,962 B2 | 10/2013 | Gage |
| 9,155,001 B2 | 10/2015 | Gage |
| 9,385,938 B2 | 7/2016 | Gage |
| 2001/0028651 A1 | 10/2001 | Murase |
| 2002/0080789 A1 | 6/2002 | Henderson et al. |
| 2002/0103934 A1 | 8/2002 | Fishman et al. |
| 2003/0145052 A1* | 7/2003 | Watanabe ............ H04L 12/1813 709/204 |
| 2003/0172163 A1 | 9/2003 | Fujita et al. |
| 2003/0217174 A1 | 11/2003 | Dorenbosch et al. |
| 2004/0148287 A1 | 7/2004 | Manion et al. |
| 2004/0198364 A1* | 10/2004 | Shih .................... H04W 16/02 455/452.1 |
| 2004/0248610 A1 | 12/2004 | Chan |
| 2005/0027798 A1 | 2/2005 | Chiou et al. |
| 2005/0033926 A1 | 2/2005 | Dumont |
| 2005/0037751 A1 | 2/2005 | Kim et al. |
| 2005/0119001 A1* | 6/2005 | Watanabe ......... H04W 36/0011 455/436 |
| 2005/0259655 A1 | 11/2005 | Cuervo et al. |
| 2005/0262263 A1 | 11/2005 | Hathaway et al. |
| 2006/0030311 A1* | 2/2006 | Cruz .................. H04W 84/005 455/431 |
| 2006/0083236 A1 | 4/2006 | Rachwalski et al. |
| 2006/0209716 A1 | 9/2006 | Previdi et al. |
| 2006/0274699 A1 | 12/2006 | Faccin |
| 2006/0291404 A1 | 12/2006 | Thubert et al. |
| 2007/0104160 A1* | 5/2007 | Ho ........................ H04W 48/14 370/338 |
| 2007/0147332 A1 | 6/2007 | Lappetelainen et al. |
| 2007/0211714 A1 | 9/2007 | Metke et al. |
| 2007/0297426 A1 | 12/2007 | Haveson et al. |
| 2008/0025378 A1* | 1/2008 | Mahany ................ H04W 28/22 375/150 |
| 2008/0046596 A1 | 2/2008 | Afergan et al. |
| 2008/0112374 A1 | 5/2008 | Ramankutty et al. |
| 2008/0195664 A1 | 8/2008 | Maharajh et al. |
| 2008/0207200 A1 | 8/2008 | Fein et al. |
| 2008/0212569 A1 | 9/2008 | Terrill et al. |
| 2008/0279200 A1 | 11/2008 | Shatzkamer et al. |
| 2008/0313350 A1 | 12/2008 | Swinton et al. |
| 2009/0081944 A1 | 3/2009 | Yavuz et al. |
| 2009/0086724 A1 | 4/2009 | Boucadair |
| 2009/0092124 A1 | 4/2009 | Singhal et al. |
| 2009/0100476 A1* | 4/2009 | Frisco ................ H04B 7/18508 370/338 |
| 2009/0117927 A1 | 5/2009 | Li et al. |
| 2009/0168795 A1 | 7/2009 | Segel |
| 2009/0175194 A1 | 7/2009 | Akhter et al. |
| 2009/0187659 A1 | 7/2009 | Savoure |
| 2009/0287835 A1 | 11/2009 | Jacobson |
| 2009/0290540 A1 | 11/2009 | Cherian et al. |
| 2010/0063989 A1 | 3/2010 | Mehta et al. |
| 2010/0087179 A1 | 4/2010 | Makavy et al. |
| 2010/0110928 A1* | 5/2010 | Elias ...................... H04L 45/02 370/254 |
| 2010/0214979 A1 | 8/2010 | Kuehnel et al. |
| 2010/0250674 A1 | 9/2010 | Terao et al. |
| 2010/0268789 A1 | 10/2010 | Yoo et al. |
| 2010/0303071 A1 | 12/2010 | Kotalwar et al. |
| 2011/0066715 A1 | 3/2011 | Schieder et al. |
| 2011/0082946 A1 | 4/2011 | Gopalakrishnan |
| 2011/0185041 A1 | 7/2011 | Hunt |
| 2011/0310813 A1 | 12/2011 | Gage |
| 2012/0113809 A1 | 5/2012 | Cortes Gomez |
| 2012/0134361 A1* | 5/2012 | Wong ...................... H04L 45/08 370/392 |
| 2013/0263194 A1 | 10/2013 | Zhang et al. |

OTHER PUBLICATIONS

Perkins, C.; "IP Mobility Support for IPv4;" RFC 3344; Aug. 2002; 93 pages.

Johnson, D., et al.; "Mobility Support in IPv6;" RFC 3775; Jun. 2004; 166 pages.

Meyer, D., et al; "Report From the IAB Workshop on Routing and Addressing;" RFC 4984; Sep. 2007; 40 pages.

Jacobson, Van, et al.; "Networking Named Content;" CoNEXT 2009; Dec. 2009; 13 pages; Rome, Italy.

Koponen, Teemu, et al.; "A Data-Oriented (and Beyond) Network Architecture;" SIGCOMM '07; Aug. 27-31, 2007; 12 pages; Kyoto, Japan.

Campbell, Andrew T., et al.; "Design, Implementation, and Evaluation of Cellular IP;" IEEE Personal Communications; Aug. 2000; 8 pages.

Carzaniga, Antonio, et al.; "Design and Evaluation of a Wide-Area Event Notification Service;" ACM Transactions on Computer Systems; vol. 19; No. 3; Aug. 2001; 52 pages.

Lo, Eric M. K., et al.; "Cooperative Content Distribution in Multi-Rate Wireless Networks;" IEEE Globecom; 2009; 6 pages.

Helgason, Olafur Ragnar, et al.; "On the Effect of Cooperation in Wireless Content Distribution;" IEEE; 2008; 8 pages.

Ma, Yaozhou, et al.; "An Epidemic P2P Content Search Mechanism for Intermittently Connected Mobile Ad hoc Networks;" IEEE; 2009; 6 pages.

Office Action dated Jul. 27, 2012; U.S. Appl. No. 12/820,638, filed Jun. 22, 2010; 45 pages.

Final Office Action dated Jan. 25, 2013; U.S. Appl. No. 12/820,638, filed Jun. 22, 2010; 44 pages.

Office Action dated Apr. 23, 2014; U.S. Appl. No. 12/820,638, filed Jun. 22, 2010; 42 pages.

Final Office Action dated Sep. 23, 2014; U.S. Appl. No. 12/820,638, filed Jun. 22, 2010; 36 pages.

Advisory Action dated Dec. 8, 2014; U.S. Appl. No. 12/820,638, filed Jun. 22, 2010; 5 pages.

Advisory Action dated Jan. 26, 2015; U.S. Appl. No. 12/820,638, filed Jun. 22, 2010; 7 pages.

Office Action dated Jun. 18, 2015; U.S. Appl. No. 12/820,638, filed Jun. 22, 2010; 39 pages.

Final Office Action dated Dec. 4, 2015; U.S. Appl. No. 12/820,638, filed Jun. 22, 2010; 44 pages.

Notice of Allowance dated Mar. 7, 2016; U.S. Appl. No. 12/820,638, filed Jun. 22, 2010; 10 pages.

Office Action dated Sep. 5, 2012; U.S. Appl. No. 12/820,799, filed Jun. 22, 2010; 29 pages.

Office Action dated Jan. 4, 2013; U.S. Appl. No. 12/820,799, filed Jun. 22, 2010; 23 pages.

Final Office Action dated Mar. 14, 2013; U.S. Appl. No. 12/820,799, filed Jun. 22, 2010; 19 pages.

Office Action dated May 3, 2013; U.S. Appl. No. 12/820,799, filed Jun. 22, 2010; 23 pages.

Final Office Action dated Oct. 10, 2013; U.S. Appl. No. 12/820,799, filed Jun. 22, 2010; 34 pages.

Office Action dated Aug. 14, 2012; U.S. Appl. No. 12/820,710, filed Jun. 22, 2010; 30 pages.

Final Office Action dated Jan. 28, 2013; U.S. Appl. No. 12/820,710, filed Jun. 22, 2010; 27 pages.

Advisory Action dated Mar. 20, 2013; U.S. Appl. No. 12/820,710, filed Jun. 22, 2010; 6 pages.

Notice of Allowance dated Jun. 25, 2013; U.S. Appl. No. 12/820,710, filed Jun. 22, 2010; 17 pages.

Office Action dated Oct. 21, 2014; U.S. Appl. No. 14/015,288, filed Aug. 30, 2013; 29 pages.

Final Office Action dated Mar. 4, 2015; U.S. Appl. No. 14/015,288, filed Aug. 30, 2013; 27 pages.

Notice of Allowance dated May 26, 2015; U.S. Appl. No. 14/015,288, filed Aug. 30, 2013; 12 pages.

(56) References Cited

OTHER PUBLICATIONS

PCT International Search Report; Application No. PCT/CA2011/050376; dated Sep. 21, 2011; 4 pages.
PCT Written Opinion of the International Searching Authority; Application No. PCT/CA2011/050376; dated Sep. 21, 2011; 7 pages.
Canadian Office Action; Application No. 2,803,179; dated Dec. 1, 2014; 6 pages.
Canadian Office Action; Application No. 2,803,179; dated Jan. 20, 2016; 5 pages.
Chinese Office Action; Application No. 201180040788.3; dated Feb. 4, 2015; 16 pages.
European Extended Search Report; Application No. 11797439.4; dated Jul. 24, 2014; 7 pages.
PCT International Search Report; Application No. PCT/CA2011/050377; dated Aug. 24, 2011; 4 pages.
PCT Written Opinion of the International Searching Authority; Application No. PCT/CA2011/050377; dated Aug. 24, 2011; 7 pages.
PCT International Search Report; Application No. PCT/CA2011/050378; dated Aug. 18, 2011; 3 pages.
PCT Written Opinion of the International Searching Authority; Application No. PCT/CA2011/050378; dated Aug. 18, 2011; 8 pages.
Canadian Office Action; Application No. 2,803,190; dated Jul. 29, 2014; 3 pages.
Chinese Office Action; Application No. 201180040821.2; dated Apr. 27, 2015; 16 pages.
Chinese Office Action as Received in Co-pending Application No. 201180040821.2 dated Jan. 19, 2016; 8 pages. (No English translation available).
European Examination Report; Application No. 11797439.4; dated Oct. 6, 2017; 7 pages.
European Extended Search Report; Application No. 11797441.0; dated Nov. 6, 2017; 8 pages.

* cited by examiner

INFORMATION DISTRIBUTION IN A WIRELESS COMMUNICATION SYSTEM

CROSS-REFERENCE TO RELATED APPLICATIONS

This application is a continuation of U.S. patent application Ser. No. 12/820,638 filed Jun. 22, 2010 by William Anthony Gage entitled, "Information Distribution in a Wireless Communication System", which is incorporated by reference herein as if reproduced in its entirety.

FIELD

The invention generally relates to wireless communication and in particular to information distribution in a wireless communication system.

BACKGROUND

Wireless communication systems are widely deployed to provide, for example, a broad range of voice and data-related services. Typical wireless communication systems consist of multiple-access communication networks that allow users to share common network resources. Examples of these networks are time division multiple access ("TDMA") systems, code division multiple access ("CDMA") systems, single-carrier frequency division multiple access ("SC-FDMA") systems, orthogonal frequency division multiple access ("OFDMA") systems, or other like systems. An OFDMA system is adopted by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency and a better user experience especially in high-demand urban areas. LTE accomplishes this higher performance with the use of broader spectrum bandwidth, OFDMA and SC-FDMA air interfaces, and advanced antenna methods. Uplink ("UL") refers to communication from a wireless device to a node. Downlink ("DL") refers to communication from a node to a wireless device. A radio access network ("RAN") is the infrastructure required to deliver wireless communication services, including access to the Internet. The RAN can manage a broad range of tasks for each user, including access, roaming, connection to the public switched telephone network ("PSTN") and the Internet, and quality of service ("QoS") management for data connections.

In a wireless communication system, wireless devices travel through a wireless coverage area while communicating with other hosts either inside a wireless domain or outside in a wired domain. Any wired or wireless host that wishes to communicate using the Internet protocol ("IP") must be assigned an IP address that can be used to distinguish itself from other hosts. The Internet protocol is used to communicate data across a packet-switched network. The Internet protocol works by exchanging pieces of information called packets. A packet is a sequence of bytes and consists of a header followed by a body. The header describes the packet's source and destination and, optionally, the routers to use for forwarding until it arrives at its final destination. The body contains the data in which the source node is sending.

The Internet Protocol also routes data packets between networks and IP addresses are used to specify the locations of source and destination nodes in the topology of the routing system. The IP address is a numerical identifier that is assigned to devices participating in a network, which uses the Internet protocol to communicate between nodes. Further, the IP address assigned to a host has topological significance in the wired world, meaning that the address can be used to locate the point where the host is physically attached to the network. A router is responsible for forwarding packets to a host and uses the IP address to find a routing table entry that defines the next hop along the path to the attachment point associated with the IP address used by the host. The information in a routing table is quasi-static meaning that a router assumes that an attachment point cannot change unless there is a change in network topology caused by, for instance, a link failure. By contrast, the IP address assigned to a wireless device in a wireless communication system may not be related to the point where the host is attached to the network. In particular, a wireless device can communicate with different access points as it travels through a wireless domain.

In a wireless communication system, a multiple-homed wireless device may have simultaneous connections to multiple radio access networks. In this case, an IP address must be assigned to the wireless device for each access network. Unfortunately, Internet protocols do not provide a generic mechanism to relate such IP addresses to the same wireless device. Therefore, each IP address represents a different end point from the routing perspective of the IP-based network.

When a wireless device is exchanging information with a remote corresponding node ("RCN") using a protocol such as the transmission control protocol ("TCP"), the end points of a packet flow are tied to the IP addresses used by the wireless device and the RCN when the exchange was initiated. Due to network congestion, traffic load balancing, or other unpredictable network behavior, IP packets can be lost, duplicated, or delivered out of order. TCP detects and solves problems associated with lost, duplicated, or out of order IP packets. Once the TCP receiver has successfully re-assembled the data originally transmitted, it passes the data to the application program. If the wireless device wishes to use a different IP address such as to move to a radio access network ("RAN") with a better signal, the TCP connection is broken.

Technologies such as Mobile IP have been used to solve this problem but they incur tunneling and signaling overheads, produce sub-optimum triangular forwarding paths, have limited support for multi-homed wireless devices, and result in considerable delay when transitioning between access points. Mobile IP is an Internet engineering task force ("IETF") standard communications protocol that is designed to allow wireless devices to move from one network to another while maintaining a permanent IP address. For an overview of Mobile IP, see Gundavelli et al., Proxy Mobile IPv6, RFC 5213, August 2008; Johnson et al., Mobility Support in IPv6, RFC 3775, June 2004; or Perkins, IP Mobility Support for IPv4, RFC 3344, August 2002.

When a wireless device is attempting to exchange information with another wireless device within a heterogeneous environment, the problem is compounded due to difficulties in obtaining the IP address assigned to the other wireless device and in keeping information exchanges alive in the face of handovers by either wireless device that result in a change of IP address. A handover, which is also referred to as a handoff, refers to the process of transferring an ongoing voice call or data session from one channel connected to a radio access network to another channel connected to the same or different radio access network.

A packet flow, which is also referred to as traffic flow or network flow, is a sequence of packets exchanged between a wireless device and an RCN. The packet flow occurs when the information exchanged between a wireless device and an RCN is too large to fit into a single packet and is, therefore, segmented into a plurality of packets either by the source of the information such as a web server or cache server or by an intermediate transit point such as a wireless gateway or access point.

The packet flow should be tied to the information being exchanged and not to the IP address of the communicating end points as is the case with TCP. For further information on packet flow, see Meyer et al., Report from the IAB Workshop on Routing and Addressing, RFC 4984, September 2007.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Figure 1:
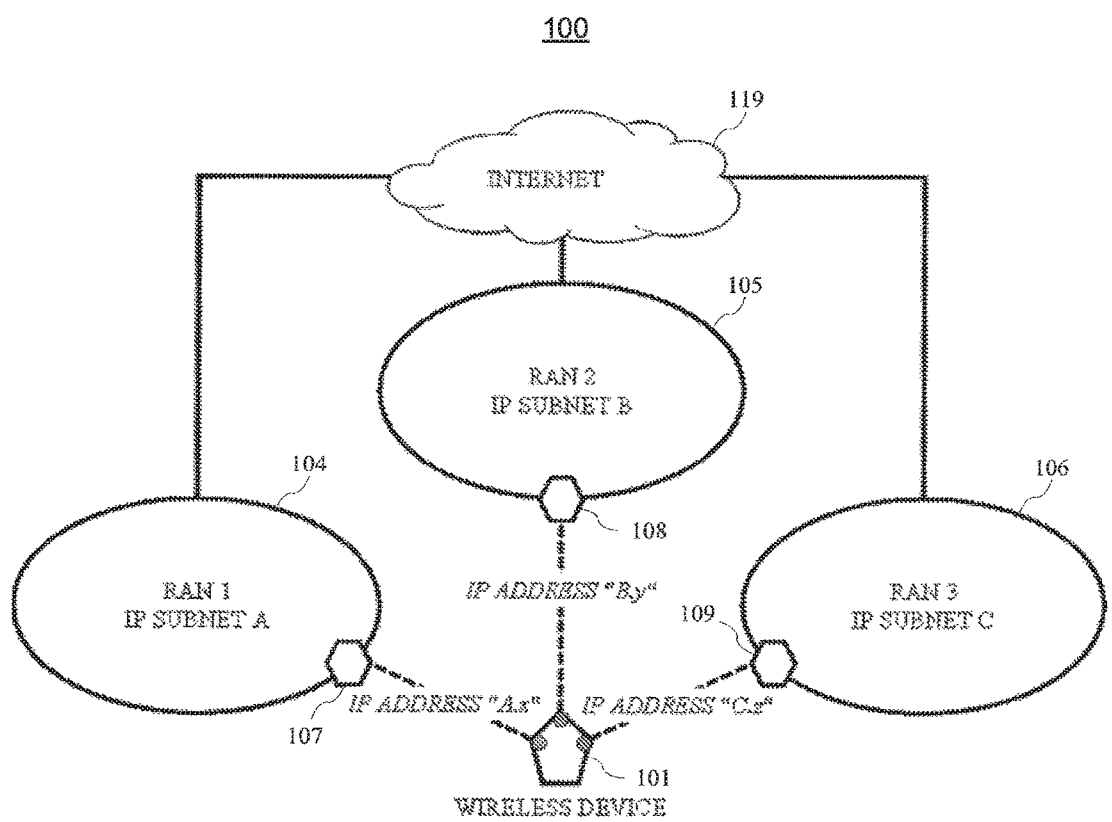
FIG. 1 is an example of a multiple-homed wireless device in a wireless communication system.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in wireless communication systems, it may be understood by one of ordinary skill in the art that the teachings of this disclosure are in no way limited to the exemplary embodiments shown. On the contrary, it is contemplated that the teachings of this disclosure may be implemented in alternative configurations and environments. For example, although the exemplary methods, devices and systems described herein are described in conjunction with a configuration for aforementioned wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed exemplary embodiments are not the only way to implement such methods, devices and systems, and the drawings and descriptions should be regarded as illustrative in nature and not restrictive.

Various techniques described herein can be used for various wireless communication systems. The various aspects described herein are presented as methods, devices and systems that can include a number of components, elements, members, modules, nodes, peripherals, or the like. Further, these methods, devices, and systems can include or not include additional components, elements, members, modules, nodes, peripherals, or the like. In addition, various aspects described herein can be implemented in hardware, firmware, software or any combination thereof. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or". Further, the terms "a" and "an" are intended to mean one or more unless specified otherwise or clear from the context to be directed to a singular form.

It is important to recognize that the terms "network," "environment," and "system" can be used interchangeably. Further, the terms "module," "component," "member" and other similar terms can include a computer or processor-related entity. Such entity can be implemented in hardware, firmware, software, or any combination thereof. For example, a module can include a process, a thread, an executable, an object, a program, a processor, a computer, or any combination thereof. Further, one or more modules can reside within a process, a thread, an executable, an object, a program, a processor, a computer, or any combination thereof.

In addition, a module can be executed from various computer-readable medium having various data structures stored thereon. A computer-readable medium can include but is not limited to magnetic storage devices such as a hard drive, floppy disk, magnetic tape, or other similar media; optical disks such as a compact disk ("CD"), digital versatile disk ("DVD"), Blue-ray disk ("BD"), or other similar media; flash memory devices such as erasable programmable read only memory ("EPROM"), key drive, memory stick, memory card, and other similar media; and smart cards. The term "article of manufacture" is intended to encompass a computer program accessible from any computer-readable medium.

A wireless communication system can include a plurality of nodes. A node is a connection point within a network and can send, receive, forward, or any combination thereof information over a communication channel. A node may also be called a wireless device, base station, computer, router, workstation, access point ("AP"), client, server, peer, satellite, modem, hub, bridge, switch, fiber optic device, cable device, or some other equivalent terminology. An access point used in a wireless communication system may also be referred to as a base station, node-B ("NodeB"), base transceiver station ("BTS"), router, cell, remote node ("RN"), remote corresponding node ("RCN"), or other similar term. Further, the term "cell" can include a specific base station, a specific sector of a base station, and a specific antenna of a sector of a base station. A node can support wired communication, wireless communication, or both. Further, a node can contain one or more transmitters, receivers or both to communicate with one or more other nodes. Further, a node can be fixed, stationary or both. For LTE and LTE-A equipment, a base station is referred to as an E-UTRAN NodeB ("eNB").

A wireless device used in a wireless communication system may also be referred to as a mobile station ("MS"), a terminal, a remote terminal, a user terminal, a user agent, a user device, a cordless telephone, a cellular phone, a cellular handset, a personal digital assistant ("PDA"), a smart phone, a session initiation protocol ("SIP") device, a handheld computer, a desktop computer, a laptop computer, a tablet computer, a hypertext transfer protocol ("HTTP") device, a set-top box, a television, a printer, a wireless appliance, or some other equivalent terminology. A wireless device may contain one or more RF transmitters and receivers, and one or more antennas to communicate with a node. Further, a wireless device may be fixed or mobile and may have the ability to move through a wireless communication network. For LTE and LTE-A equipment and for various industry standards, the wireless device is also referred to as user equipment ("UE").

This disclosure describes various techniques designed for content distribution networks that focus on information retrieval rather than on an exchange of packets between IP end points. For further information on content distribution networks, see Koponen et al., A Data-Oriented (and Beyond) Network Architecture, Proc. of ACM SIGCOMM 2007, pp. 181-192, Kyoto, Japan, August 2007. In this disclosure, a wireless device can request information based on the content description of the information. Such request can propagate through the RAN from which the wireless device made the request, dynamically establishing a reverse forwarding path to the AP node from which the wireless device is or will be attached.

FIG. 1 is an example of a multiple-homed wireless device in a wireless communication system 100. In FIG. 1, the wireless communication system 100 includes a wireless device 101, three RANs 104, 105 and 106, three AP nodes 107, 108 and 109, and the Internet 119. The wireless device 101 can access the Internet 119 via each RAN 104, 105 and 106. Further, the wireless device 101 can access each RAN 104, 105, and 106 by connecting to its respective AP node 107, 108, and 109. In addition, the wireless device 101 can support multiple-homing, which allows for simultaneous connections to a plurality of RANs 104, 105 and 106. It is important to recognize that the current state-of-the-art for multiple-homing requires an IP address be assigned to the wireless device 101 for each connection to a RAN 104, 105, and 106. However, there is no generic mechanism within existing Internet protocols to associate each assigned IP address to the same wireless device. Thus, each IP address represents a different end point from the routing perspective of the Internet.

In FIG. 1, the wireless communication system 100 can allow the wireless device 101 to exchange information with, for instance, an RCN using a protocol such as TCP/IP. In such configuration, the end points of a packet flow are tied to the IP addresses associated with the wireless device 101 and the RCN when the information exchange was initiated. For a wireless device 101 moving between a plurality of RANs 104, 105, and 106, the TCP connection can be broken with any or all of such RANs 104, 105, and 106. Technologies such as Mobile IP have been used to resolve this issue but such technologies provide limited solutions. For instance, such technologies can incur issues including tunneling and signaling overhead; sub-optimum triangular forwarding paths; limited support for multiple-homed wireless devices; increased delay when transitioning between AP nodes; or any combination thereof. Further, when wireless device 101 is attempting to exchange data with another wireless device, such issues can be compounded due to, for instance, obtaining the IP address assigned to the other wireless device, maintaining data exchanges during handovers by either wireless device, supporting packet flows, or any combination thereof.

Figure 2:
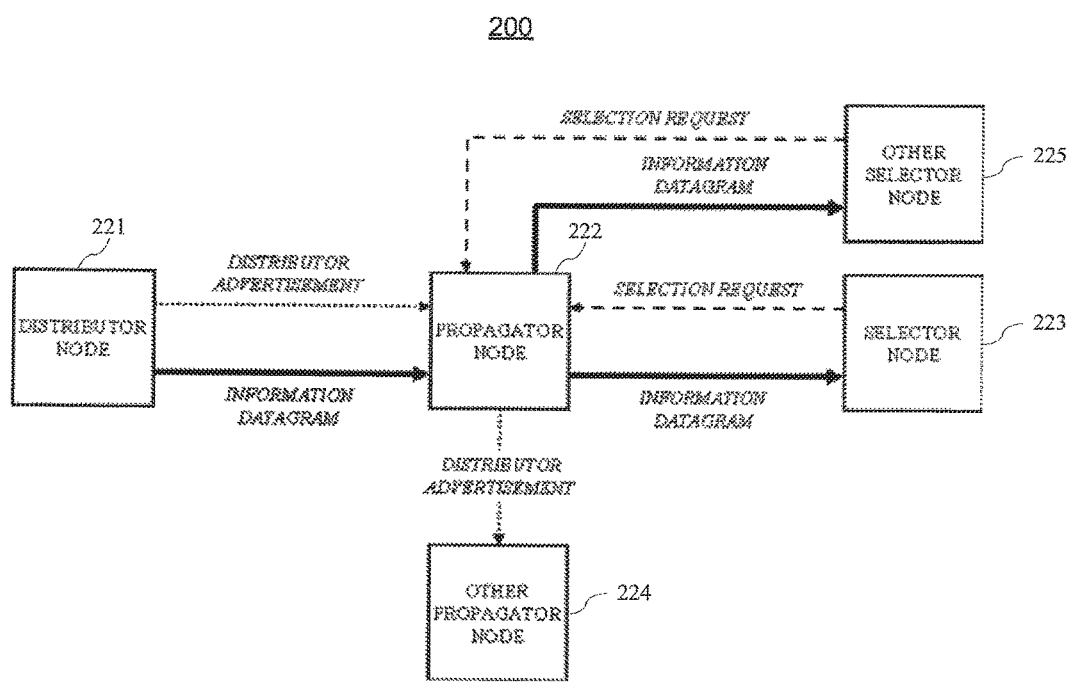
FIG. 2 is an example of a data discovery and selection model in a content distribution network.

As previously described, this disclosure provides various embodiments using techniques originally designed for content distribution networks that focus on information retrieval rather than on the exchange of packets between IP end points. FIG. 2 is an example of data discovery and selection in a content distribution network 200. Such model is described in Jacobson et al., Networking Named Content, Proceedings of the 5th ACM Intl Conf. on Emerging Networking Experiments and Technologies (CoNEXT 2009); 2009 December 1-4; Rome, Italy. New York: ACM; 2009; 1-12.

In FIG. 2, the content distribution network 200 includes a distributor node 221, a propagator node 222, a selector node 223, another propagator node 224, and another selector node 225. The distributor node 221 can originate, create, or both a labeled information object; store a copy of a labeled information object; or both. In one definition, a labeled information object indicates that the information has been labeled with an identifier that is agreed to and known by the distributor node 221 and the selector nodes 223 and 225. In this disclosure, the terms "labeled information object" and "information object" can be used interchangeably unless specified otherwise or clear from the context. As a result, one or more distributor nodes 221 may provide the same information. The propagator node 222 can disseminate a labeled information object and can forward such an object from the distributor node 221 to the requesting selector node 223. The selector node 223 can request information by using the label associated with the information object. Further, a plurality of selector nodes 223 can simultaneously request the same information. If the information object is too large to fit into a single datagram, such object can be segmented into a plurality of information datagrams by the distributor node 221 so that each information datagram contains a segment of the information object. In one definition, a datagram is a basic transfer unit typically associated with a packet-switched network in which the delivery, arrival time, and order are not guaranteed. Further, a datagram can include a header and a data body, where the header contains information sufficient for routing from the originating node to the destination node without relying on prior exchanges between the nodes and the network. The body contains the data to be exchanged.

In the current embodiment, the network 200 can allow the distributor node 221 to make itself known to other elements of the network 200 as the source of a particular labeled information object. Similarly, the selector node 223 can make itself known to other elements of the network 200 as a requestor of a particular labeled information object. The propagator node 222 can facilitate the transfer of one or more information datagrams transporting the requested labeled information object from the distributor node 221 to the selector node 223, ensuring that such datagram or datagrams supplied by the distributor node 221 are forwarded to the requesting selector node 223 using the other propagator node 224 toward the selector node 223.

In this embodiment, the distributor node 221 can advertise which information objects it has available by using an information advertisement signal carried in an information advertisement datagram. Such information advertisement signal can be sent from the distributor node 221 to its neighbor propagator node 222 periodically, aperiodically, on demand by the propagator node 222, or using other similar techniques. In the network 200, the propagator node 222 can collate the information advertisement signals received from the distributor node 221 and can forward a set of summary information advertisement signals to each of its neighbor propagator nodes using an appropriate routing protocol such as the intermediate system to intermediate system ("IS-IS") protocol or multiprotocol border gateway protocol ("MP-BGP").

The selector node 223 can request which information object it wants to receive by using a selection request signal carried in an information selection datagram. Such selection request signal can be sent from the selector node 223 to its neighbor propagator node 222 to satisfy the requirements of applications associated with the selector node 223. The selection request signal can be forwarded by the propagator node 222 towards the distributor node 221, wherein the distributor node 221 is advertising the availability of the particular information object. Such object can be forwarded in information datagrams from the distributor node 221 towards the selector node 223 in response to an explicit selection request signal from selector node 223. Such method can provide a coupling between the distributor node 221 and the selector node 223, which can be used to control the amount and the rate of information transported through the network 200. It is important to recognize that the distributor node 221 does not autonomously send information datagrams through the network 200. Further, the information advertisement signal, selection request signal, information datagram, or any combination thereof may be cryptographically signed for security, protection against tampering, verification of authenticity, other similar security technique, or any combination thereof.

Figure 3:
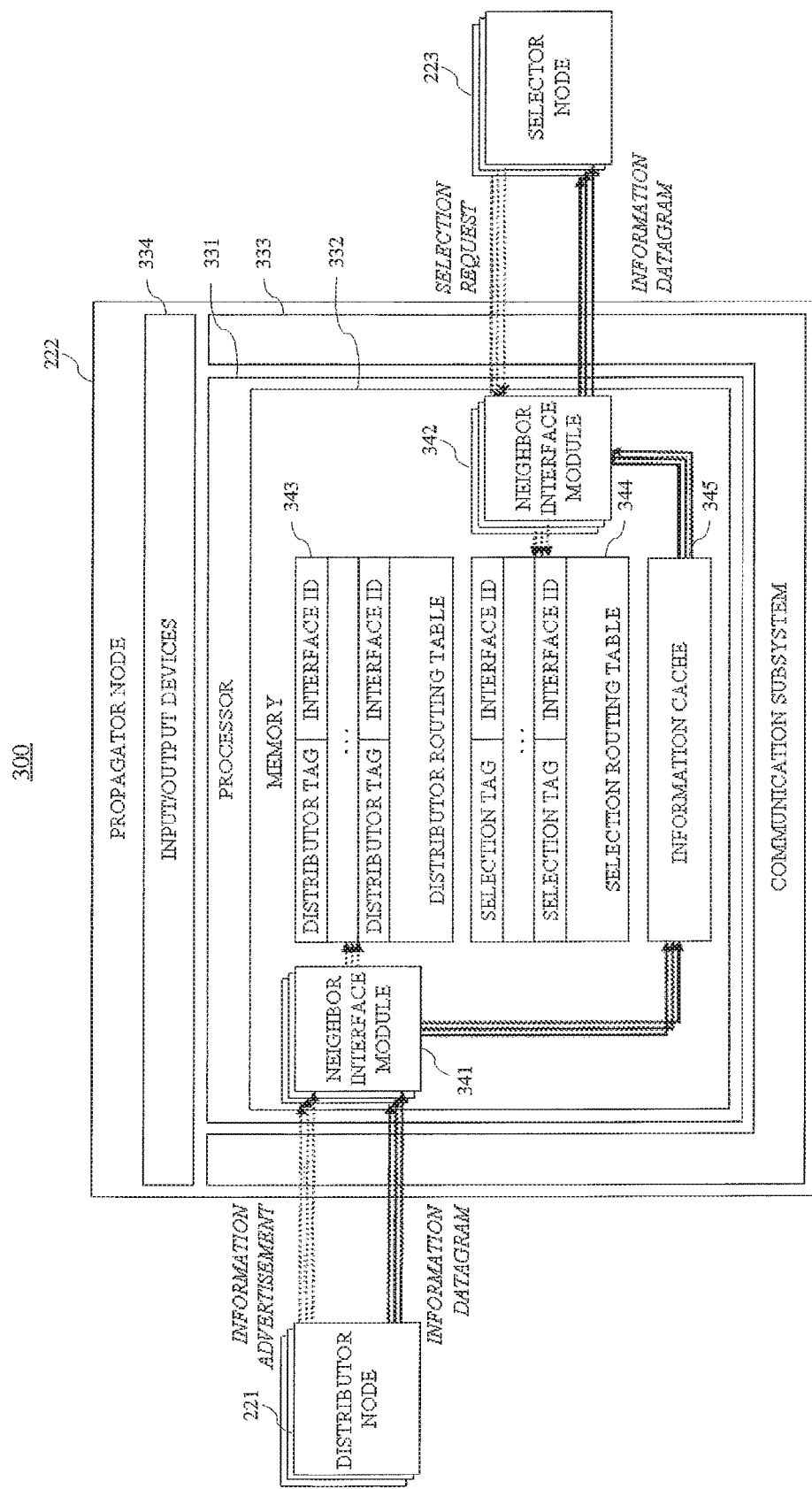
FIG. 3 illustrates one embodiment of a content distribution network in accordance with various aspects set forth herein.

FIG. 3 illustrates one embodiment of a content distribution network 300 in accordance with various aspects set forth herein. In FIG. 3, the network 300 can include a distributor node 221, a propagator node 222, and a selector node 223. As discussed previously, primary responsibility for the dissemination of information resides with the propagator node 222. The propagator node 222 can include a processor 331 coupled to a memory 332, a communication subsystem 333, input/output devices 334, other element, or any combination thereof, which can be utilized by the propagator node 222 to implement various aspects described herein. The propagator node 222 can include an operating system and software modules, which may be stored in the memory 332. The memory 332 can include a computer-readable medium, a random access memory ("RAM"), a static RAM ("SRAM"), a dynamic RAM ("DRAM"), a read only memory ("ROM"), a volatile memory, a non-volatile memory, a cache memory, other memory, or any combination thereof.

In this embodiment, a plurality of neighbor interface modules 341 and 342 are operable to provide connectivity to each neighbor node. It is important to recognize that each instance of a neighbor interface module 341 and 342 is operable to provide connectivity to a particular neighbor node. The neighbor nodes may be other content-aware propagator nodes, distributor nodes, selector nodes, other similar elements, or any combination thereof. In FIG. 3, the neighbor interface module 341 is operable to provide connectivity to the distributor node 221. Further, the neighbor interface module 342 is operable to provide connectivity to the selector node 223. Further, the memory 332 can include storage for a distributor routing table 343, a selection routing table 344, an information cache 345, other memory storage, or any combination thereof. It is important to recognize that the information cache 345 can be optionally used and is not required for such embodiment.

In another embodiment, a computer-readable medium such as the memory 332 may store program instructions for execution by the processor 331 of the propagator node 222 and may cause the propagator node 222 to implement any of the methods described herein.

In FIG. 3, the propagator node 222 can allow each neighbor interface module 341 and 342 to communicate with a particular neighbor node. Further, the propagator node 222 can allow each neighbor interface module 341 and 342 to include reachability information such as an Ethernet address, IP address, media access control ("MAC") address, tunnel parameters, or other similar reachability information. Such information can allow the propagator node 222 to communicate with a neighbor node using its neighbor interface module 341 and 342 over an intervening transport infrastructure, which may not be content-aware. The propagator node 222 can support multiple-homing operation by using a plurality of neighbor interface modules 341 and 342 to communicate with each of a plurality of neighbor nodes. The propagator node 222 can use the distributor routing table 343 to store an identifier of the neighbor interface module 341 associated with the next hop from the propagator node 222 towards the distributor node 221, which has advertised itself as the source of a labeled information object.

It is important to recognize that terms such as "closest," "neighbor," and "next hop" may be used interchangeably. Further, such terms reflect the relative position of nodes within a content-aware network and may not reflect actual physical distances between nodes or a node's relative position with respect to another node of the transport infrastructure that is not content-aware.

Similarly, the propagator node 222 can record an identifier of the neighbor interface module 342 in the selection routing table 344 associated with the next hop from the propagator node 222 towards the requesting selector node 223. Further, the propagator node 222 can store a labeled information datagram received from the advertising distributor node 221 in its information cache 345 and can forward such datagram to a requesting selector node 223. The information cache 345 including elements stored thereof may be subject to caching policies imposed on the propagator node 222 by, for instance, the network 300, a distributor node 221, or both. After the propagator node 222 receives an information advertisement signal from the distributor node 221, the propagator node 222 can record all or a portion of the information advertisement signal.

For example, the propagator node 222 may extract the label contained in an information advertisement signal (the "distributor tag") and may record the distributor tag and an identifier of the neighbor interface module 341 over which such information advertisement signal was received in its distributor routing table 343. If the propagator node 222 receives a subsequent information advertisement signal for the same distributor tag via another neighbor interface module, an identifier of the other neighbor interface module may also be recorded. Such method can allow additional instances of the same information object to be advertised by another distributor node, a single multiple-homed distributor node, or both. It is important to recognize that a multiple-homed distributor node can advertise the availability of information over a plurality of its neighbor interface modules.

In the current embodiment, the propagator node 222 can attempt to match all or a portion of the received information advertisement signal with all or a portion of each distributor tag in its distributor routing table 343. If all or a portion of the received information advertisement signal matches all or a portion of a distributor tag resident in the distributor routing table 343, the received information advertisement signal may not be forwarded over the neighbor interface module 341 to the neighboring propagator node. The information advertisement signal can be forwarded from the neighbor interface module 341 that is not associated with the received information advertisement signal. All or a portion of an information advertisement signal may be temporarily stored in the distributor routing table 343. For example, the propagator node 222 can discard, remove, or overwrite a distributor tag from the distributor routing table 343 after, for instance, the expiration of a timer. Further, the distributor node 221 may issue a new information advertisement signal, periodically, aperiodically, or both, to extend the storage life of an information advertisement signal or to explicitly cancel an outstanding information advertisement signal.

In FIG. 3, when the propagator node 222 receives a selection request signal from the selector node 223, the propagator node 222 can determine if all or a portion of the selection request signal matches all or a portion of an information tag contained in, for instance, the information cache 345. If there is a match, the requested information datagram can be forwarded to the selector node 223 over the same neighbor interface module 342 that the selection request signal was received. Such selection request signal may then be discarded by the propagator node 222. If the propagator node 222 does not find a match for the requested information in the information cache 345, the propagator node 222 can attempt to match all or a portion of the selection request signal with all or a portion of each selection tag in its selection routing table 344. If a match is found, indicating that there is an outstanding selection request for the information datagram from another selector node, the propagator node 222 can record all or a portion of the new selection request signal such as the selection tag in its selection routing table 344 along with an identifier of the neighbor interface module 342 over which the selection request signal was received. No further processing of the selection request signal may be required.

In the current embodiment, if the propagator node 222 does not find a match in its information cache 345, its selection routing table 344, or both, the propagator node 222 can attempt to match all or a portion of the selection request signal with all or a portion of each distributor tag in its distributor routing table 343 using, for instance, a longest prefix match. If a match is found, the propagator node 222 can forward the selection request signal using its neighbor interface module 341 associated with the matching distributor tag. Further, if there is a plurality of matching distributor tags in its distributor routing table 343, the propagator node 222 can forward the selection request signal over its neighbor interface module 341 with the best forwarding metric such as the link speed, link utilization, link throughput, number of hops such as over the shortest path load, such as the queue length, path latency or delay, path reliability, path bandwidth, path throughput, packet loss rate, interference level, cost metric, other metric, or any combination thereof. The propagator node 222 can record all or a portion of the selection request signal such as the selection tag in its selection routing table 344 along with an identifier of its neighbor interface module 342 over which the selection request signal was received. If the propagator node 222 does not find a match in its distributor routing table 343 for the requested information datagram and the selection request signal is not marked as persistent, then the selection request signal may be discarded by the propagator node 222 and an error can be returned to the requesting selector node 223. It is important to recognize that the distributor routing table 343 may include, for instance, a default "match everything" entry to allow an unmatched selection request signal to be forwarded to a higher-level propagator node for resolution.

In FIG. 3, after the propagator node 222 receives an information datagram over its neighbor interface module 341 from the distributor node 221, the propagator node 222 can determine if all or a portion of the information tag associated with the information datagram matches all or a portion of any selection tags contained in its selection routing table 344. For each matching selection tag, the propagator node 222 can forward the information datagram using its neighbor interface module 342 identified for that selection tag and can discard, remove, or overwrite the selection tag from its selection routing table 344. Such method can ensure that the rate at which information datagrams are transferred remains under the full or partial control of the selector node 223. If not limited by any associated caching rules, the propagator node 222 can store the information datagram into its information cache 345, including the information tag, a temporary storage indictor, or both. The temporary storage indicator can indicate, for instance, whether or when the information datagram can be purged, overwritten, or both from the information cache 345. If all or a portion of the information tag associated with the information datagram does not match all or a portion of any of the selection tags in its selection routing table 344, the propagator node 222 can discard the information datagram. Such occurrence may indicate, for instance, that the information datagram was received too late to satisfy a previous request; the information datagram was forwarded in error; or both.

The information distribution model of network 300 is based on concepts from a basic content distribution model that, in some cases, may not be optimum. For instance, the content distribution model may assume that information is made available by the distributor node 221 before it is requested by the selector node 223. As a result, a propagator node 222 may discard a selection request signal if the requested information datagram, information advertisement signal, or both has not been previously advertised by a distributor node 221. In such model, the only recourse for the selector node 223 is to probe the network 300 for information by periodically, aperiodically, or both issuing selection request signals.

In the basic content distribution model, a selection request signal is deemed to have been satisfied and can be discarded, removed, or overwritten from the selection routing table 344 once an information datagram corresponding to such selection request signal is forwarded to the requesting selector node 223. To obtain further information, the selector node 223 can issue, for instance, an additional selection request signal. Since a selection request signal is considered satisfied and can be discarded, removed, or overwritten from the selection routing table 344 after the first information datagram corresponding to such selection request signal is forwarded to the requesting selector node 223, the selector node 223 can issue an additional selection request signal to solicit information from other distributor nodes. However, there may be no guarantee that the selector node 223 can obtain information from some or all of the available distributor nodes. For example, a "chatty" distributor node could consume all of the selection request signals from a selector node, effectively denying service to other distributor nodes of the same information or type of information.

Such deficiencies can be overcome by adding a publish/subscribe mode of operation to the information distribution model. For further information on the publish/subscribe mode of operation, see Carzaniga et al., Design and Evaluation of a Wide-Area Event Notification Service, ACM Transactions on Computer Systems, Vol. 19, No. 3, August 2001, Pages 332-383. A content distribution model typically only supports a 1:N communication model such as one distributor node providing information to N selector nodes. By contrast, a publish/subscribe model can support an M:N communication model such as M distributor nodes provide information to N selector nodes. The variables M and N are positive integer values.

However, the publish/subscribe model can suffer from multiple potential problems when used within the context of a wireless communication network. For instance, a publisher node, which is analogous to a distributor node, and a subscriber node, which is analogous to a selector node, are by design loosely coupled, so that a publisher node may not be aware of the existence of a subscriber node. As a result, a wireless device acting as a publisher node may send an information datagram even though no subscriber nodes are interested in such information. The information datagram may be discarded at the first propagator node after it fails to match the published information with an outstanding subscription request. However, by such time, precious uplink radio resources may have already been wasted. A wireless device acting as a subscriber node may have little or no control over the rate at which information is sent by a publisher node, potentially leading to congestion on the radio link. A wireless device acting as a subscriber node, publisher node, or both may be unable to determine which, if any, information has been lost in order to institute recovery procedures such as re-transmission of the lost information. An information solicitation model may be added to the basic content distribution model to alleviate such problems.

In FIG. 3, during typical processing, a selection request signal may be discarded by propagator node 222 if it does not find a matching distributor tag in its distributor routing table 343. However, if the selection request signal has been marked by the selector node 223 as a persistent selection request, the propagator node 222 may act as though a match was found by recording the selection request signal such as the selection tag in its selection routing table 344 along with an identifier of its neighbor interface module 342 over which the selection request signal was received. However, it is important to recognize that the selection request signal may not be forwarded by the propagator node 222 due to the lack of information in its distributor routing table 343. As a result, a persistent selection request signal may not be disseminated beyond the propagator nodes at the edge of the network that are neighbors of selector nodes, thereby preventing such selection request signal from flooding the network and limiting the scope of selection request state information to the edges of the network. The persistent selection request signal can have a limited lifetime and can be discarded, removed or overwritten by the propagator node 222 from its selection routing table 344 after, for instance, expiration of a timer. If necessary, the selector node 223 may issue a new selection request signal to periodically, aperiodically, or both extend the storage life of a persistent selection request signal, explicitly cancel an outstanding selection request signal, or both.

In addition to recording the distributor tag in its distributor routing table 343 after receiving an information advertisement signal, the propagator node 222 can check its selection routing table 344 to determine whether there is an outstanding persistent selection tag that may match all or a portion of the newly received distributor tag. If a match is found, then the propagator node 222 acting as a proxy for the selector node 223 can create a selection request signal from the matching selection tag and can forward such signal over its neighbor interface module 341 on which the information advertisement signal was received. If there is a plurality of matching selection tags in its selection routing table 344, the propagator node 222 can create and forward a selection request signal for each of the matching entries. It is important to recognize that a persistent selection tag may match a plurality of information advertisement tags from a plurality of distributor nodes 221. In such case, the propagator node 222 can create and forward a selection request signal for each of the matching information advertisement tags.

After receiving an information datagram over its neighbor interface module 341, the propagator node 222 can verify that the information tag associated with the information datagram matches all or a portion of any of the persistent selection tags, non-persistent selection tags, or both in its selection routing table 344. Further, the propagator node 222 can forward the information datagram over the neighbor interface module 342 identified by each matching entry. The propagator node 222 can discard, remove, or overwrite an entry from its selection routing table 344 if such entry is associated with a non-persistent selection tag. However, the propagator node 222 can leave the entry in its selection routing table 344 if it is associated with a persistent selection tag. It is important to recognize that each selection request signal generated by the propagator node 222 can result in one information datagram being forwarded to the original selector node. The information tag in the information datagram can provide the selector node 223 with the identity of the distributor node 221, which is the source of the type of information that the selector node 223 is seeking. If an additional information datagram needs to be retrieved, then the selector node 223 can issue, for instance, a subsequent non-persistent, selection request signal to obtain such datagram from the identified distributor node 221. Such method can ensure that the rate at which information datagrams are transferred remains under the control of the selector node 223. Further, such method can allow the selector node 223 to, for instance, select information from a specific distributor node and determine when to receive such information.

A content distribution model can be well suited for the retrieval of content from an information repository. However, some communication exchanges can be more transactional with, for instance, an initial request from one node eliciting a response from another node. The session initiation protocol ("SIP") and the hypertext transfer protocol ("HTTP") are examples of protocols that support such exchanges. The general framework for transactional processing within the network 300 is for the initiating node to include the transaction request in the body of a selection request signal and for the responding node to include the transaction response in the body of an information datagram. For example, in a simple SIP exchange, the initial "INVITE" message is included in the body of a selection request signal, and the "200 OK" message is returned in the body of the corresponding information datagram. Further, the selection tag can include a unique transaction identifier to ensure that responses are properly correlated to requests.

Figure 4:
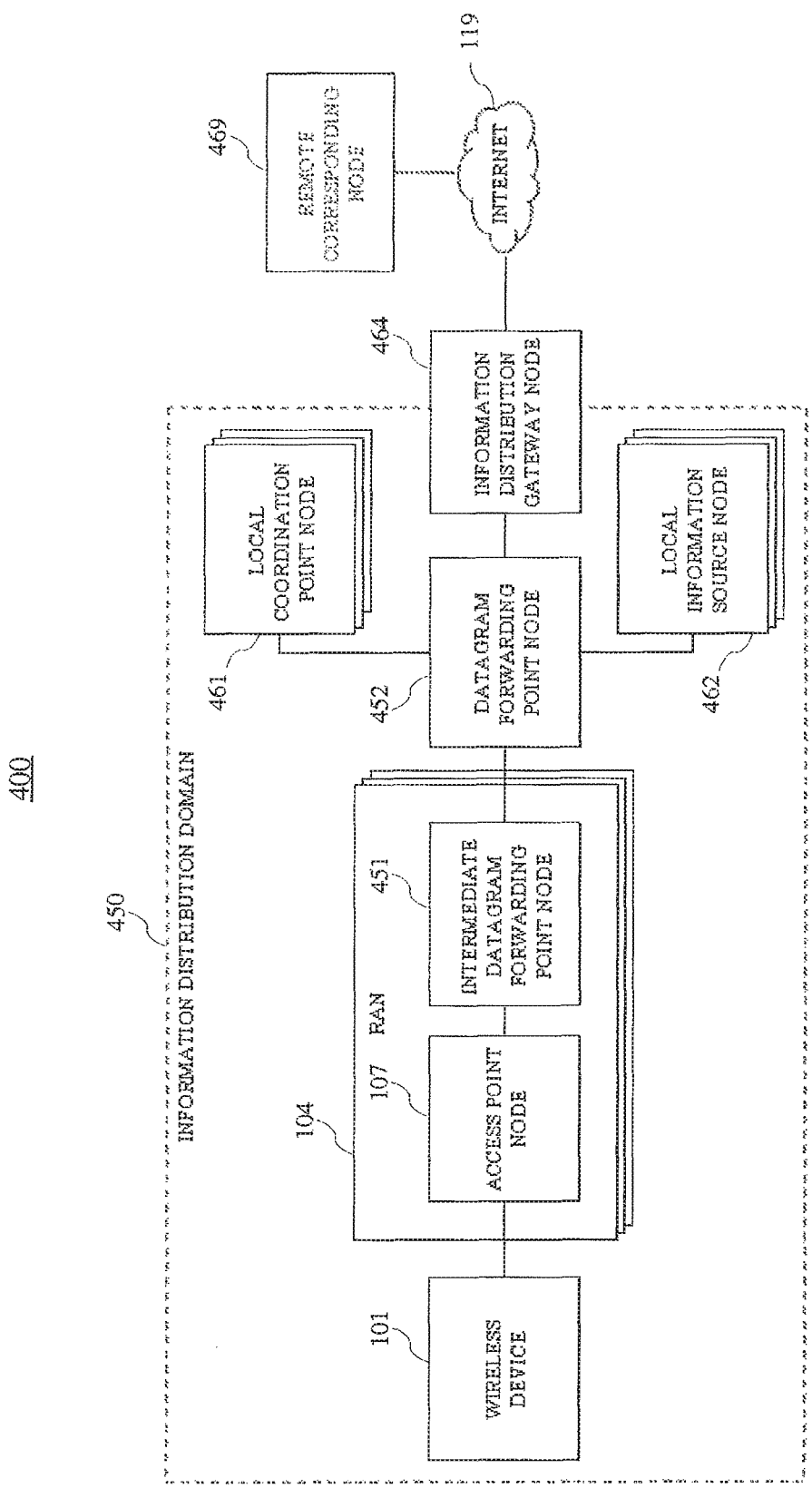
FIG. 4 illustrates one embodiment of information distribution in a wireless communication system in accordance with various aspects set forth herein.

FIG. 4 illustrates one embodiment of a wireless device-centric wireless communication system 400 in accordance with various aspects set forth herein. In FIG. 4, the wireless communication system 400 can include functional entities such as a wireless device 101, a RAN 104, an AP node 107, the Internet 119, an RCN 469, an information distribution gateway ("IDG") node 464, a local coordination point ("LCP") node 461, a local information source ("LIS") node 462, an intermediate datagram forwarding point ("DFP") node 451, a datagram forwarding point ("DFP") node 452, other element, or any combination thereof. Further, an information distribution domain ("IDD") 450 can include functional entities such as a wireless device 101, a RAN 104, an AP node 107, an IDG node 464, an LCP node 461, an LIS node 462, an intermediate DFP node 451, a DFP node 452, other element, or any combination thereof.

In FIG. 4, the wireless communication system 400 can allow the wireless device 101 to make decisions on the use of available radio resources. For instance, the wireless device 101 may have exclusive knowledge of available RANs 104 and the requirements of its applications. As the wireless device 101 moves between AP nodes 107 in the same or different RANs 104, the wireless device 101 can induce the information datagram forwarding elements within the RANs 104 to direct or re-direct information datagrams to the AP nodes 107 attached, soon to be attached, or both to the wireless device 101. The IDD 450 can include a set of interconnected network elements that locate, forward or both information datagrams using content distribution principles. The IDD 450 can encompass, for instance, one or more RANs 104. Further, the IDG node 464 can be an application-level gateway that can translate between the information datagram forwarding mechanisms used in the IDD 450 and the standard IP-routed domain. Over its neighbor interface module towards the IP-routed domain of the Internet 119, the IDG node 464 can act as a border gateway node by, for instance, advertising reachability information to the IP subnets associated with one or more RANs 104 encompassed by the IDD 450. Over its neighbor interface module towards the DFP 452, the IDG node 464 can act as a proxy for information repositories located on the RCN 469, which can be within or attached to the Internet 119.

In FIG. 4, the wireless communication system 400 can allow the DFP node 452 to provide transport functions such as forwarding information datagrams to or from the wireless device 101. A plurality of intermediate DFP nodes 451 may exist on the forwarding paths to or from a plurality of AP nodes 107 serving the wireless device 101. Each AP node 107 can manage the network side of a radio access link by connecting the wireless device 101 to the network infrastructure. Each AP node 107 can be connected directly or indirectly to the DFP nodes 451 and 452 and can forward information datagrams received from the wireless device 101 to the DFP nodes 451 and 452.

The LCP node 461 can be, for instance, a control plane entity that works in concert with the wireless device 101 to enable operation within the IDD 450. For example, the LCP node 461 may include control points for coordinating within the RAN 104 such as the use of radio resources, facilitating handover, or both. The control plane typically refers to one of three entities in a network protocol model. The control plane provides control-related signaling such as data session set-up and teardown, and allows changes to network parameters during such session. The other two entities are the user plane for data transmission and the management plane for network management.

The LIS node 462 can be, for instance, a user plane entity that provides information to the wireless device 101 from within the IDD 450. For example, the LIS node 462 can provide, for instance, geo-location information, regulatory information, configuration information, other information, or any combination thereof within the RAN 104.

As provided in TABLE 1, the functional entities can take on different roles within the IDD 450 depending on whether the information is downlink traffic flowing to or uplink traffic flowing from wireless device 101.

tional entities such as a wireless device 101 acting as a selector node 223, an AP node 107, the Internet 119, a DFP node 452 acting as a propagator node 222, an IDG node 464 acting as a proxy distributor node 572 and application level gateway ("ALG") node 573, another DFP node 553, a local information repository ("LIR") node 571 acting as a distributor node 221, or any combination thereof. Further, an IDD 450 can include functional entities such as a wireless device 101 acting as a selector node 223, an AP node 107, a DFP node 452 acting as a propagator node 222, an IDG node 464 acting as a proxy distributor node 572 and application level gateway ("ALG") node 573, another DFP node 553, a LIR node 571 acting as a distributor node 221, or any combination thereof.

Figure 5:
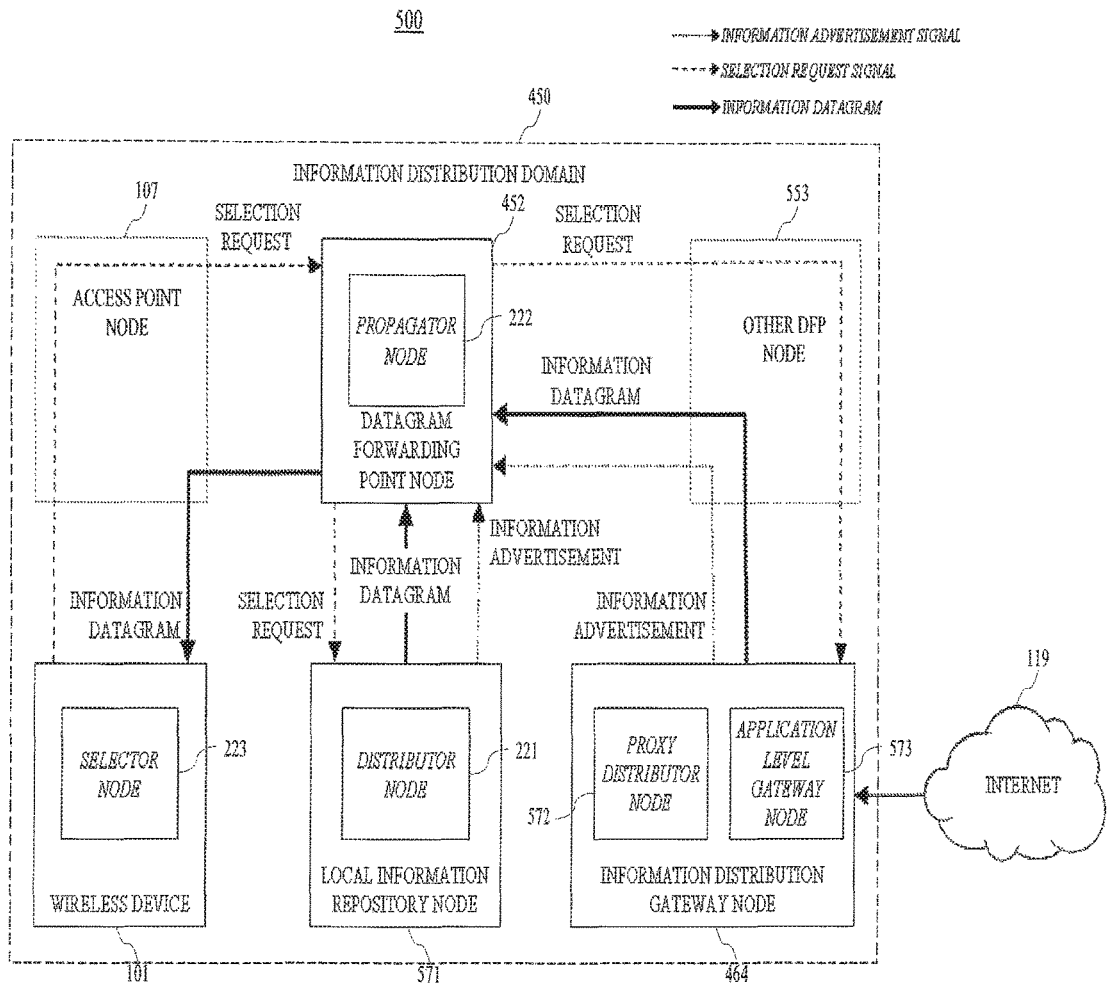
FIG. 5 illustrates one embodiment of downlink information distribution in a wireless communication system in accordance with various aspects set forth herein.

In FIG. 5, the wireless communication system 500 can allow the IDG node 464 acting as a proxy distributor node 572 to disseminate, for instance, downlink traffic to the wireless device 101 acting as a selector node 223. For example, the IDG node 464 can perform a proxy distributor node 572 function of sending an information advertisement signal on behalf of IP-based repositories located within or attached to the Internet 119. The IDG node 464 acting as a proxy distributor node 572 can send the information advertisement signal to its neighbor DFP node 452, which is within the IDD 450. The DFP node 452 acting as a propagator node 222 can distribute the information advertisement signal to another DFP node 553—a process which can be repeated at each DFP node 452 within the IDD 450. The IDG node 464 acting as a proxy distributor node 572 may advertise itself as the proxy repository for some or all information objects in the Internet 119. For example, in a multiple IDG node installation, each IDG node 464 acting as a proxy distributor node 572 may generate an information advertisement signal for a specific domain within the Internet 119 to provide, for instance, load balancing across each IDG node 464. Further, each IDG node 464 acting as a proxy

TABLE 1

| FUNCTIONAL ENTITY | DOWNLINK ROLE | UPLINK ROLE |
| --- | --- | --- |
| LCP node 461 for the RAN 104 | The distributor node 221 for the RAN 104 control plane information | The selector node 223 for wireless device control plane information |
| LIS node 462 for the RAN 104 | The distributor node 221 for the RAN 104 user plane information | The selector node 223 for the RAN 104 user plane information |
| IDG node 464 | The proxy distributor node for the RCN user plane information | The selector node 223 for the RCN user plane information |
| DFP node 451 and 452 | The propagator node 222 | The propagator node 222 |
| AP node 107 | Manages the radio access link to the RAN 104 | Manages the radio access link to the RAN 104 |
| wireless device 101 | The selector node 223 for user plane information; the selector node 223 for RAN 104 control plane information | The distributor node 221 for user plane information; the distributor node 221 for wireless device control plane information |

It is important to recognize that the functional entities may have other combinations of functional roles. For example, an AP node 107, an IDG node 464, or both can incorporate the functions of a propagator node 222. Further, a wireless device 101 can incorporate the functions of a distributor node 221, a propagator node 222, a selector node 223, or any combination thereof.

FIG. 5 illustrates one embodiment of downlink traffic dissemination in a wireless communication system 500 in accordance with various aspects set forth herein. In FIG. 5, the wireless communication system 500 can include funcdistributor node 572 may qualify an information advertisement signal to indicate that it is the proxy repository for a subset of the wireless device population such as wireless devices assigned an IP address within a specific subnet. The wireless device 101 can retrieve information by acting as a selector node 223 and can generate a selection request signal, which can identify the information to be forwarded to the wireless device 101. The selection request signal can travel towards IDG node 464 by following the next-neighbor interface module identified in the distributor routing table 343 by the propagator node 222 function embedded in each DFP node 452. Further, the information datagram can travel towards AP node 107 serving the wireless device 101 by following the next-neighbor interface module identified in the selection routing table by the propagator node 222 function embedded in each DFP node 452.

It is important to recognize that a multiple-homed wireless device with a plurality of active radio links may send different selection request signals over different active radio links to, for instance, match active radio link characteristics to application requirements, increase throughput via traffic aggregation, or both. Similarly, a wireless device that is transitioning between AP nodes may send a copy of a selection request signal, a different selection request signal, or both via the serving AP node, target AP node, or both to ensure that one or more corresponding information datagram can be retrieved from either AP node during, for instance, a handover process.

After receiving the selection request signal, the IDG node 464 acting as an ALG node 573 can translate the selection request signal into an information retrieval request signal such as an "HTTP GET" signal, which can be interpreted by, for instance, an information repository located within or attached to the Internet 119. After portions of the information object have been retrieved from the information repository, the IDG node 464 acting as an ALG node 573 can construct and forward a corresponding information datagram to a neighbor DFP node 452. The DFP node 452 acting as a propagator node 222 can forward the information datagram towards the serving AP node 107, which corresponds to an entry in its selection routing table. Such process is repeated at each DFP node 452. The LIR node 571 such as an LCP node 461, an LIS node 462, or both can act as a distributor node 221 by generating an information advertisement signal to allow the wireless device 101 to select the information advertisement signal directly by bypassing the IDG node 464 acting as a proxy distributor node 572, ALG node 573, or both. Further, the DFP node 452 acting as a propagator node 222 may store an information datagram in its information cache after forwarding such datagram towards the requesting wireless device 101. If a subsequent selection request signal is received for the same information, DFP nodes 451 and 452 may respond to the selection request signal using the information stored in its information cache 345 rather than forwarding the selection request signal towards IDG node 464, LIR node 571 or both.

Figure 6:
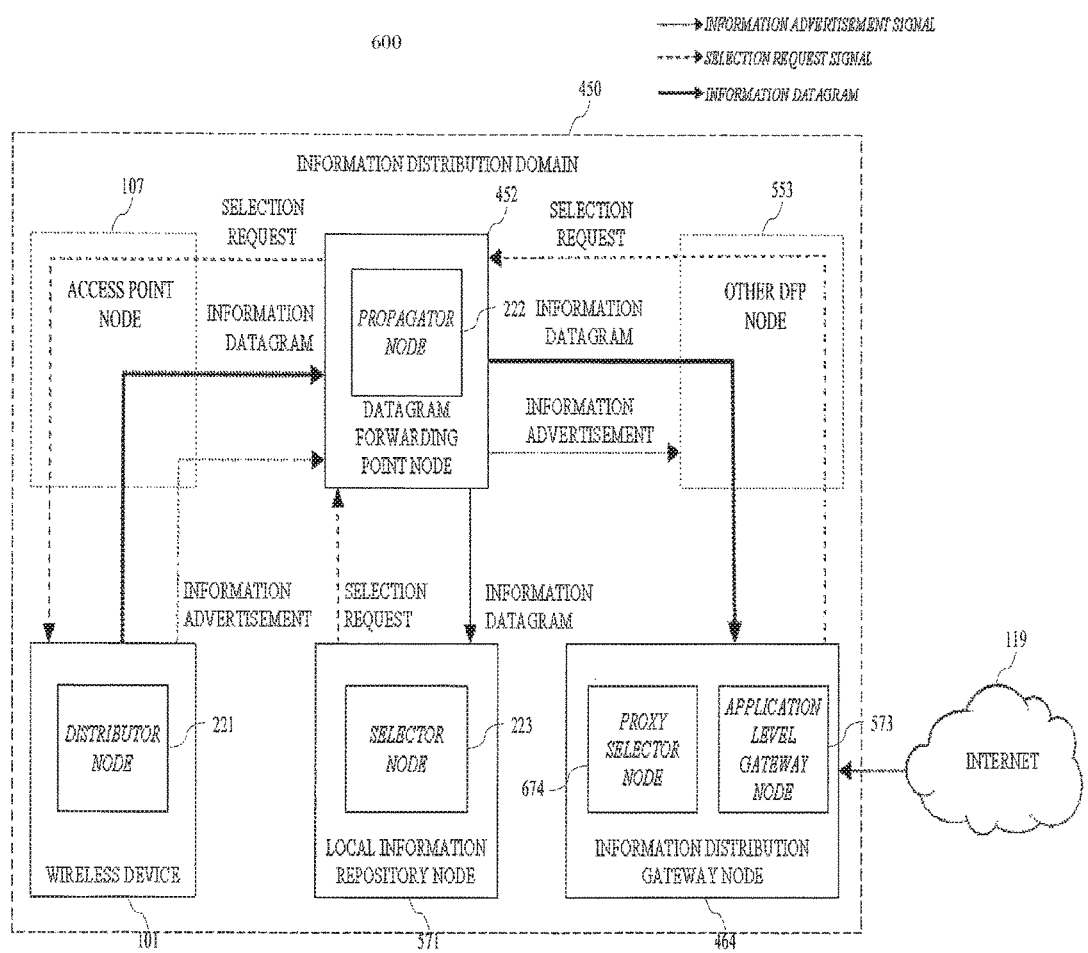
FIG. 6 illustrates one embodiment of uplink information distribution in a wireless communication system in accordance with various aspects set forth herein.

FIG. 6 illustrates one embodiment of uplink traffic dissemination in a wireless communication system 600 in accordance with various aspects set forth herein. In FIG. 6, the wireless communication system 600 can include functional entities such as a wireless device 101 acting as a distributor node 221, an AP node 107, the Internet 119, a DFP node 452 acting as a propagator node 222, an IDG node 464 acting as a proxy selector node 674 and ALG node 573, another DFP node 553, an LIR node 571 acting as a selector node 223, or any combination thereof. Further, an IDD 450 can include functional entities such as a wireless device 101 acting as a distributor node 221, an AP node 107, the Internet 119, a DFP node 452 acting as a propagator node 222, an IDG node 464 acting as a proxy selector node 674 and ALG node 573, another DFP node 553, an LIR node 571 acting as a selector node 223, or any combination thereof.

In FIG. 6, the wireless communication system 600 can allow uplink traffic to be disseminated by the wireless device 101 acting as a distributor node 221. The IDG node 464 can act as a proxy selector node 674 for uplink traffic destined for the Internet 119. Further, the LIR node 571 such as an LCP node 461, an LIS node 462, or both can generate a selection request signal for the desired information. In addition, the wireless device 101 can act as a distributor node 221 by generating an information advertisement signal that identifies available information. The wireless device 101 can send via its serving AP node 107 the information advertisement signal to its neighbor DFP node 452 within the IDD 450. The neighbor DFP node 452 acting as a propagator node 222 can distribute the information advertisement signal to its neighbor DFP node 553, with such process repeated by each neighbor DFP node.

It is important to recognize that a multiple-homed wireless device with a plurality of active radio links may send different information advertisement signals over different active radio links to match link characteristics to application requirements, match radio access control information available at the wireless device to the appropriate access link, or both. Similarly, a wireless device that is in transition between AP nodes may send a copy of an information advertisement signal via the serving AP node, target AP node, or both to ensure that a selection request signal can be received by either AP node during, for instance, a handover process.

In the current embodiment, the IDG node 464 acting as a proxy selector node 674 can perform the generation of persistent selection request signals on behalf of IP-based information repositories located within the Internet 119. If there is a plurality of IDG nodes 464 in an installation, then each IDG node 464 acting as a proxy selector node 674 may send a selection request signal for information located in a specific domain within the Internet 119 to provide, for instance, a load balancing function. Further, each IDG node 464 acting as a proxy selector node 674 may also qualify the selection request signal to indicate that an IDG node 464 is the proxy selector node 674 for a subset of the wireless device population such as wireless devices assigned an IP address within a specific subnet, which can be used as another load balancing mechanism. When an information datagram is received by the IDG node 464, the IDG node 464 acting as an ALG node 573 can translate the information datagram into, for instance, an information storage request such as an "HTTP PUT" request, which can be understood by an information repository within or attached to the Internet 119.

Figure 7:
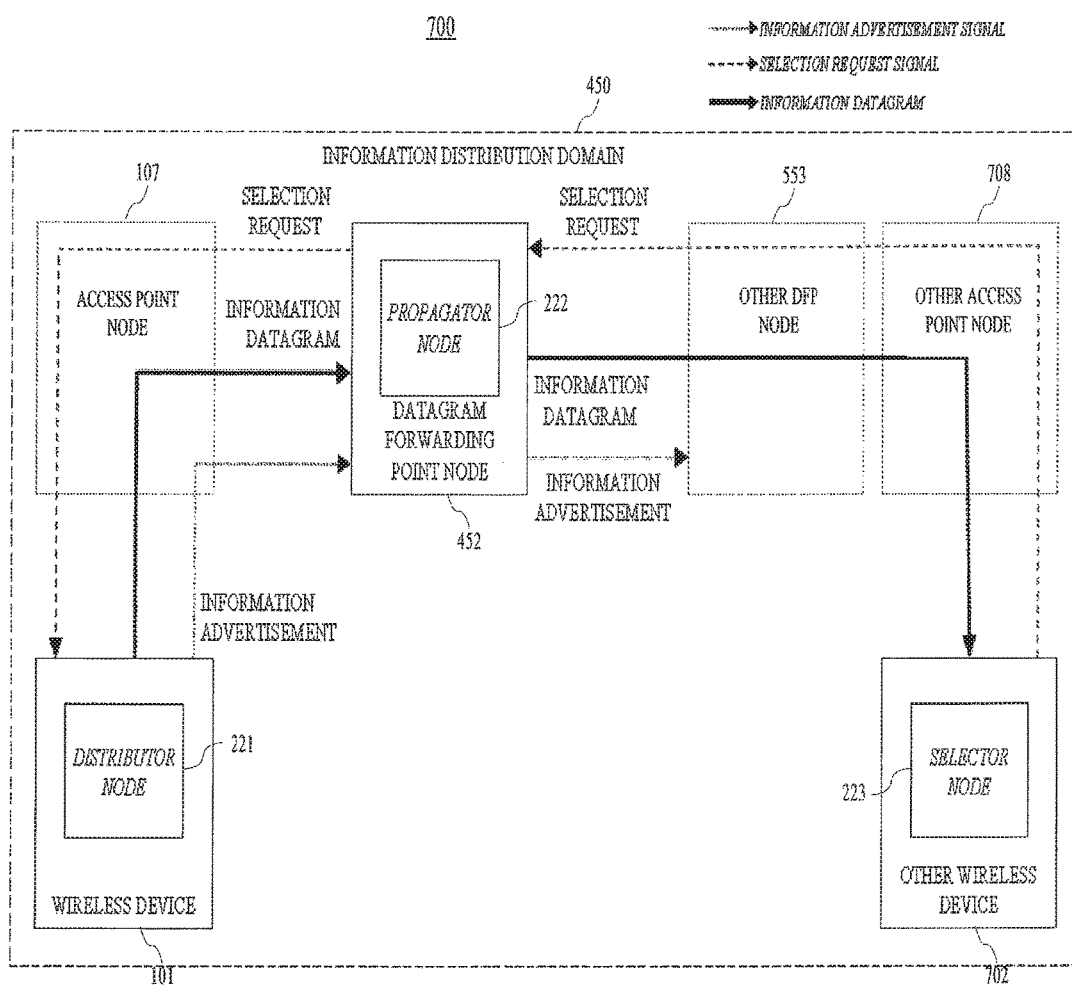
FIG. 7 illustrates one embodiment of mobile-to-mobile information distribution in a wireless communication system in accordance with various aspects set forth herein.

FIG. 7 illustrates one embodiment of mobile-to-mobile traffic dissemination in a wireless communication system 700 in accordance with various aspects set forth herein. In FIG. 7, the wireless communication system 700 can include functional entities such as a wireless device 101 acting as a distributor node 221, an AP node 107, a DFP node 452 acting as a propagator node 222, another DFP node 553, another wireless device 702 acting as a selector node 223, another AP node 708, or any combination thereof. Further, an IDD 450 can include functional entities such as a wireless device 101 acting as a distributor node 221, an AP node 107, a DFP node 452 acting as a propagator node 222, another DFP node 553, another wireless device 702 acting as a selector node 223, another AP node 708, or any combination thereof.

In FIG. 7, the wireless communication system 700 can allow the wireless device 101 to act as a distributor node 221 by, for instance, storing information in a local, wireless device-hosted information repository, which may be retrieved by the other wireless device 702 acting as a selector node 223. The wireless device 101 acting as a distributor node 221 can generate an information advertisement signal, which can identify the information available from the wireless device 101. The information advertisement signal can be sent from the wireless device 101 via its serving AP node 107 to its neighbor DFP node 452 residing within the IDD 450. The neighbor DFP node 452 acting as a propagator node 222 can distribute the information advertisement signal to its neighbor DFP node such as the other DFP node 553, a process that is repeated by each DFP node.

In another embodiment, a multiple-homed wireless device 101 acting as a distributor node 221 with two or more active radio links may send different information advertisement signals over different links to match link characteristics to application requirements; match radio access control information available at the wireless device 101 to the appropriate access link or type of access link; or both.

In another embodiment, a wireless device 101 acting as a distributor node 221 that is in transition between AP nodes 107 and 708 may send a copy of an information advertisement signal via its serving AP node 107, a target AP node 708, or both to ensure that an information request signal can be received via either AP node 107 and 708 during the handover process.

In another embodiment, the other wireless device 702 acting as a selector node 223 can retrieve information by generating a selection request signal that identifies the information to be forwarded to such wireless device 702. The selection request signal can travel through the network towards the wireless device 101 acting as a distributor node 221 by following the next neighbor interface module stored in the distributor routing table of each DFP node 452 and 553. The propagator node 222 function embedded in each DFP node 452 and 553 can record in its selection routing table 344 the forwarding path towards the other AP node 708 serving the other wireless device 702 acting as a selector node 223.

In another embodiment, a multiple-homed wireless device 101 acting as a selector node 223 with a plurality of active radio links may send different selection request signals over different links to match link characteristics to application requirements, increase throughput through traffic aggregation, or both.

In another embodiment, a multiple-homed wireless device 702 acting as a selector node 223 that is in transition between AP nodes 107 and 708 may send a copy of a selection request signal, a different selection request signal, or both via the serving AP node 708, target AP node 107, or both, which can ensure that the information can be retrieved from either AP node 107 and 708 during the handover process.

In another embodiment, a DFP node 452 acting as a propagator node 222 may store an information datagram in its information cache after forwarding it towards a wireless device 702 acting as a selector node 223. If a subsequent selection request signal is received for all or a portion of the information such as from another wireless device, to recover from a radio link transmission error, or both, the DFP node 452 may respond to such request using the information from its local information cache rather than forwarding the selection request signal towards a wireless device 101 acting as a distributor node 221 thereby avoiding the use of radio resources on the radio link serving such device.

An information tag is part of an information datagram that is used to identify the portion of information being exchanged. Further, an information tag is part of a distributor tag used in a distributor advertisement signal and is part of the selection tag used in a selection request signal. The information tag includes an information object identifier that is a reference to the information, a reference to an information container, or both. Further, the information tag may include other metadata that is helpful in the exchange of information. An information container may be semi-permanent such as a file, or transient such as a voice conversation.

The information object identifier is a label that can be agreed to by an information provider application and an information consumer application. A qualified information object identifier can be a definitive pointer to a source of the information. For instance, if the information is stored in a plurality of repositories, a qualified information object identifier can refer to the copy located at one of such repositories. A person of ordinary skill in the art will recognize that a qualified information object identifier can be represented in multiple forms. For instance, a qualified information object identifier can be represented using an absolute universal resource location ("URL") reference. For example, a qualified object identifier can use the form of "//RepositoryName/ObjectClass/ObjectName" such as "//example.com/documents/public/aFile.type". The term "RepositoryName" is the fully qualified domain name of an information repository such as "example.com". The term "ObjectClass" can represent the type of information object such as "documents/public". The term "ObjectName" is the name associated with the information or its container such as "aFile.type".

In another embodiment, a distributor node 221 may specify in an information advertisement signal all or a portion of an information repository that it is responsible for rather than a complete object name. Further, the distributor node 221 may include in the information advertisement signal an object class. For example, a first distributor node may issue an information advertisement signal such as "//example.com/documents/public," while a second distributor node may issue an information advertisement signal such as "//example.com/documents/private," and a third distributor node may issue an information advertisement signal such as "//example.com". When it encounters a selection request signal containing a qualified information object identifier, a propagator node 222 can use, for instance, a longest prefix match to correlate the selection request signal with the distributor advertisement signals. Therefore, the propagator node 222 can forward the selection request signal to the third distributor node for all information objects such as "example.com," which are not part of the "documents/public" or "documents/private" classes. Similarly, a selector node 223 may express interest in a group of information objects by including, for instance, the most significant portion of an information identifier in a selection request signal. For example, a selection request for "//example.com/documents/public" can match an information advertisement signal for objects of such object class in such information repository.

An unqualified information object identifier can be a reference to an information object that does not include a pointer to a source of the information. For instance, if the information is stored in a plurality of information repository nodes, an unqualified information object identifier may be used to select a copy located in any one of such repository nodes. It is important to recognize that an unqualified information object identifier can be used in a selection request signal, while a qualified information object identifier can be used in a selection request signal, an information advertisement signal, and an information datagram. A person of ordinary skill in the art will recognize that an unqualified information object identifier can be represented in multiple forms. For instance, an unqualified information object identifier can be represented using a relative URL reference. For example, the unqualified object identifier can use the form "ObjectClass/ObjectName" such as "documents/public/aFile.type". The term "ObjectClass" can be the type of information object such as "documents/public". The term "ObjectName" can be the name associated with the information or the information container such as "aFile.type". A wildcard character such as "*" may be used to match any information object within the "ObjectClass".

In another embodiment, for a selection request signal with an unqualified information object identifier, a propagator node 222 can use, for instance, a longest postfix match to correlate a selection request signal with a distributor advertisement signal. For example, a selection request signal such as "public/aFile.type" would match an information advertisement signal such as "//example.com/documents/public/aFile.type". However, such selection request signal would not match an information advertisement signal such as "//example.com/documents/private/aFile.type".

In another embodiment, if an information object is too large to be transported inside a single information datagram, then such object can be segmented into a series of information datagrams. The identity of the segment carried by an information datagram can be designated by adding a qualifier to the information tag such as "//RepositoryName/ObjectClass/ObjectName::SegmentID". In such example, the first segment of the information object could be, for example, "//example.com/documents/public/aFile.type::1".

Figure 8:
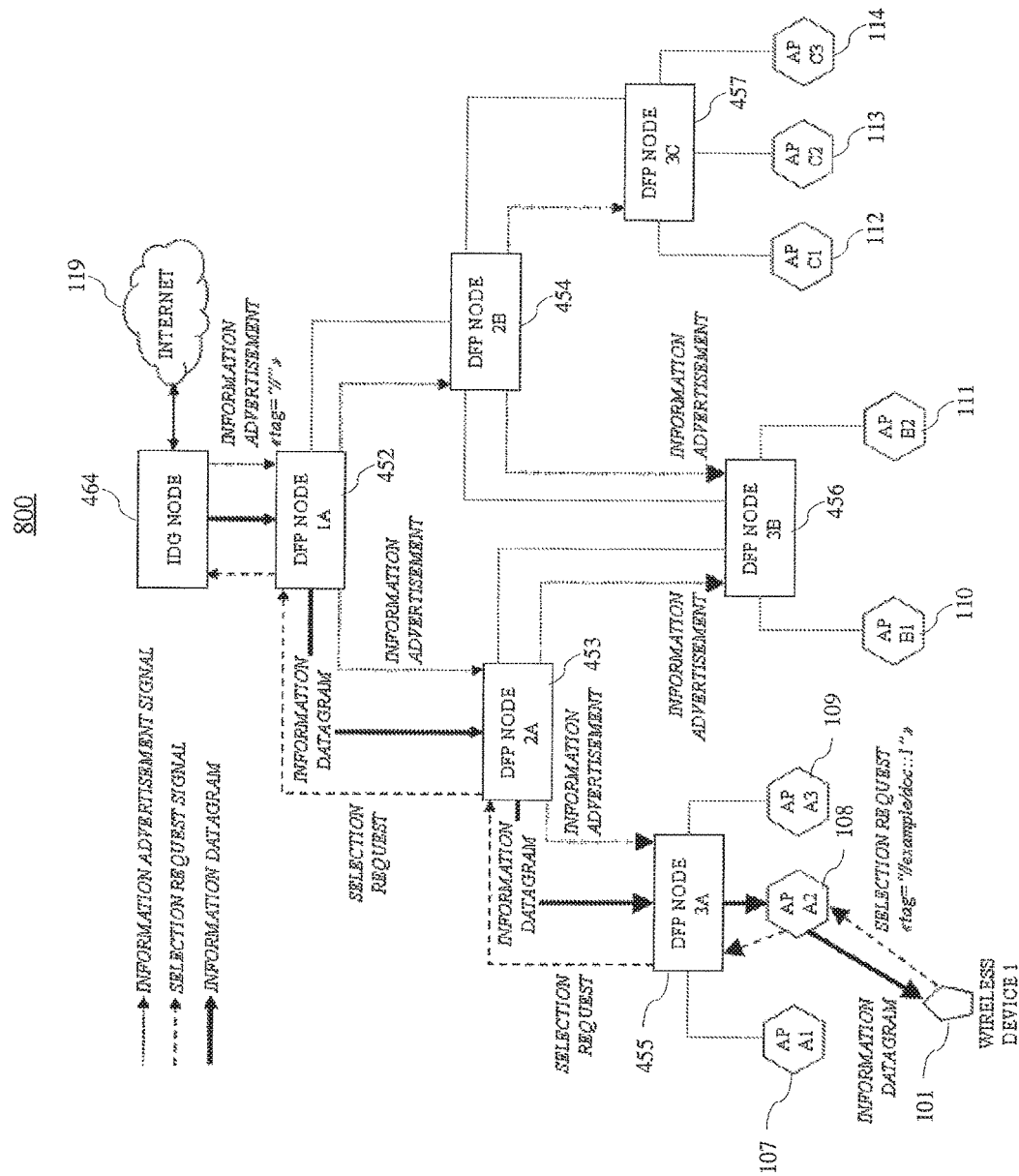
FIG. 8 illustrates one embodiment of downlink user plane data dissemination in a wireless communication system in accordance with various aspects set forth herein.

FIG. 8 illustrates one embodiment of downlink user plane data dissemination in a wireless communication system 800 in accordance with various aspects set forth herein. In FIG. 8, the wireless communication system 800 can allow a wireless device 101 to retrieve user plane information from an information repository within or attached to the Internet 119 using wireless device-induced dissemination mechanisms. The wireless communication system 800 can include a wireless device 101, one or more AP nodes 107 to 114, the Internet 119, one or more DFP nodes 452 to 457, an IDG node 464, or any combination thereof. In this embodiment, the DFP nodes 452 to 457 can be organized in a hierarchical fashion. A person of ordinary skill in the art will recognize that a plurality of DFP nodes can be organized in many different ways including in a mesh structure according to, for instance, local network engineering practices. In this embodiment, the wireless device 101 is attached to the AP node 108.

In the current embodiment, the IDG node 464 acting as a proxy distributor node can advertise itself as the default information repository for this RAN by generating an information advertisement signal. For example, the IDG node 464 can generate an information advertisement signal with the distributor tag set to "//," which is the root of the information identifier name space. Such advertisement can be sent to its neighbor DFP nodes 452.

In FIG. 8, after receiving the information advertisement signal, the DFP node 452 can record the distributor tag of the information advertisement signal, an identifier of the neighbor interface module over which the information advertisement signal was received in its distributor routing table, or both. The DFP node 452 can forward the information advertisement signal to each of its neighbor DFP nodes 453 and 454. Such process continues until the DFP nodes 453 and 454 acting as a propagator node in the RAN have been updated with the information advertisement signal. For example, the DFP node 456 can receive the same information advertisement signal over two different links, which indicates that it has a plurality of routes back to the IDG node 464. Routing metrics such as cost, bandwidth, occupancy, hop count, other metric, or any combination thereof may be used to determine which route has preference.

In this embodiment, the wireless device 101 can generate a selection request signal to retrieve information. For example, an application running on wireless device 101 can generate a selection request signal to retrieve information in the information container "doc" from the information repository at "example". Further, the wireless device 101 can generate a selection request signal for the first portion in the information container "//example/doc::1". The wireless device 101 can forward the selection request signal to its serving AP node 108. The AP node 108 can forward the selection request signal to its neighbor DFP node 455.

In FIG. 8, the DFP node 455 can receive the selection request signal over its corresponding neighbor interface module and can determine whether all or a portion of the selection request signal matches an entry in its information cache. Further, if the selection request signal includes a qualified information object identifier, the DFP node 455 can perform a longest prefix search of its distributor routing table to match, for instance, the entry for "//". In its selection routing table, the DFP node 455 can record the selection tag, an identifier of the neighbor interface module over which the selection request signal was received, or both. The DFP node 455 can forward the selection request signal over the neighbor interface module identified in its distributor routing table. For example, the DFP node 455 forwards the selection request signal over the interface module identified in its distributor routing table for the "//" entry.

Such process can be repeated at each of the intermediate DFP nodes 452 and 453 until the selection request signal reaches the source of the corresponding information advertisement signal, for instance, the IDG node 464. For example, as the source of the corresponding information advertisement signal, the IDG node 464 extracts the information object identifier from the selection request signal. Further, the IDG node 464 acting as an ALG node 573 retrieves the information from the actual information repository in the Internet 119 using, for instance, HTTP.

In this embodiment, the source of the corresponding information advertisement signal such as the IDG node 464 can segment the requested information if necessary and can construct information datagrams with information tags that can include the information object identifier used to identity the portion of information contained in the information datagram. The source of the corresponding information advertisement signal such as the IDG node 464 can forward the information datagram to its neighbor DFP node 452. The DFP node 452 can attempt to match the information tag in the information datagram with an entry in its selection routing table. If a match is made, the DFP node 452 can forward the information datagram over the neighbor interface module recorded in the corresponding entry of its selection routing table. Further, the DFP node 452 may store the information datagram in its information cache in order to satisfy future requests from, for instance, the wireless device 101 to recover a lost information datagram, another wireless device, or both. The DFP node 452 can remove the satisfied entry from its selection routing table. Such process can be repeated at each of the intermediate DFP nodes 453 and 455 until the information datagram reaches the AP node 108 serving wireless device 101. The information datagram can be transmitted over the radio link between the AP node 108 and wireless device 101 using procedures appropriate to the radio access technology.

Figure 9:
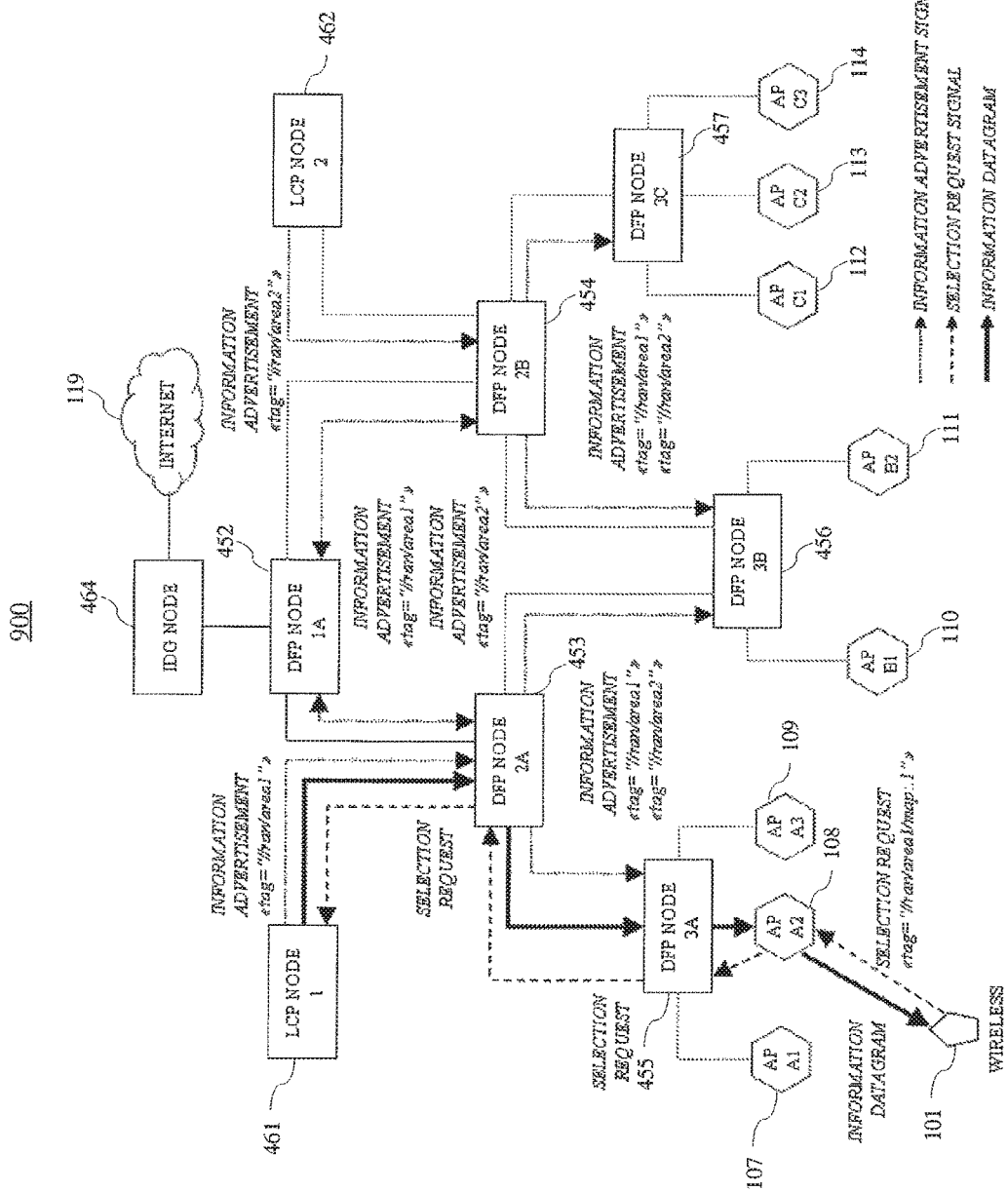
FIG. 9 illustrates one embodiment of downlink control plane information distribution in a wireless communication system in accordance with various aspects set forth herein.

FIG. 9 illustrates one embodiment of downlink control plane information distribution in a wireless communication system 900 in accordance with various aspects set forth herein. In FIG. 9, the wireless communication system 900 can allow a wireless device 101 to retrieve control plane information from an LCP node 461 and 462 using wireless device-induced dissemination mechanisms. The system 900 can include a wireless device 101, one or more AP nodes 107 to 114, the Internet 119, one or more DFP nodes 452 to 457, one or more LCP nodes 461 and 462, an IDG node 464, or any combination thereof. The DFP nodes 452 to 457 can be organized in a hierarchical fashion. A person of ordinary skill in the art will recognize that DFP nodes can be organized in many different ways including in a mesh structure according to, for instance, local network engineering practices. In this embodiment, the wireless device 101 is attached to AP node 108. Further, the wireless communication system 900 is equipped with two LCP nodes 461 and 462. The LCP node 461 can distribute information for the region identified as "area1", and the LCP node 462 can distribute information for the region identified as "area2".

In this embodiment, the LCP node 461 acting as a distributor node 221 can advertise itself as the information repository for certain information by generating an information advertisement signal, which includes a distributor tag. For example, the LCP node 461 acting as a distributor node 221 can advertise itself as the information repository for control information in "area1" of the RAN by generating an information advertisement signal with the distributor tag set to "//ran/area1". The LCP node 461 can send such signal to its neighbor DFP node 453. The neighbor DFP node 453 can record the distributor tag, an identifier of the neighbor interface module over which the information advertisement signal was received in its distributor routing table, or both.

Similarly, the LCP node 462 acting as a distributor node 221 can advertise itself as the information repository for certain information by generating an information advertisement signal, which includes a distributor tag. For example, the LCP node 462 can advertise itself as the information repository for control information in "area2" of the RAN by generating an information advertisement signal with the distributor tag set to "//ran/area2". The LCP node 462 can send such signal to its neighbor DFP node 454. The neighbor DFP node 454 can record the distributor tag, an identifier of the neighbor interface module over which the information advertisement signal was received in its distributor routing table, or both.

In FIG. 9, the DFP nodes 452 to 457 can propagate the information advertisement signals from the LCP nodes 461 and 462 until, for instance, all of the DFP nodes 452 to 457 acting as a propagator node 222 have been updated. For instance, as the information advertisement signal from the LCP node 462 propagates to the DFP node 453 via the DFP node 452, the DFP node 453 can forward the information advertisement signal from LCP nodes 461 and 462 to its downstream DFP nodes 455 and 456. Since the information advertisement signal from the LCP node 462 can be received from the DFP node 452, the DFP node 453 can forward an information advertisement signal from the LCP node 461 to the DFP node 452. The DFP node 454 can perform similar actions when it receives the information advertisement signal from LCP node 461 via DFP node 452.

In this embodiment, the wireless device 101 acting as a selector node can generate a selection request signal to retrieve information. For example, an application running on wireless device 101 can make a request to retrieve information in the information container "map," which is related to the RAN region "area1". Further, the wireless device 101 can generate a selection request signal for the first portion in the information container "//ran/area1/map::1". The wireless device 101 can forward the selection request signal to its serving AP node 108. The AP node 108 can forward the selection request signal to its neighbor DFP node 455.

In the current embodiment, the DFP node 455 can receive the selection request signal over one of its neighbor interface modules and can determine whether all or a portion of such signal matches an entry in its information cache. For example, the DFP node 455 determines that it does not have this portion of information in its information cache. Further, since the selection request signal includes a qualified information object identifier, the DFP node 455 performs a longest prefix search of its distributor routing table to match the entry for "//ran/area1". In its selection routing table, the DFP node 455 can record the selection tag of the selection request signal, an identifier of the neighbor interface module over which the selection request signal was received, or both. The DFP node 455 can forward the selection request signal over the neighbor interface module identified in its distributor routing table. For example, the DFP node 455 forwards the selection request signal over the neighbor interface module identified in its distributor routing table for the "//ran/area1" entry. Such process can be repeated at each of the intermediate DFP nodes until the selection request reaches the source of the corresponding information advertisement signal, for instance, the LCP node 461.

In FIG. 9, the LCP node 461 can segment the requested information if necessary and can construct information datagrams with information tags that can include the information object identifier used to identify the portion of information contained in the information datagram. The LCP node 461 can forward the information datagram to its neighbor DFP node 453. The DFP node 453 can attempt to match the information tag in the information datagram with an entry in its selection routing table. When a match is made, the DFP node 453 can forward the information datagram over the neighbor interface module recorded in the corresponding entry of its selection routing table. Further, the DFP node 453 may store the information datagram in its information cache in order to satisfy future requests, for instance, from the wireless device 101 to recover a lost information datagram; from another wireless device; or both. The DFP node 453 can remove the matched entry from its selection routing table. Such process can be repeated at each of the intermediate DFP nodes until the information datagram reaches the AP node 108 serving the wireless device 101. The information datagram can be transmitted over the radio link between the AP node 108 and the wireless device 101 using procedures appropriate to the radio access technology.

Figure 10:
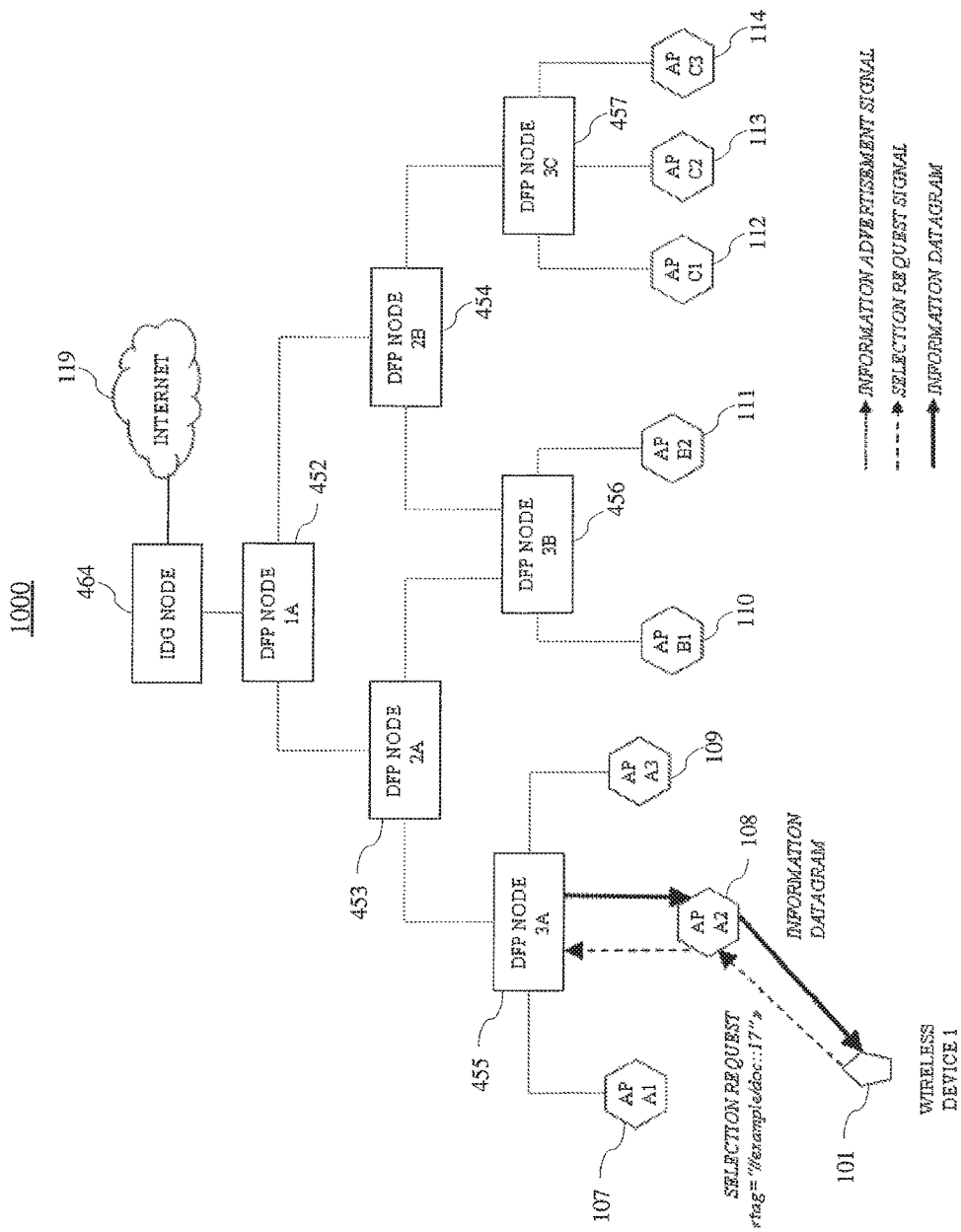
FIG. 10 illustrates one embodiment of recovering a lost downlink information datagram in a wireless communication system in accordance with various aspects set forth herein.

FIG. 10 illustrates one embodiment of recovering a lost downlink information datagram in a wireless communication system 1000 in accordance with various aspects set forth herein. In FIG. 10, the wireless communication system 1000 can allow a wireless device 101 to retrieve information lost during transmission. The wireless communication system 1000 can include a wireless device 101, one or more AP nodes 107 to 114, the Internet 119, one or more DFP nodes 452 to 457, an IDG node 464, or any combination thereof. In this embodiment, the DFP nodes 452 to 457 can be organized in a hierarchical fashion. A person of ordinary skill in the art will recognize that the DFP nodes can be organized in many different ways including in a mesh structure according to, for instance, local network engineering practices. In this embodiment, the wireless device 101 is attached to the AP node 108. A DFP node may choose to store a portion of information in its information cache subject to cache management policies, source caching rules, or both. In this embodiment, cache management policies have been established to enable information caching in edge DFP nodes 455 to 457, wherein an edge DFP node is a DFP node that is directly connected to an AP node. Further, in this embodiment, information caching has been disabled at interior DFP nodes 452 to 454, wherein an interior DFP node is not an edge DFP node.

In this embodiment, after not receiving an information datagram in response to a selection request signal, the wireless device 101 can generate a new selection request signal for the missing portion in the information container such as the information datagram represented by "//example/ doc::17". The wireless device 101 can forward the new selection request signal to its serving AP node 108. The AP node 108 can forward such signal to its neighbor DFP node 455.

In the current embodiment, the DFP node 455 can receive the selection request signal over one of its neighbor interface modules and can determine whether all or a portion of such signal matches an entry in its information cache. If the DFP node 455 determines that it does have this portion of information in its information cache, then the DFP node 455 can discard the selection request signal and can forward the corresponding cached information datagram to the AP node 108 over the neighbor interface module on which the selection request signal was received. Such information datagram can be transmitted over the radio link between the AP node 108 and the wireless device 101 using procedures appropriate to the radio access technology.

Figure 11:
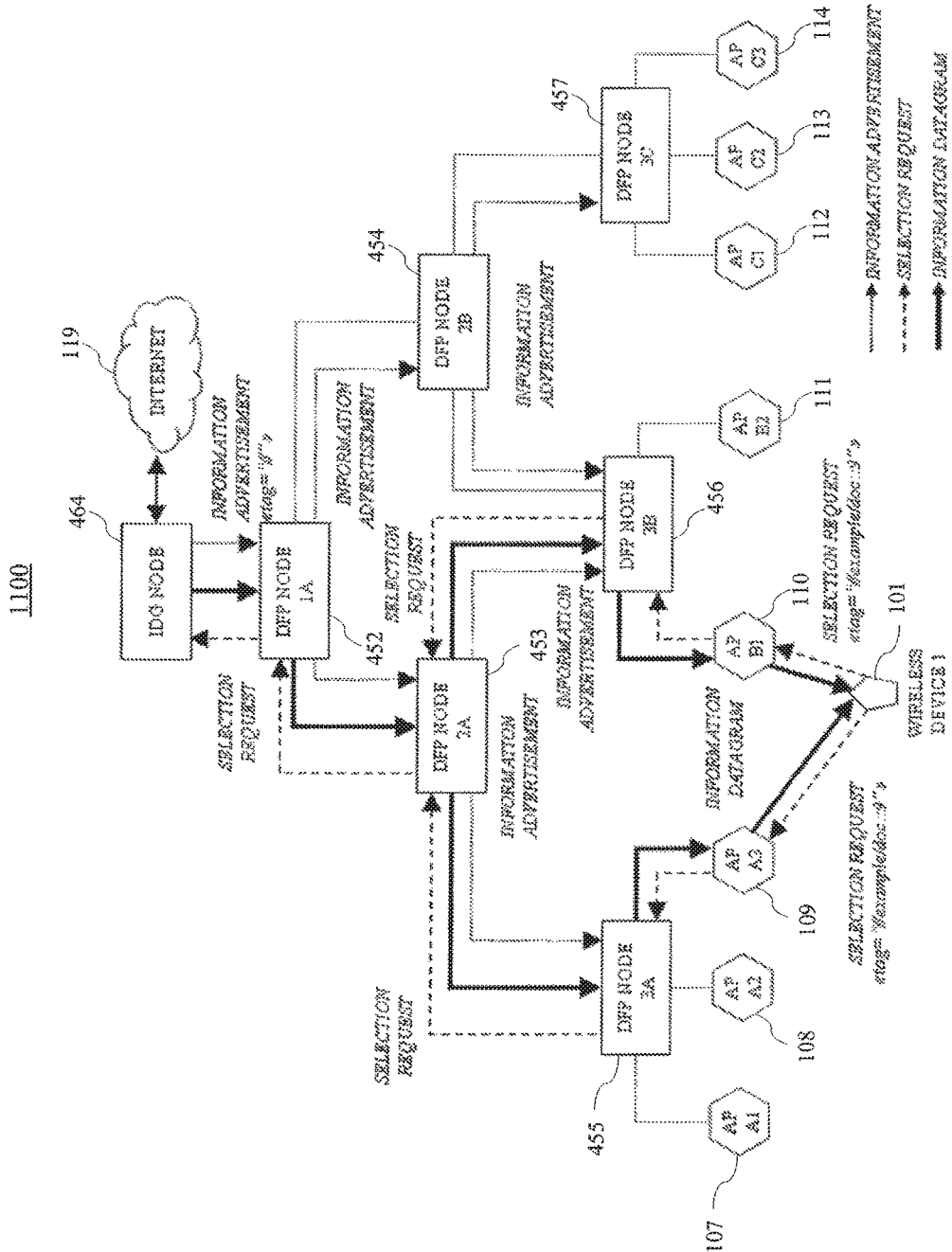
FIG. 11 illustrates one embodiment of performing a handover during downlink user plane data dissemination in a wireless communication system in accordance with various aspects set forth herein.

FIG. 11 illustrates one embodiment of performing a handover during downlink user plane data dissemination in a wireless communication system 1100 in accordance with various aspects set forth herein. In FIG. 11, the wireless communication system 1100 can allow a wireless device 101 to retrieve user plane information from an information repository within or attached to the Internet 119 via a plurality of the AP nodes 109 to 110. The wireless communication system 1100 can include a wireless device 101, one or more AP nodes 107 to 114, the Internet 119, one or more DFP nodes 452 to 457, an IDG node 464, other elements, or any combination thereof. In this embodiment, the DFP nodes 452 to 457 can be organized in a hierarchical fashion. A person of ordinary skill in the art will recognize that the DFP nodes can be organized in many different ways including in a mesh structure according to, for instance, local network engineering practices. In this embodiment, the wireless device 101 is initially attached to the AP node 109. As part of the handover process, the wireless device 101 can select another AP node 110 to handle one or more of its data flows.

In this embodiment, the IDG node 464 acting as a proxy distributor node 221 can advertise itself as the default information repository for this RAN by generating an information advertisement signal. For instance, the IDG node 464 can generate an information advertisement signal with the distributor tag set to "//," which is the root of the information identifier name space in this example. Such advertisement can be sent to its neighbor DFP node 452.

In FIG. 11, the DFP node 452 can record the distributor tag, an identifier of the neighbor interface module over which the information advertisement signal was received, or both in its distributor routing table. The DFP node 452 can forward the information advertisement signal to each of its neighbor DFP nodes 453 and 454. Such process continues until all DFP nodes acting as a propagator node in the RAN have been updated with the information advertisement signal. For example, the DFP node 456 can receive the same information advertisement signal over two different links, which indicates that it has a plurality of routes back to the IDG node 464. Routing metrics such as cost, bandwidth, occupancy, hop count, other metric, or any combination thereof may be used to determine which route is preferred.

In this embodiment, the wireless device 101 can generate a selection request signal to retrieve information. For example, an application running on the wireless device 101 can make a request to retrieve information in the information container "doc" from the information repository at "example". Further, the wireless device 101 can generate a selection request signal for a portion in the information container "//example/doc::9". The wireless device 101 can forward such request to its serving AP node 109 and target AP node 110. Each AP node 109 and 110 can forward the selection request signal to its neighbor DFP node 455 and 456, respectively.

In FIG. 11, each DFP node 455 and 456 can receive the selection request signal over one of its neighbor interface modules and can determine whether all or a portion of such signal matches an entry in its information cache. In its selection routing table, each DFP node 455 and 456 can record the selection tag, an identifier of the neighbor interface module over which the selection request signal was received, or both. Each DFP node 455 and 456 can forward the selection request signal over the neighbor interface module identified in its distributor routing table. For example, each DFP node 455 and 456 forwards the selection request signal over the interface module identified in its distributor routing table for the "//" entry.

In FIG. 11, after receiving the first selection request signal, the DFP node 453 can record the selection request tag in its selection routing table, an identifier of the neighbor interface module over which such request was received, or both. The DFP node 453 can forward the selection request signal over the neighbor interface module recorded in its distributor routing table, for instance, the neighbor interface module corresponding to the "//" entry. After receiving a second selection request over a different neighbor interface module, the DFP node 453 can determine that it has an outstanding selection request for the information portion stored in its selection routing table. The DFP node 453 can record an identifier of the second neighbor interface module in the corresponding selection routing table entry, discard the selection request signal, or both.

After receiving the selection request signal, the IDG node 464 can retrieve the information from the actual information repository and can construct one or more information datagrams, which can be forwarded to its neighbor DFP node 452. The DFP node 452 can match the information tag in the information datagram with an entry in its selection routing table and can forward the information datagram to its neighbor DFP node 453 over the neighbor interface module recorded in the corresponding entry of its selection routing table.

In the current embodiment, the DFP node 453 can match the information tag in the information datagram with an entry in its selection routing table. After finding a match, the DFP node 453 can determine that a plurality of selection request signals for the same information has been received over a plurality of its neighbor interface modules. The DFP node 453 can replicate the information datagram and can forward such datagram over each of its neighbor interface modules recorded in the corresponding entry of its selection routing table. After forwarding the information datagram, the DFP node 453 can remove the satisfied entry from its selection routing table. Such process can be repeated at each of the intermediate DFP nodes 455 and 456 until the information datagram reaches the serving AP node 109, the target AP node 110, or both.

If the wireless device 101 is still being served by the AP node 109, the information datagram can be transmitted over the radio link between the AP node 109 and the wireless device 101 using procedures appropriate to the radio access technology. The target AP node 110 may buffer its copy of the information datagram in anticipation of the arrival of the wireless device 101. If the wireless device has transitioned to being served by the AP node 110, the information datagram can be transmitted over the radio link between the AP node 110 and the wireless device 101 using procedures appropriate to that radio access technology. The previous serving AP node 109 may buffer its copy of the information datagram in anticipation of the return of the wireless device 101.

Figure 12:
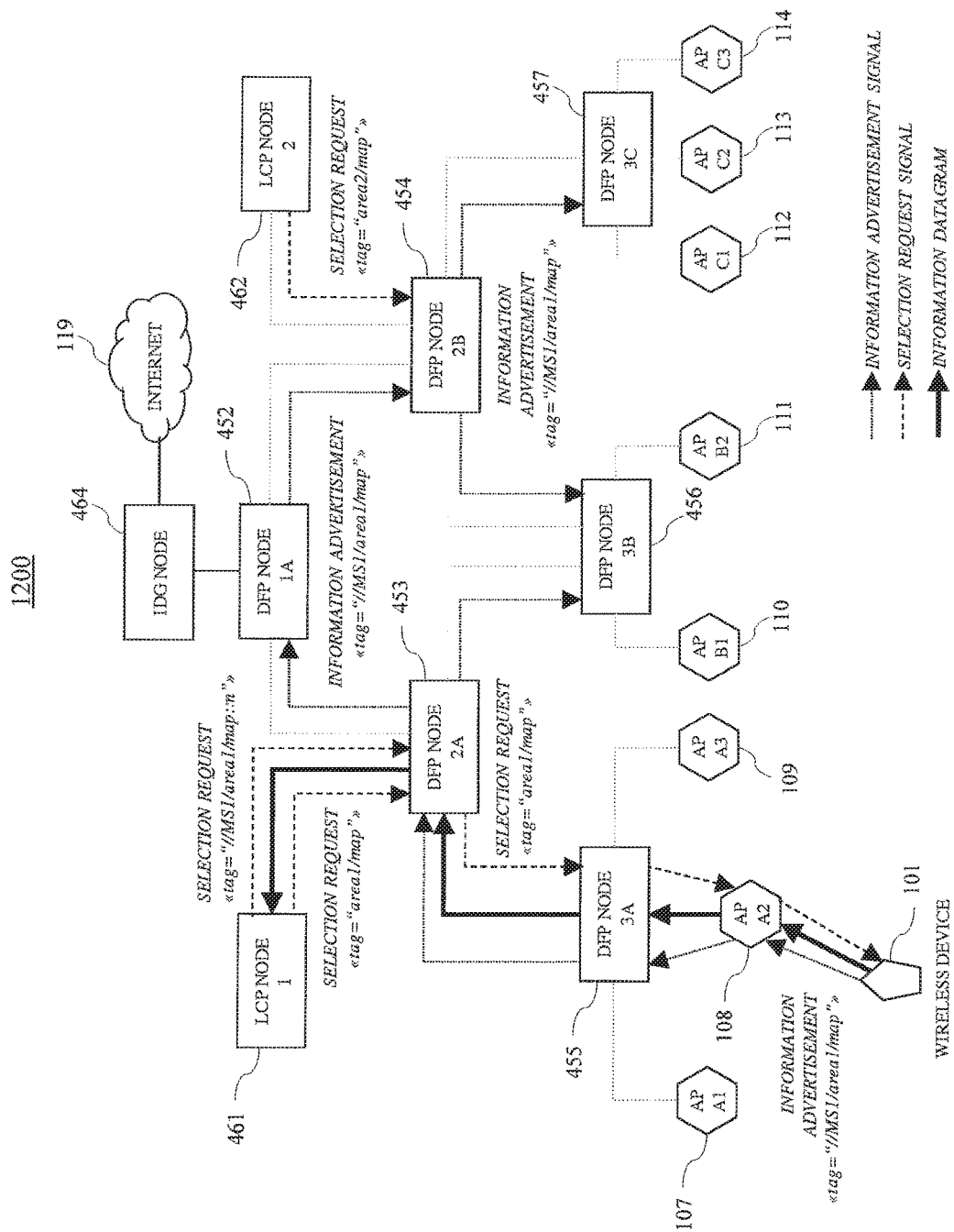
FIG. 12 illustrates one embodiment of uplink control plane information distribution in a wireless communication system in accordance with various aspects set forth herein.

FIG. 12 illustrates one embodiment of uplink control plane information distribution in a wireless communication system 1200 in accordance with various aspects set forth herein. In FIG. 12, the wireless communication system 1200 can allow a wireless device 101 to distribute control plane information that is gathered by one or more LCP nodes 461 and 462 within the RAN using wireless device-induced dissemination mechanisms. The LCP nodes 461 and 462 can collect such information using, for instance, a persistent selection request signal. The wireless communication system 1200 can include a wireless device 101, one or more AP nodes 107 to 114, the Internet 119, one or more DFP nodes 452 to 457, one or more LCP nodes 461 and 462, an IDG node 464, or any combination thereof. In this embodiment, the DFP nodes 452 to 457 can be organized in a hierarchical fashion. A person of ordinary skill in the art will recognize that the DFP nodes can be organized in many different ways including in a mesh structure according to, for instance, local network engineering practices. For this embodiment, the wireless device 101 is attached to the AP node 108. Further, the wireless communication system 1200 is equipped with two LCP nodes 461 and 462. The LCP node 461 includes information for the region identified as "area1," and the LCP node 462 includes information for the region identified as "area2".

In this embodiment, the LCP node 461 acting as a selector node 223 can send a persistent selection request signal to its neighbor DFP node 453 with, for instance, an unqualified selection tag such as for any information related to "area1/map". The DFP node 453 can consult its distributor routing table to find an entry that matches such request. If no entry is found and the selection request signal is marked as persistent, the DFP node 453 can record such request in its selection routing table along with an identifier of the neighbor interface module over which such request was received.

Similarly, the LCP node 462 can send a persistent selection request signal to its neighbor DFP node 454 with, for instance, an unqualified selection tag such as for any information related to "area2/map". The DFP node 454 can consult its distributor routing table to find an entry that matches such request. If no entry is found and the selection request signal is marked as persistent, DFP node 454 can record such request in its selection routing table, an identifier of the neighbor interface module over which such request was received, or both.

In FIG. 12, the wireless device 101 acting as a distributor node can advertise itself as, for instance, the information repository for certain wireless device-generated control information related to "area1" of the RAN by generating an information advertisement signal with the distributor tag set to "//MS1/area1/map". The information advertisement signal can be sent to the DFP node 455, which is the neighbor AP node 108 serving the wireless device 101.

In the current embodiment, the DFP node 455 acting as a propagator node can record the distributor tag, an identifier of the neighbor interface module over which the information advertisement signal was received in its distributor routing table, or both and can forward the advertisement to its neighbor DFP nodes 453 acting as a propagator node until all the DFP nodes 452 to 457 acting as a propagator node have been updated with the information advertisement signal. It is important to recognize that the DFP node 456 can receive the same information advertisement signal over two different neighbor interface modules indicating that it has multiple routes back to the wireless device 101 acting as a distributor node. Routing metrics such as cost, bandwidth, occupancy, hop count, other metric, or any combination thereof may be used to determine which route is preferred.

After updating its distributor routing table, the DFP node 453 can search its selection routing table to find whether it has a persistent selection request that matches the distributor tag in the information advertisement signal. If the selection tag includes an unqualified information object identifier, the DFP node 453 can use, for instance, a longest postfix search to make a match to the distributor tag. The DFP node 453 can recreate the original selection request signal and can forward it over the neighbor interface module recorded in its distributor routing table. For example, if the selection tag includes an unqualified information object identifier "area1/map," the DFP node 453 can use a longest postfix search to make a match to the distributor tag "//MS1/area1/map". Further, the DFP node 453 recreates the original selection request signal and forwards it over the neighbor interface module recorded in its distributor routing table for the "//MS1/area1/map" entry. If a selection request signal is authenticated with, for instance, a digital signature from the LCP node 461 acting as a selector node, then DFP node 453 acting as a propagator node may store the selection request signal rather than recreating it.

After receiving the selection request signal, the DFP node 455 can inspect its information cache to determine whether all or a portion of a cache entry matches all or a portion of the selection request signal. If the selection request signal includes an unqualified information object identifier, the DFP node 455 can perform a longest postfix search of its distributor routing table. For example, since the selection request signal includes an unqualified information object identifier, the DFP node 455 performs a longest postfix search of its distributor routing table to determine a match for the "//MS1/area1/map" entry. In its selection routing table, the DFP node 455 can record the selection request tag, an identifier of the neighbor interface module over which the selection request signal was received, or both. The DFP node 455 can forward the selection request signal over the neighbor interface module recorded in its distributor routing table such as for the "//MS1/area1/map" entry. For example, in its selection routing table, the DFP node 455 records the selection request tag and the identifier of the neighbor interface module over which the selection request signal was received. Further, the DFP node 455 forwards the selection request signal over the neighbor interface module recorded in its distributor routing table for the "//MS1/area1/map" entry. Such process can be repeated at each of the intermediate DFP nodes until the selection request signal reaches the source of the corresponding information advertisement signal, for instance, the wireless device 101 via its serving AP node 108.

In this embodiment, the wireless device 101 can segment the requested information if necessary and can construct information datagrams with information tags that can include the information object identifier used to identify the portion of information contained in the information datagram. The wireless device 101 can forward the information datagram to the next-hop DFP node 455 via the serving AP node 108 of the wireless device 101. The DFP node 455 can attempt to match the information tag in the information datagram with an entry in its selection routing table. When a match is made, the DFP node 455 can forward the information datagram over the neighbor interface module recorded in the corresponding entry of its selection routing table. Further, the DFP node 455 may store the information datagram in its information cache in order to satisfy future requests from, for instance, the LCP node 461 to recover a lost information datagram; from another wireless device; or both. The DFP node 455 can remove the satisfied entry from its selection routing table.

After receiving the information datagram, the DFP node 453 can match the information tag with an entry in its selection routing table and can forward the information datagram to the entity that requested such information, for instance, the LCP node 461. If the entry in its selection routing table is marked as a persistent selection request, then the DFP node 453 may not remove the entry from its selection routing table.

After receiving the information datagram, the LCP node 461 can inspect the information tag to determine which information repository is a source of the requested information. If additional portions of information are required, then the LCP node 461 can issue a subsequent selection request signal using, for instance, a qualified information object identifier. Such requests can be forwarded to the wireless device 101 by the intermediate DFP nodes using, for instance, a longest prefix search of their distributor routing tables. For example, the LCP node 461 inspects the information tag to determine that the information repository "MS-1" is a source of the requested information. Further, the LCP node 461 issues subsequent selection request signals using a qualified information object identifier of the form "//MS1/area1/map::n."

Figure 13:
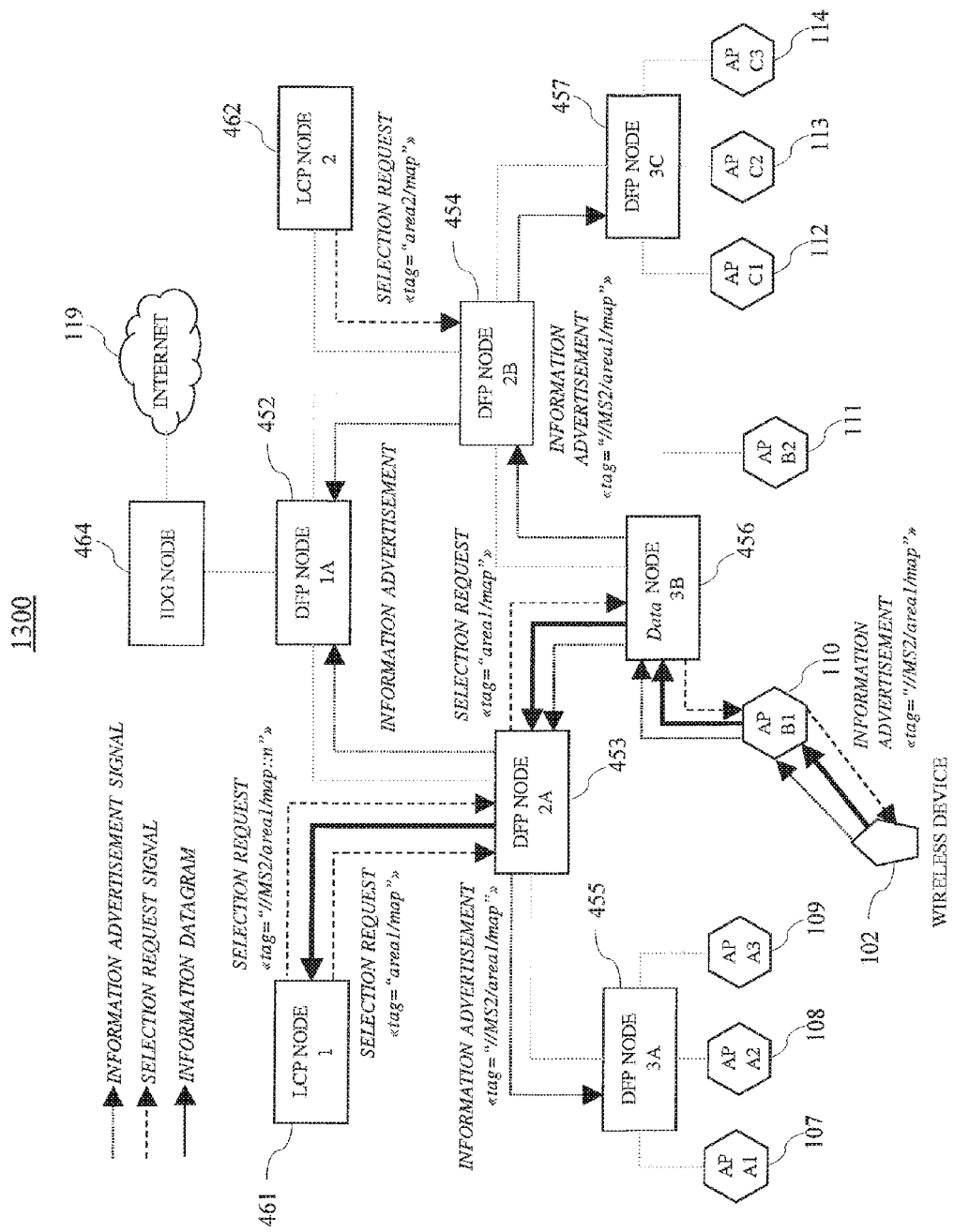
FIG. 13 illustrates another embodiment of uplink control plane information distribution in a wireless communication system in accordance with various aspects set forth herein.

FIG. 13 illustrates another embodiment of uplink control plane information distribution in a wireless communication system 1300 in accordance with various aspects set forth herein. In FIG. 13, the wireless communication system 1300 can allow a wireless device 102 to distribute control plane information that is gathered by one or more LCP nodes 461 and 462 within the RAN using wireless device-induced dissemination mechanisms. The LCP nodes 461 and 462 can collect such information using, for instance, a persistent selection request signal. The wireless communication system 1300 can include a wireless device 102, one or more AP nodes 107 to 114, the Internet 119, one or more DFP nodes 452 to 457, one or more LCP nodes 461 and 462, an IDG node 464, or any combination thereof. In this embodiment, the DFP nodes 452 to 457 can be organized in a hierarchical fashion. A person of ordinary skill in the art will recognize that DFP nodes can be organized in many different ways including in a mesh structure according to, for instance, local network engineering practices. For this embodiment, the wireless device 102 is attached to the AP node 110. Further, the wireless communication system 1300 is equipped with two LCP nodes 461 and 462. The LCP node 461 includes information for the region identified as "area1," and the LCP node 462 includes information for the region identified as "area1".

In this embodiment, a second wireless device 102 begins to advertise itself as, for instance, the information repository for certain wireless device-generated control information related to "area1" of the RAN by generating an information advertisement signal with the distributor tag set to "//MS2/area1/map". The information advertisement signal can be sent to the DFP node 456, which is connected to the AP node 110 serving the wireless device 102.

The DFP node 456 can record the distributor tag, an identifier of the neighbor interface module over which the information advertisement signal was received in its distributor routing table, or both. Further, the DFP node 456 can forward the information advertisement signal to its neighbor DFP nodes 453 and 454. Such process can continue until all of the DFP nodes acting as a propagator node 222 in the RAN have been updated with the information advertisement signal.

After updating its distributor routing table, the DFP node 453 can search its selection routing table and can determine if the persistent selection request matches the distributor tag in the information advertisement signal. If the selection tag included an unqualified information object identifier, then the DFP node 453 can use a longest postfix search to make a match to a distributor tag. The DFP node 453 can recreate the original selection request signal and can forward it over the neighbor interface module recorded in its distributor routing table. For example, since the selection tag includes an unqualified information object identifier of "area1/map," the DFP node 453 uses a longest postfix search to make a match to the distributor tag for "//MS2/area1/map". The DFP node 453 recreates the original selection request signal and forwards it over the neighbor interface module recorded in its distributor routing table for the "//MS2/area1/map" entry. Such process continues at each intermediate DFP node until the selection request signal is received by the wireless device 102 via the AP node 110.

In this embodiment, the wireless device 102 can segment the requested information if necessary and can construct information datagrams with information tags that can include the information object identifier used to identify the portion of information contained in the information datagram. The wireless device 102 can forward the information datagram to the next-hop DFP node 456 via the serving AP node 110 of the wireless device 102.

After receiving the information datagram, the LCP node 461 can inspect the information tag to determine that the information repository such as "MS-2" is also a source for the requested information. If additional portions of information are required, the LCP node 461 can issue a subsequent selection request signal using a qualified information object identifier such as "//MS2/area1/map::n." Such request can be forwarded to the wireless device 102 using the intermediate DFP nodes, wherein the intermediate DFP nodes can use, for instance, a longest prefix search of their distributor routing tables 343.

Figure 14:
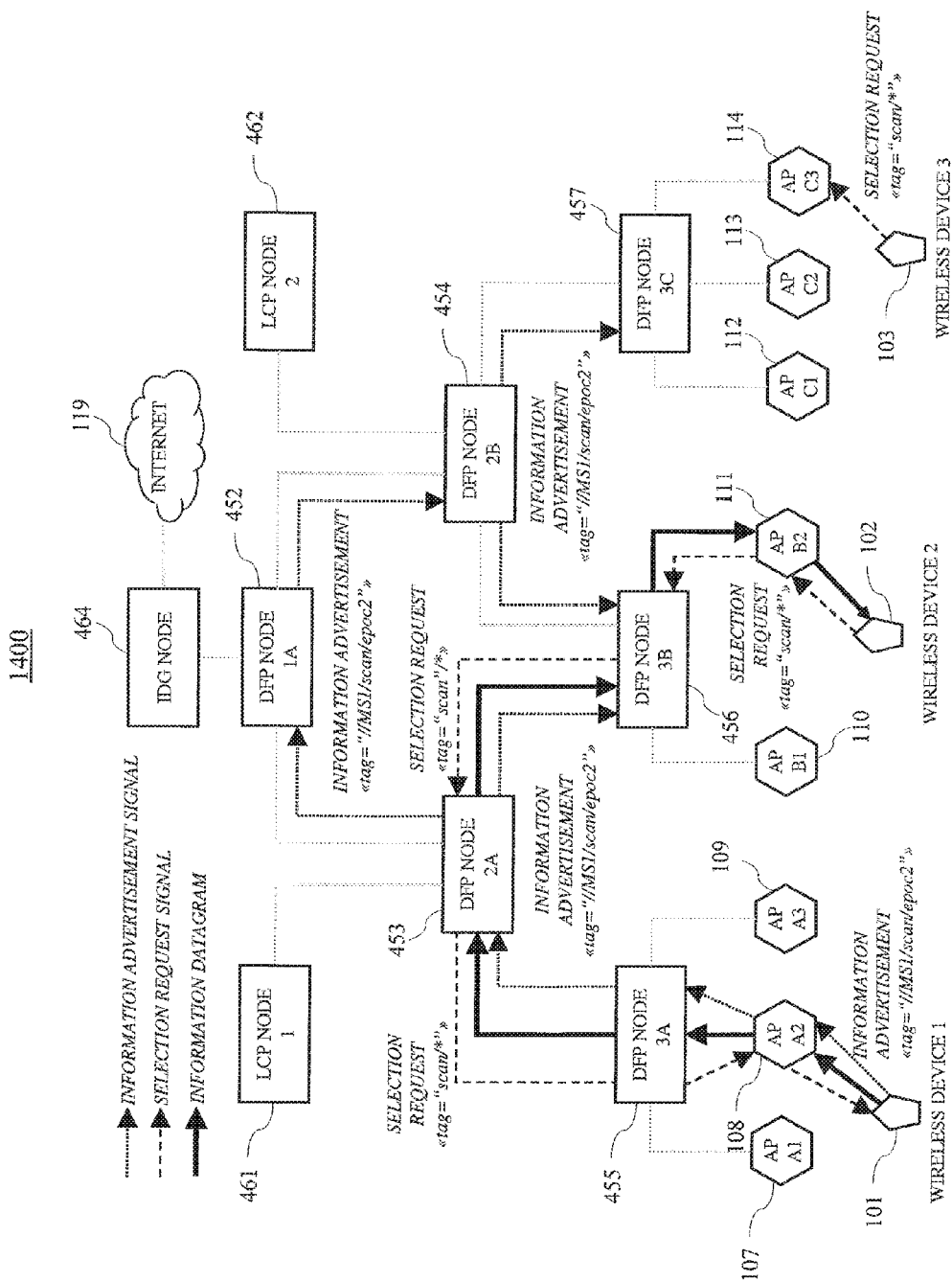
FIG. 14 illustrates one embodiment of mobile-to-mobile control plane information distribution in a wireless communication system in accordance with various aspects set forth herein.

FIG. 14 illustrates one embodiment of mobile-to-mobile control plane information distribution in a wireless communication system 1400 in accordance with various aspects set forth herein. In FIG. 14, the wireless communication system 1400 can allow information exchange between wireless devices 101 to 103 as they move between AP nodes 107 to 114. The wireless communication system 1400 can include one or more wireless devices 101 to 103, one or more AP nodes 107 to 114, the Internet 119, one or more DFP nodes 452 to 457, one or more LCP nodes 461 and 462, an IDG node 464, or any combination thereof. In this embodiment, the DFP nodes 452 to 457 can be organized in a hierarchical fashion. A person of ordinary skill in the art will recognize that DFP nodes can be organized in many different ways including in a mesh structure according to, for instance, local network engineering practices. For example, the wireless device 101 is attached to the AP node 108, the wireless device 102 is attached to the AP node 111, and the wireless device 103 is attached to the AP node 114.

In this embodiment, the wireless device 101 can advertise the availability of information that may be of interest to other wireless devices 102 and 103. It is important to recognize that any of the wireless devices 101 to 103 may advertise the availability of the same or different information at or near the same time, or at different times. Further, any of the wireless devices 101 to 103 may acquire, provide, request, or any combination thereof the same or different information at or near the same times or at different times.

In FIG. 14, the wireless device 101 acting as a distributor node 221 can advertise itself as the information repository for certain wireless device-generated, time-stamped control information by issuing an information advertisement signal with a distributor tag set to, for instance, "//MS1/scan/epoc2". Such advertisement can be sent to its neighbor DFP node 455, which is connected to the AP node 108 serving the wireless device 101. The DFP node 455 can record the distributor tag, an identifier of the neighbor interface module over which the information advertisement signal was received in its distributor routing table, or both. Further, the DFP node 455 can forward the information advertisement signal to its neighbor DFP nodes 453 until, for instance, all DFP nodes acting as a propagator node 222 in the RAN are updated with the information advertisement signal. It is important to recognize that the DFP node 456 can receive the same information advertisement signal over a plurality of different neighbor interface modules indicating that it has a plurality of routes back to the wireless device 101 acting as a distributor node 221. Routing metrics such as cost, bandwidth, occupancy, hop count, other metric or any combination thereof may be used to determine which route is preferred. For example, the route from the DFP node 456 to its neighbor DFP node 453 is assumed to be the preferred route to the wireless device 101 acting as a distributor node 221.

In this embodiment, the wireless device 102 can generate a selection request signal to retrieve information. For example, an application running on the wireless device 102 can make a request to retrieve information associated with, for instance, an object class such as "scan". The wireless device 102 can generate a selection request signal using, for instance, the unqualified selection tag "scan/*" and can forward the selection request signal to its serving AP node 111. The AP node 111 can forward the selection request signal to its neighbor DFP node 456.

In FIG. 14, the DFP node 456 can inspect its information cache and can determine whether it has the requested information cached. If the selection request signal includes an unqualified information object identifier, then the DFP node 456 can perform a longest postfix search of its distributor routing table to determine a match. For example, since the selection request signal includes an unqualified information object identifier, the DFP node 456 performs a longest postfix search of its distributor routing table and makes a match to the "//MS1/scan/epoc2" entry. In its selection routing table, the DFP node 456 can record the selection tag, an identifier of the neighbor interface module over which the selection request signal was received, or both. The DFP node 456 can forward the selection request signal over the neighbor interface module recorded in its distributor routing table, for instance, the "//MS1/scan/epoc2" entry. Such process can be repeated at each of the intermediate DFP nodes 453 and 455 until the selection request signal reaches the wireless device 101 acting as a distributor node 221 of the corresponding information advertisement signal, via its serving AP node 108.

In this embodiment, the wireless device 101 can segment the requested information if necessary and can construct information datagrams with information tags that include the information object identifier, the identity of the portion of information contained in the information datagram, or both. The wireless device 101 can forward the information datagram to its next-hop DFP node 455 via its serving AP node 108. The DFP node 455 can attempt to match the information tag in the information datagram with an entry in its selection routing table. When a match is made, the DFP node 455 can forward the information datagram over the neighbor interface module recorded in the corresponding entry of its selection routing table. The DFP node 455 can remove the satisfied entry from its selection routing table. Further, the DFP node 455 may store the information datagram in its information cache in order to satisfy future requests from, for instance, the wireless device 102 to recover a lost information datagram, another wireless device, or both. The caching of an information datagram may be subject to, for instance, cache management policies, source caching rules defined by a distributor node, or both. In this example, policies have been defined to enable caching in both edge DFP nodes, which are directly connected to AP nodes, and interior DFP nodes, which are not edge DFP nodes. Such process can be repeated at each of the intermediate DFP nodes 453 and 456 until the information datagram reaches the wireless device 102, which is the source of the corresponding selection request signal, via its serving AP node 111.

After receiving the information datagram, the wireless device 102 can inspect the information tag to determine which information repository is the source of the information. For example, the wireless device 102 can inspect the information tag to determine that the information repository such as "MS-1" is the source of this information. If additional portions of information are required, the wireless device 102 can issue subsequent selection request signals using, for instance, a qualified information object identifier such as of the form "//MS1/scan/epoc2::n". Such requests can be forwarded to the wireless device 101 by the intermediate DFP nodes 453 and 456 using, for instance, a longest prefix search of their distributor routing tables.

In FIG. 14, the wireless device 103 can attempt to obtain information associated with, for instance, the object class "scan". The wireless device 103 can generate a selection request signal using, for instance, the unqualified selection tag "scan/*" and can forward the selection request signal to its serving AP node 114. The AP node 114 can forward the selection request signal to its neighbor DFP node 457. It is important to recognize that the wireless device 103 may request, retrieve or both information from the wireless device 101 coincident with the request, retrieval or both of information by the wireless device 102.

Figure 15:
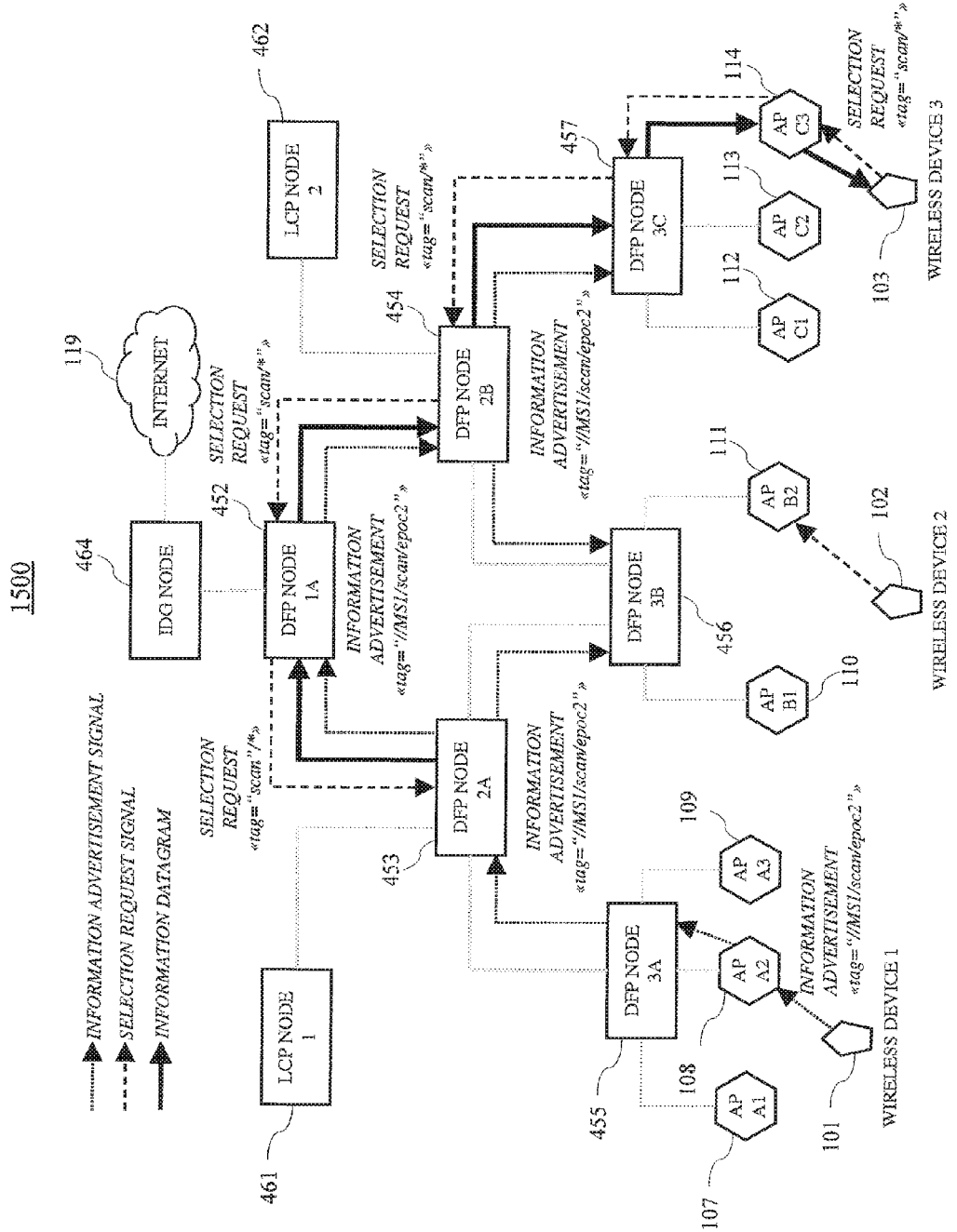
FIG. 15 illustrates another embodiment of mobile-to-mobile control plane information distribution in a wireless communication system in accordance with various aspects set forth herein.

FIG. 15 illustrates another embodiment of mobile-to-mobile control plane information distribution in a wireless communication system 1500 in accordance with various aspects set forth herein. In FIG. 15, the wireless communication system 1500 can allow information exchange between wireless devices 101 to 103 as they move between AP nodes 107 to 114. The wireless communication system 1500 can include one or more wireless devices 101 to 103, one or more AP nodes 107 to 114, the Internet 119, one or more DFP nodes 452 to 457, one or more LCP nodes 461 and 462, an IDG node 464, or any combination thereof. In this embodiment, the DFP nodes 452 to 457 can be organized in a hierarchical fashion. A person of ordinary skill in the art will recognize that the DFP nodes can be organized in many different ways including in a mesh structure according to, for instance, local network engineering practices. For example, the wireless device 101 is attached to the AP node 108, the wireless device 102 is attached to the AP node 111, and the wireless device 103 is attached to the AP node 114.

If requests for the same or similar information overlap within, for instance, a cache timeout period, then some requests may be satisfied using information cached by one of the intermediate DFP nodes 454 and 452, thereby avoiding the use of radio resources on the radio link serving wireless device 101. The DFP node 457 can inspect its information cache and can determine whether it has the information requested by the wireless device 103 cached. If the selection request signal from the wireless device 103 includes an unqualified information object identifier, the DFP node 457 can perform, for instance, a longest postfix search of its distributor routing table to determine a match. For example, the DFP node 457 inspects its information cache and determines that the information is not cached. If the selection request signal includes an unqualified information object identifier, then the DFP node 457 can perform a longest postfix search of its distributor routing table and can find a match to, for instance, the "//MS1/scan/epoc2" entry. In its selection routing table, the DFP node 457 can record the selection tag, an identifier of the neighbor interface module over which the selection request signal was received, or both. The DFP node 457 can forward the selection request signal over the neighbor interface module recorded in its distributor routing table such as for the "//MS1/scan/epoc2" entry. Such process can be repeated at each of the intermediate DFP nodes 454 and 452 until the selection request reaches the DFP node 453 acting as a distributor node 221 for the corresponding information.

In this embodiment, the DFP node 453 can inspect its information cache and can determine whether it has the portion of information stored in its local information cache. If the portion of information is stored in its local information cache, then the DFP node 453 can discard the selection request signal without, for instance, entering the selection request signal into its selection routing table and can forward the cached information datagram over the neighbor interface on which such request was received. For example, the DFP node 453 inspects its information cache and determines that it has the portion of information stored in its local information cache. Since the portion of information is stored in its local information cache, the DFP node 453 discards the selection request signal and forwards the cached information datagram over the neighbor interface on which such request was forwarded from the DFP node 452.

The DFP node 452 can attempt to match the information tag in the information datagram with an entry in its selection routing table. If a match is made, then the DFP node 452 can forward the information datagram over the neighbor interface module recorded in the corresponding entry of its selection routing table. Further, the DFP node 452 may store the information datagram in its information cache for a period of time in order to satisfy any future requests from, for instance, the wireless device 103 if it needs to recover a lost datagram; another wireless device; or both. The DFP node 452 can remove the satisfied entry from its selection routing table. Such process can be repeated at each of the intermediate DFP nodes 454 and 457 until the information datagram reaches the requesting wireless device 103 via its serving AP node 114.

After receiving the information datagram, the wireless device 103 can inspect the information tag to determine the source of the information. For example, after receiving the information datagram, the wireless device 103 inspects the information tag and determines that the information repository "MS-1" is the source for this information. If additional portions of information are required, then the wireless device 103 can issue a subsequent selection request using a qualified information object identifier such as of the form "//MS1/scan/epoc2::n". Such request can be forwarded towards the wireless device 101 by the intermediate DFP nodes using, for instance, a longest prefix search of their distributor routing tables. It is important to recognize that such requests may be satisfied using information cached by one of the DFP nodes.

Figure 16:
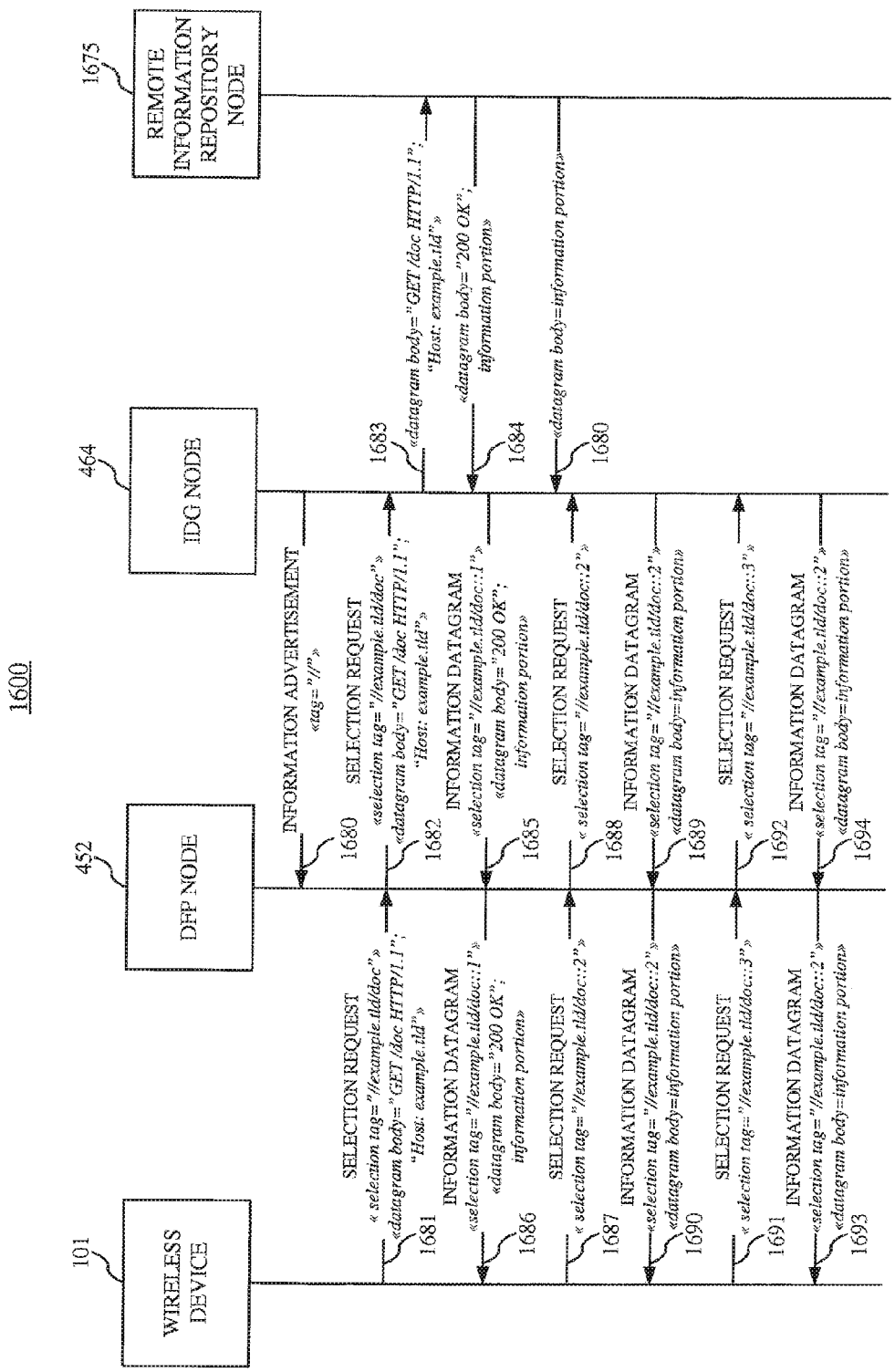
FIG. 16 illustrates one embodiment of a method of exchanging user plane information using HTTP in a wireless communication system in accordance with various aspects set forth herein.

FIG. 16 illustrates one embodiment of a method 1600 of exchanging user plane information using HTTP in a wireless communication system in accordance with various aspects set forth herein. Various illustrative structures are shown in the upper portion of FIG. 16 to facilitate the understanding of the method 1600. Accordingly, the method 1600 includes communication amongst a wireless device 101, a DFP node 452, an IDG node 464, a remote information repository node 1675, or any combination thereof. A person of ordinary skill in the art will recognize that the exchange of HTTP signaling messages in FIG. 16 represents a portion of a complete HTTP exchange.

In FIG. 16, the method 1600 can allow the IDG node 464 acting as a proxy distributor node 221 to advertise itself as the default information repository for the IDD 450 by generating an information advertisement signal with, for instance, the distributor tag set to "//," which is the root of the information identifier namespace. The IDG node 464 can send the information advertisement signal to its neighbor DFP node 452, as represented by 1680. Further, the information advertisement signal can be propagated to other DFP nodes in the IDD 450.

The wireless device 101 can send a selection request signal to retrieve information in, for instance, the information container "doc" from the remote information repository node 1675 at "example.tld". For example, wireless device 101 generates a selection request signal with the selection tag set to "//example.tld/doc" and with the "HTTP GET" header included in the body of the selection request signal. The wireless device 101 can forward the selection request signal to its next-hop DFP node 452, as represented by 1681. The DFP node 452 can record the selection request signal in its selection routing table and can forward the selection request signal towards IDG node 464 according to the routing information contained in its distributor routing table, as represented by 1682. Such process can be repeated at each of the intermediate DFP nodes until the selection request signal reaches the IDG node 464, which is the source of the corresponding information advertisement.

In this embodiment, the IDG node 464 acting as an ALG node can extract the header from the selection request signal and can forward the selection request signal to the remote information repository node within or attached to the Internet 119. For example, the IDG node 464 acting as an ALG node extracts the "HTTP GET" header from the selection request signal and forwards the selection request signal to the remote information repository node 1675 within or attached to the Internet, as represented by 1683, using the standard Internet protocol. The remote information repository node 1675 can return an HTTP status header, the requested information, or both. For example, the remote information repository node 1675 returns the "200 OK" HTTP status header along with a portion of the requested information, as represented by 1684, in an IP packet.

The IDG node 464 can construct an information datagram with an information tag, which can include the information object identifier, the identity of the portion of information contained in the information datagram, or both. Further, the body of the information datagram can contain, for instance, the first portion of the requested information, the HTTP status header, or both. The IDG node 464 can forward the information datagram to its neighbor DFP node 452, as represented by 1685. The DFP node 452 can forward the information datagram towards the wireless device 101 according to the routing information contained in its selection routing table, as represented by 1686.

The IDG node 464 may continue to receive portions of the requested information from the remote information repository node 1675 in IP packets, as represented by 1680. If more information is available, then the wireless device 101 can generate a selection request signal for a subsequent portion of information by setting the selection tag, as represented by 1687. For example, the wireless device 101 generates a selection request signal for a subsequent portion of information by setting the selection tag to "//example.tld/doc::n". The DFP node 452 can forward the selection request signal towards the IDG node 464 according to the routing information contained in its selection routing table, as represented by 1688.

After receiving the selection request signal, the IDG node 464 can construct an information datagram with an information tag, which can include an information object identifier, the identity of the portion of information contained in the information datagram, or both. The body of the information datagram can contain the requested portion of information. The IDG node 464 can forward the information datagram to its neighbor DFP node 452, as represented by 1689. The DFP node 452 can forward the information datagram towards the wireless device 101 according to the routing information contained in its selection routing table, as represented by 1690. Such process can be repeated until the wireless device 101 receives all of the requested information, as represented by 1691 to 1694.

Figure 17:
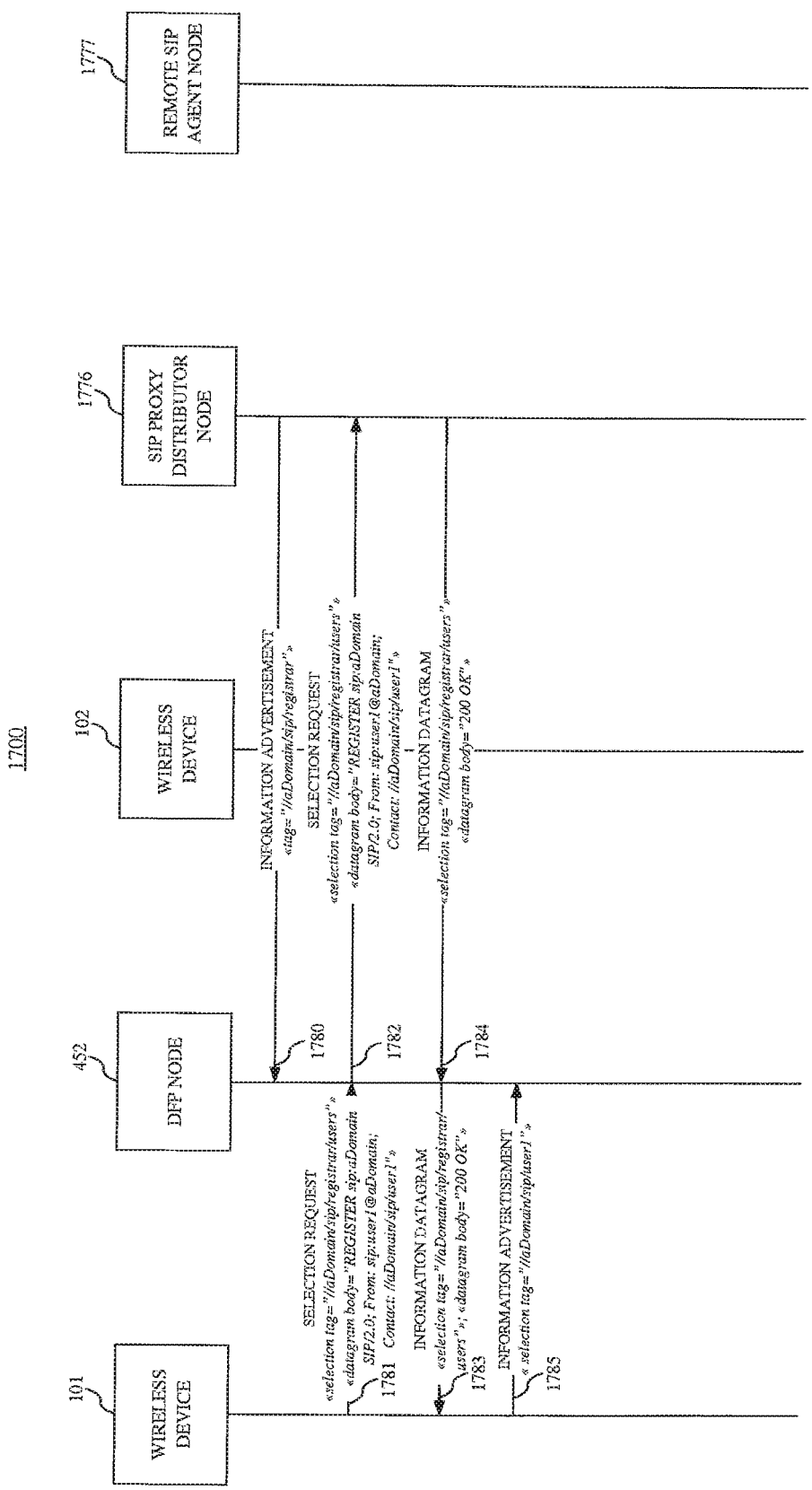
FIG. 17 illustrates one embodiment of a method of exchanging user plane information using SIP to perform registration in a wireless communication system in accordance with various aspects set forth herein.

FIG. 17 illustrates one embodiment of a method 1700 of exchanging user plane information using SIP to perform registration in a wireless communication system in accordance with various aspects set forth herein. Various illustrative structures are shown in the upper portion of FIG. 17 to facilitate the understanding of the method 1700. Accordingly, the method 1700 includes communication amongst a wireless device 101, a DFP node 452, another wireless device 102, a SIP proxy distributor node 1776, a remote SIP agent node 1777, or any combination thereof. A person of ordinary skill in the art will recognize that the exchange of SIP signaling messages in FIG. 17 represents a portion of a complete SIP exchange.

In this embodiment, the local SIP proxy distributor node 1776 acting as a distributor node 221 can advertise itself as the SIP registrar for the IDD 450 by generating an information advertisement with the distributor tag set to, for instance, "//aDomain/sip/registrar". The information advertisement signal can be sent to the neighbor DFP node 452 or the local SIP proxy distributor node 1776, as represented by 1780. The information advertisement signal can propagate to all of the DFP nodes in the IDD.

The wireless device 101 can register with the local SIP proxy distributor node 1776 by generating a selection request signal using a specific selection tag. For example, the wireless device 101 using the SIP uniform resource identifier ("URI") of "sip:user1@aDomain," registers with the local SIP proxy distributor node 1776 by generating a selection request signal with the selection tag set to "//aDomain/sip/registrar/user1". Further, the body of the selection request signal contains a "SIP REGISTER" message with the Contact header set to "//aDomain/sip/user1". The wireless device 101 can forward the selection request signal to its next-hop DFP node 452, as represented by 1781. The DFP node 452 can record the selection request signal in its selection routing table. Further, if the selection request signal includes a qualified information object identifier, then the DFP node 452 can perform, for instance, a longest prefix search of its distributor routing table to match the entry for all or a portion of the selection request signal. After a longest prefix match in its distributor routing table, the DFP node 452 can forward the selection request signal, as represented by 1782, towards the local SIP proxy distributor node 1776. Such process can be repeated at each of the intermediate DFP nodes until the selection request signal reaches the local SIP proxy distributor node 1776, which is the source of the registrar information advertisement signal.

The local SIP proxy distributor node 1776 can record the registration and can construct an information datagram with an information tag that reflects the received selection tag "//aDomain/sip/registrar/user1". Further, the body of the information datagram can contain the SIP status header such as the "200 OK" header. The local SIP proxy distributor node 1776 can forward the information datagram to its neighbor DFP node 452, as represented by 1784, where the information datagram can be forwarded by each intermediate DFP node 452 towards the wireless device 101 according to the routing information contained in its selection routing table 343, as represented by 1783.

The wireless device 101 acting as a distributor node 221 can advertise itself as the source of information for the SIP user by generating an information advertisement with the distributor tag set to, for instance, "//aDomain/sip/user1". The information advertisement signal can be sent to the next-hop DFP node 452, as represented by 1785, and can be propagated to all of the DFP nodes in the IDD 450.

Figure 18:
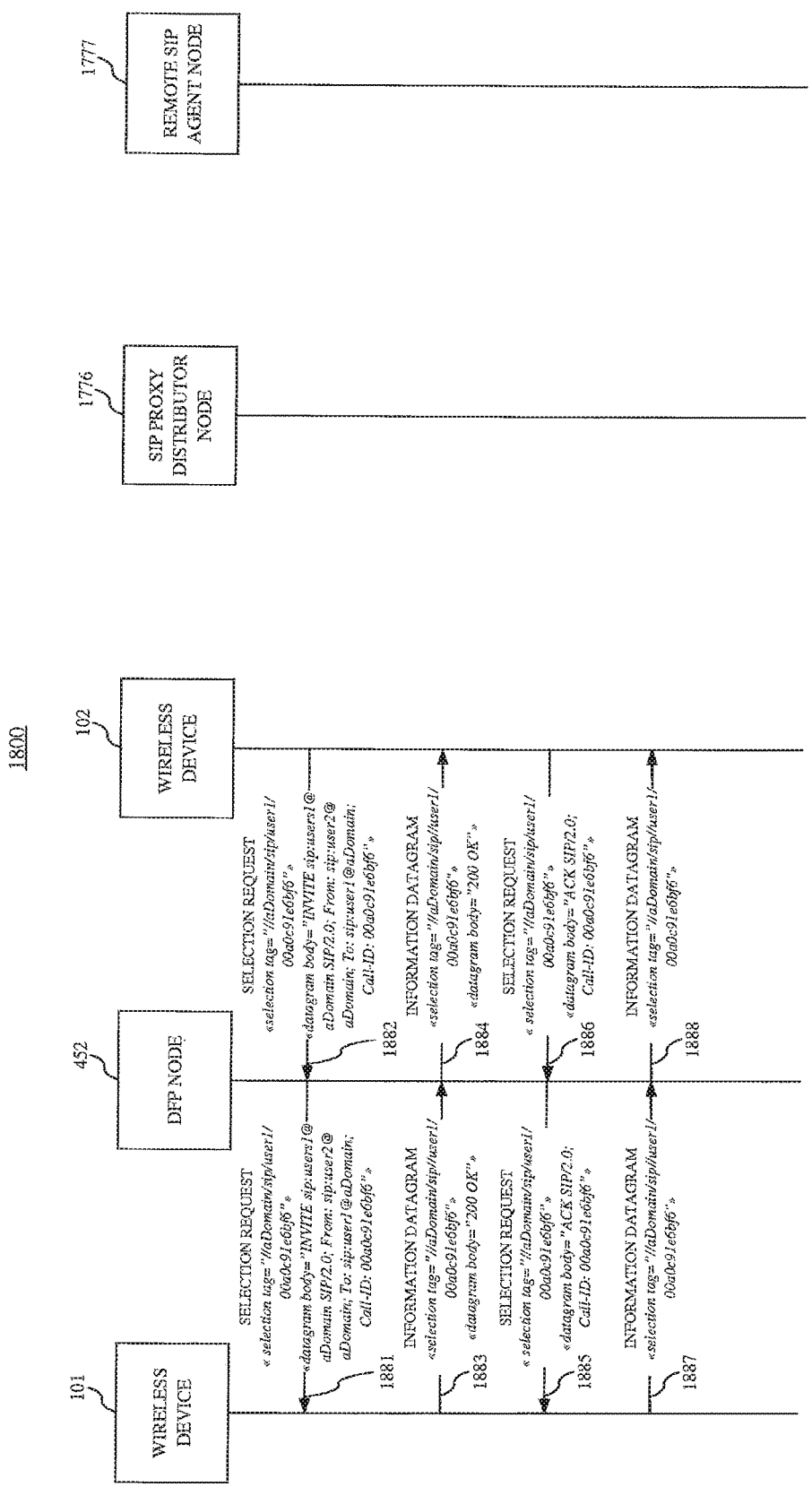
FIG. 18 illustrates one embodiment of a method of exchanging user plane information using SIP to perform a data session with a local peer in a wireless communication system in accordance with various aspects set forth herein.

FIG. 18 illustrates one embodiment of a method 1800 of exchanging user plane information using SIP to perform a data session with a local peer in a wireless communication system in accordance with various aspects set forth herein. Various illustrative structures are shown in the upper portion of FIG. 18 to facilitate the understanding of the method 1800. Accordingly, the method 1800 includes communication amongst a wireless device 101, a DFP node 452, another wireless device 102, a SIP proxy distributor node 1776, a remote SIP agent node 1777, or any combination thereof. A person of ordinary skill in the art will recognize that the exchange of SIP signaling messages in FIG. 18 represents a portion of a complete SIP exchange.

Another wireless device 102 within the IDD can initiate a SIP data session with the wireless device 101 by generating a selection request signal with a specific selection tag. For example, the wireless device 102 uses the SIP URI of "sip:user2@aDomain" to initiate a SIP data session with the wireless device 101 by generating a selection request signal with the selection tag set to "//aDomain/sip/user1/callID", where "callID" is the unique call identifier assigned to such session by the wireless device 102. The body of the selection request signal can contain the first or only portion of a SIP message such as the "INVITE" message. The wireless device 102 can forward the selection request signal to its next-hop DFP node 452, as represented by 1882. The DFP node 452 can record all or a portion of the selection request signal in its selection routing table. Further, if the selection request signal includes a qualified information object identifier, then the DFP node 452 can perform, for instance, a longest prefix search of its distributor routing table to match the entry for all or a portion of the selection request signal. After a longest prefix match in its distributor routing table, the DFP node 452 can forward the selection request signal towards the wireless device 101. Such process can be repeated at each of the intermediate DFP nodes until, for instance, the selection request signal reaches the wireless device 101, the source of the information advertisement signal such as for "user1", as represented by 1881.

The wireless device 101 can construct an information datagram with an information tag that reflects the received selection tag. Further, the body of the information datagram can contain a SIP status header such as "200 OK," any associated session description protocol ("SDP") parameters, or both. The wireless device 101 can forward the information datagram to its neighbor DFP node 452, as represented by 1883. Further, the DFP node 452 can forward the information datagram towards the wireless device 102 according to the routing information contained in its selection routing table, as represented by 1884.

The wireless device 102 can complete the three-way SIP handshake by sending a selection request signal containing, for instance, a SIP "ACK" message in the body of the selection request signal and the selection tag set to "//aDomain/sip/user1/callID", as represented by 1885 and 1886. After receiving the selection request signal, the wireless device 101 can respond to such request by sending an information datagram with, for instance, an empty body to the wireless device 102, as represented by 1887 and 1888.

Figure 19:
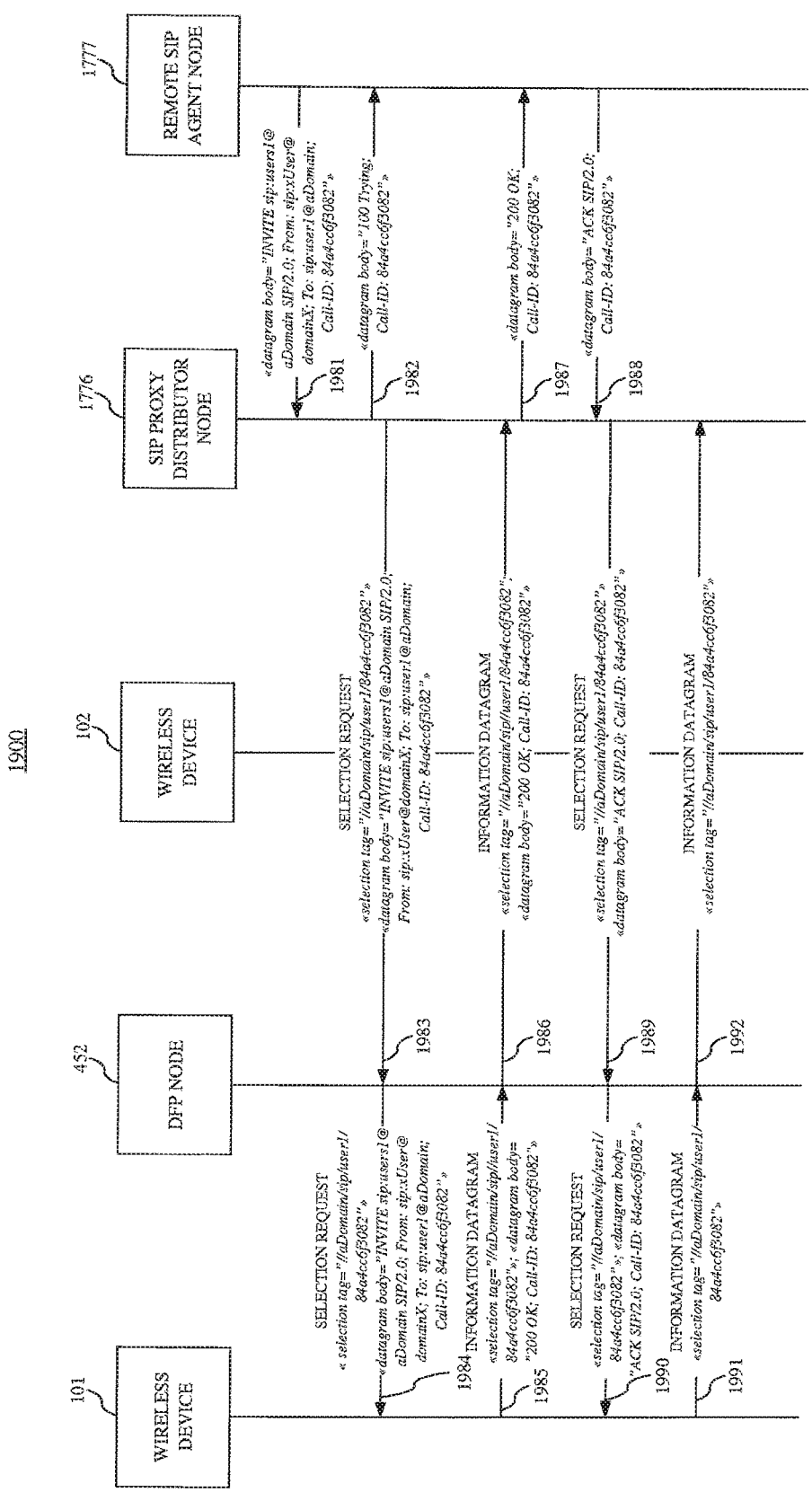
FIG. 19 illustrates one embodiment of a method of exchanging user plane information using SIP to perform a data session with a remote peer in a wireless communication system in accordance with various aspects set forth herein.

FIG. 19 illustrates one embodiment of a method 1900 of exchanging user plane information using SIP to perform a data session with a remote peer in a wireless communication system in accordance with various aspects set forth herein. Various illustrative structures are shown in the upper portion of FIG. 19 to facilitate the understanding of the method 1900. Accordingly, the method 1900 includes communication amongst a wireless device 101, a DFP node 452, another wireless device 102, a SIP proxy distributor node 1776, a remote SIP agent node 1777, or any combination thereof. A person of ordinary skill in the art will recognize that the exchange of SIP signaling messages in FIG. 19 represents a portion of a complete SIP exchange.

In this embodiment, the remote SIP agent node 1777, which resides outside the IDD, can initiate a SIP session with the wireless device 101 by sending a SIP message via the SIP proxy distributor node 1776. For example, the remote SIP agent node 1777 initiates a SIP session with the wireless device 101 by sending a SIP "INVITE" message to the SIP URI of "sip:user1@aDomain" via the SIP proxy distributor node 1776 for the domain "aDomain", as represented by 1981. The SIP proxy distributor node 1776 can send a SIP status message to the remote SIP agent node 1777 to indicate that the session is proceeding. For example, the SIP proxy distributor node 1776 sends a SIP "100 Trying" message to the remote SIP agent node 1777 to indicate that the session is proceeding, as represented by 1982.

The SIP proxy distributor node 1776 can consult its registration database to determine the contact address associated with the requested SIP URI. The SIP proxy distributor node 1776 can use the contact address to generate a selection request signal with the selection tag set to, for instance, "//aDomain/sip/user1/callID", with the first or only portion of the SIP "INVITE" message in the body of the selection request signal, or both, where the "callID" is the unique call identifier assigned to such session by the remote SIP agent node 1777. The SIP proxy node 1776 can forward the selection request signal to its neighbor DFP node 452, as represented by 1983. After receiving the selection request signal, the neighbor DFP node 452 can record the selection request signal in its selection routing table. Further, if the selection request signal includes a qualified information object identifier, then the DFP node 452 can perform, for instance, a longest prefix search of its distributor routing table to match the entry for all or a portion of the selection request signal. After a longest prefix match in its distributor routing table, the DFP node 452 can forward the selection request signal towards wireless device 101, as represented by 1984. Such process can be repeated at each of the intermediate DFP nodes until, for instance, the selection request signal reaches the wireless device 101, the source of the information advertisement signal for "user1".

The wireless device 101 can construct an information datagram with an information tag that reflects the received selection tag. Further, the body of the information datagram can contain the SIP status header such as "200 OK," the associated SDP parameters, or both. The wireless device 101 can forward the information datagram to its next-hop DFP node 452, as represented by 1985. The next-hop DFP node 452 can forward the information datagram towards the SIP proxy distributor node 1776 according to the routing information contained in its selection routing table, as represented by 1986.

The SIP proxy distributor node 1776 can extract the SIP message from the information datagram and can forward the SIP message to the remote SIP agent node 1777, as represented by 1987. For example, the SIP proxy distributor node 1776 extracts the "200 OK" SIP message from the information datagram and forwards such message to the remote SIP agent node 1777.

The remote SIP agent node 1777 can complete the three-way SIP handshake by, for instance, sending a SIP ACK message to the SIP proxy distributor node 1776, as represented by 1988.

The SIP proxy distributor node 1776 can generate a selection request signal containing the SIP ACK message in the body of such request with a selection tag set to, for instance, "//aDomain/sip/user1/Call-ID". The selection request signal can be sent to the neighbor DFP node 452 and can be forwarded towards the wireless device 101 using, for instance, a longest prefix match in its distributor routing table, as represented by 1989 and 1990.

After receiving the SIP ACK message, the wireless device 101 can respond to the selection request by sending, for instance, an information datagram with an empty body, as represented by 1991 and 1992.

In another embodiment, a selector node can issue a selector advertisement signal, which is substantially equivalent to a selection request signal. Unlike a selection request signal, which can be forwarded through the network along a backward path defined by a distributor advertisement signal, a selector advertisement signal is distributed to all propagator nodes in the network. The neighbor interface module over which the selector advertisement signal is received can be recorded by each propagator node in its selection routing table, which is analogous to a distributor routing table by defining a forwarding path back to the originating selector node of the selector advertisement signal. After receiving a distributor advertisement signal, the propagator node can attempt to match the distributor advertisement signal with an entry in its selection routing table. If a match is found, then the propagator node can forward a selection request signal to the distributor node. The resulting information datagram generated by the distributor node can follow the path defined by the selection routing table back to the original selector node.

In another embodiment, to minimize the number of responses received by a selector node from a plurality of propagator nodes, a distributor advertisement signal may not be forwarded beyond one or more propagator nodes at the edge of the network.

In another embodiment, the persistent selection request signal can take on the role of a distributor advertisement selection signal and can be stored locally by a propagator node at the edge of the network in a similar fashion. Typically, a distributor advertisement signal can be forwarded between propagator nodes and can be distributed throughout the network of interconnected propagator nodes on the back of an interior gateway protocol ("IGP"). In one definition, an IGP is a protocol used for exchanging routing information between gateways within an autonomous network. However, in this method a distributor advertisement signal can also be forwarded to a neighbor selector node if, for instance, the information tag in the distributor advertisement signal matches a distributor advertisement selection signal stored in the selection routing table of the propagator node. A matching entry can remain in the selection routing table, subject to any lifetime policies, to match a distributor advertisement signal from another distributor node. The advantage of such method includes the ability of the selector node to control the rate of information transfer. Further, such method allows the wireless device to, for instance, select information from a specific distributor node and determine when to receive such information. By doing so, the wireless device can mitigate the potential burst of associated information datagrams, which may result from a persistent selection request signal.

In previous embodiments, a propagator node can maintain per-flow state information in its selection routing table in order to route an information datagram back to the requesting selector node. Alternatively, in another embodiment, the reverse path can be appended to each selection request signal as it passes through each propagator node, allowing a distributor node, an intermediate propagator node using an information cache, or both to return an information datagram by copying the reverse path into a source routing header of the information datagram.

In another embodiment, IP addresses can be used as a distributor tag, selector tag, information tag, or any combination thereof. Such a method is similar to that used in Cellular IP, which is a micro-mobility protocol that provides seamless mobility support in limited geographical areas as described by Campbell et al., *Design, Implementation, and Evaluation of Cellular IP*, IEEE personal Comm., 2000, http://citeseerx.ist.psu.edu/viewdoc/summary-?doi=10.1.1.31.6029. In this method, a "RepositoryName" in a qualified tag is of the form "[dstIP;srcIP]". Packets from a particular source may be selected with a tag of the form "[;srcIP]". Packets to a particular destination may be selected with a tag of the form "[dstIP;]".

For downlink traffic, an IDG can advertise reachability information for traffic destined to an IP destination address subnet such as "[x.y.0.0/16;]". A wireless device can select traffic from a specific IP destination address "[x.y.a.b;]". For example, a distributor tag can be of form "//[47.0.0.0/24;]/". Further, a selector tag can be of the form "//[47.1.2.3;]/".

For uplink traffic, a wireless device can advertise traffic from a assigned IP source address "[;x.y.a.b]". An IDG can select traffic from wireless devices within an IP source address subnet such as "[;x.y.0.0/16]". For example, a distributor tag can be of the form "//[;192.128.10.11]/". Further, a selector tag can be of the form "//[;192.128.0.0/16]/".

Figure 20:
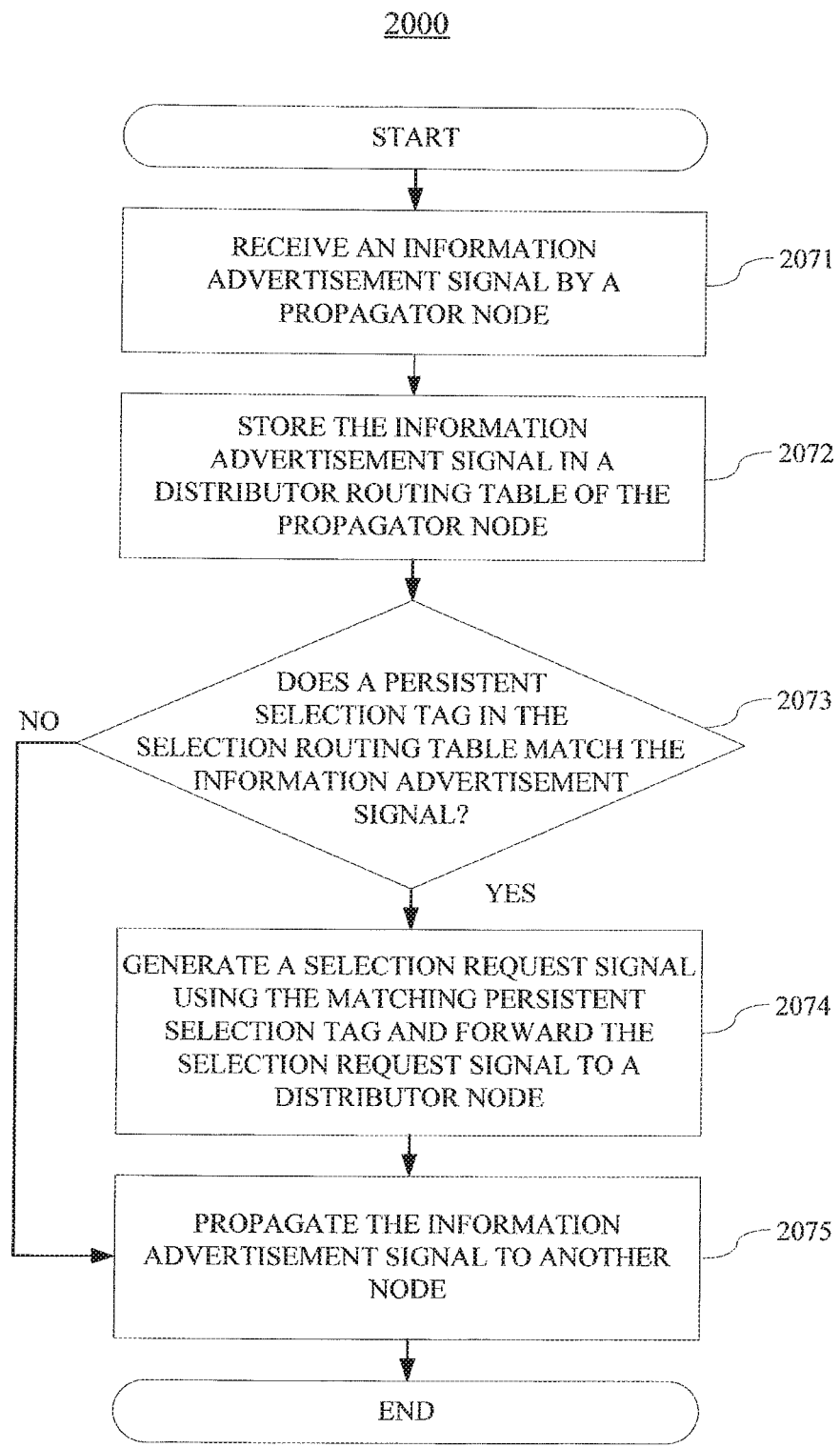
FIG. 20 shows a flow chart of one embodiment of a method of information distribution in a wireless communication system in accordance with various aspects set forth herein.

FIG. 20 shows a flow chart of one embodiment of a method 2000 of information distribution in a wireless communication system in accordance with various aspects set forth herein. In FIG. 20, the method 2000 can start at block 2071, where the method 2000 can receive an information advertisement signal by a propagator node over its neighbor interface module from a distributor node, wherein the information advertisement signal identifies information available from the distributor node. The information advertisement signal can include a distributor tag, which identifies the distributor node as the source of the information. It is important to recognize that the neighbor interface module of the propagator node is directly or indirectly associated with the distributor node, which is the source of the information associated with the information advertisement signal.

At block 2072, the propagator node can store the information advertisement signal, the distributor tag of the information advertisement signal, an identifier of the neighbor interface module of the propagator node over which the information advertisement signal was received, or any combination thereof in its distributor routing table. The neighbor interface module of the propagator node can be directly or indirectly associated with the distributor node. The propagator node can discard, remove, or overwrite the information advertisement signal after, for instance, the expiration of a timer. Further, the distributor node can reset or initialize the timer associated with the information advertisement signal stored in the distributor routing table of the propagator node by, for instance, re-sending the information advertisement signal to the propagator node. In addition, the distributor node can discard, remove, or overwrite the information advertisement signal from the distributor routing table of the propagator node by sending another information advertisement signal that indicates such removal.

At block 2073, the propagator node can determine whether all or a portion of a persistent selection tag in its selection routing table matches all or a portion of the information advertisement signal. If there is a match, then at block 2074 the propagator node can generate a selection request signal using the matching persistent selection tag and can forward such signal towards the distributor node. At block 2075, the propagator node can propagate the information advertisement signal to another node such as another propagator node, another selector node, or both. The propagator node can determine whether all or a portion of the information advertisement signal matches all or a portion of another information advertisement signal stored in its distributor routing table. If there is a match, then the propagator node does not have to forward the information advertisement signal to the propagator node associated with the matching entry. However, if there is not a match, then the propagator node can forward the information advertisement signal to the propagator node, which does not have a matching entry.

Figure 21:
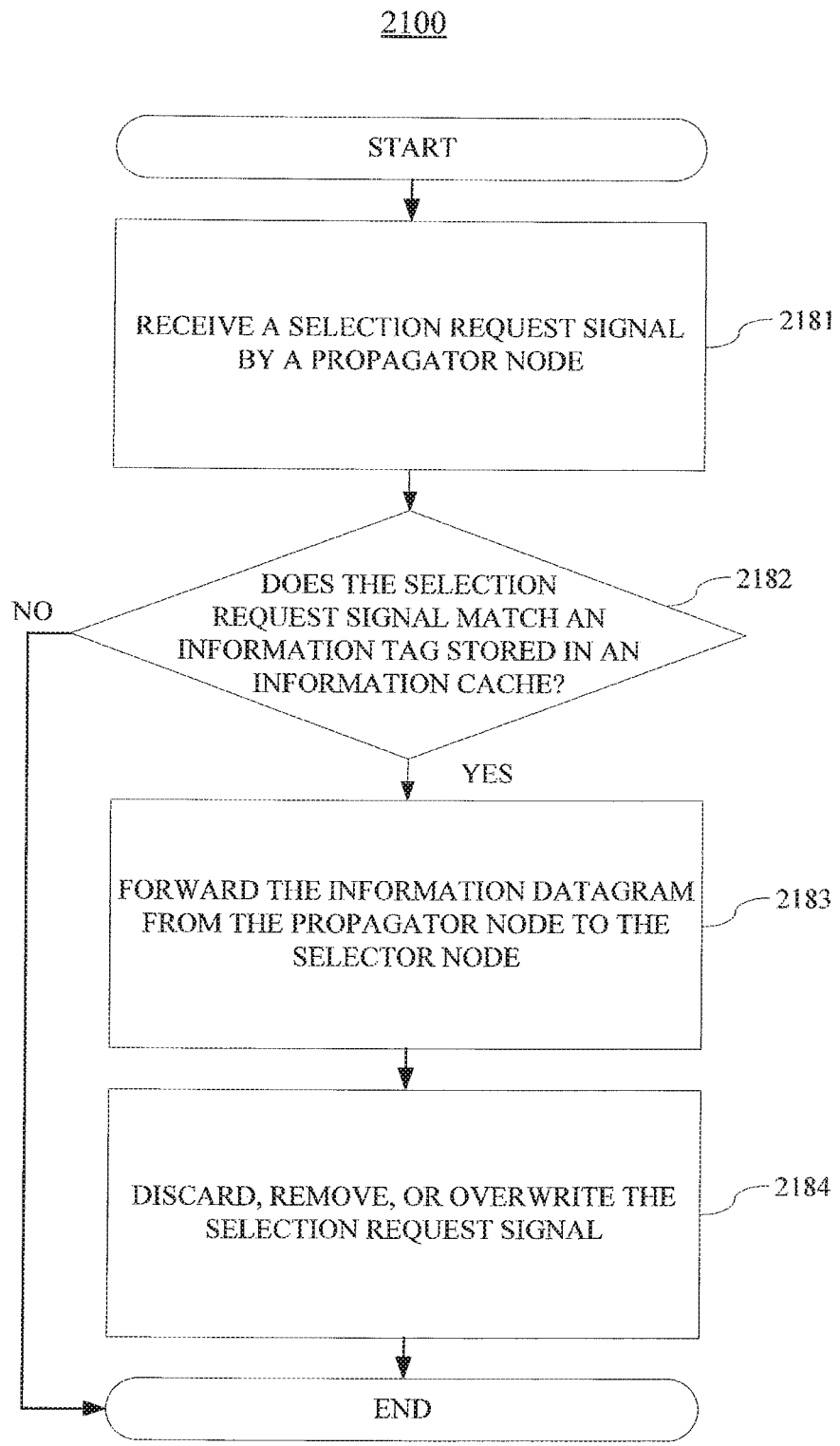
FIG. 21 shows a flow chart of one embodiment of a method of information selection in a wireless communication system in accordance with various aspects set forth herein.

FIG. 21 shows a flow chart of one embodiment of a method 2100 of information selection in a wireless communication system in accordance with various aspects set forth herein. In FIG. 21, the method 2100 can start at block 2181, where the method 2100 can receive a selection request signal by a propagator node directly or indirectly from a selector node. The propagator node can receive the selection request signal over a neighbor interface module of the propagator node, wherein the neighbor interface module is directly or indirectly associated with the selector node. At block 2182, the method 2100 can determine whether all or a portion of the selection request signal matches all or a portion of an information tag associated with an information datagram stored in an information cache of the propagator node. If all or a portion of the selection request signal matches all or a portion of an information tag, then at block 2183 the method 2100 can forward the stored information datagram from the propagator node directly or indirectly to the selector node. The propagator node can forward the information datagram over the neighbor interface module of the propagator node associated with the selector node. Further, at block 2184 the method 2100 can discard, remove, or overwrite the selection request signal.

Figure 22:
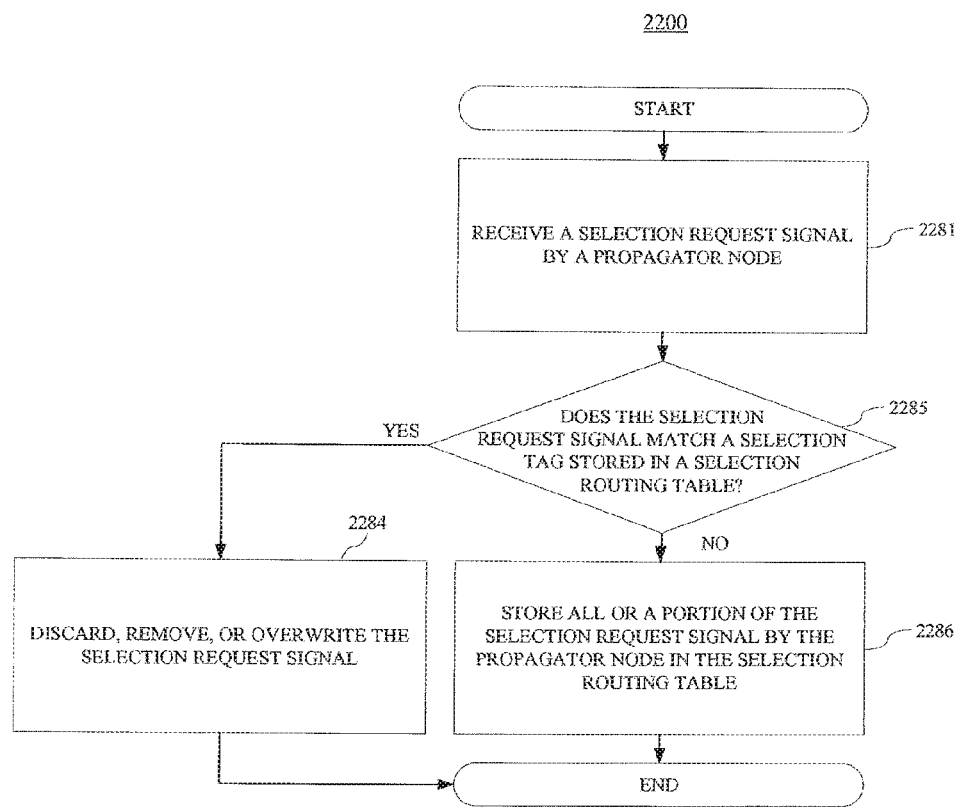
FIG. 22 shows a flow chart of another embodiment of a method of information selection in a wireless communication system in accordance with various aspects set forth herein.

FIG. 22 shows a flow chart of another embodiment of a method 2200 of information selection in a wireless communication system in accordance with various aspects set forth herein. In FIG. 22, the method 2200 can start at block 2281, where the method 2200 can receive a selection request signal by a propagator node directly or indirectly from a selector node. The propagator node can receive the selection request signal over a neighbor interface module of the propagator node, wherein the neighbor interface module is directly or indirectly associated with the selector node. At block 2285, the method 2200 can determine whether all or a portion of the selection request signal matches all or a portion of a selection tag stored in a selection routing table of the propagator node. If all or a portion of the selection request signal does not match any selection tag stored in the selection routing table, then at block 2286 the method 2200 can store all or a portion of the selection request signal in the selection routing table of the propagator node. Further, the propagator node can store an identifier of the associated neighbor interface module in the selection routing table. Further, at block 2284, the method 2200 can discard, remove, or overwrite the selection request signal if all or a portion of the selection request signal matches all or a portion of a selection tag stored in the selection routing table.

Figure 23:
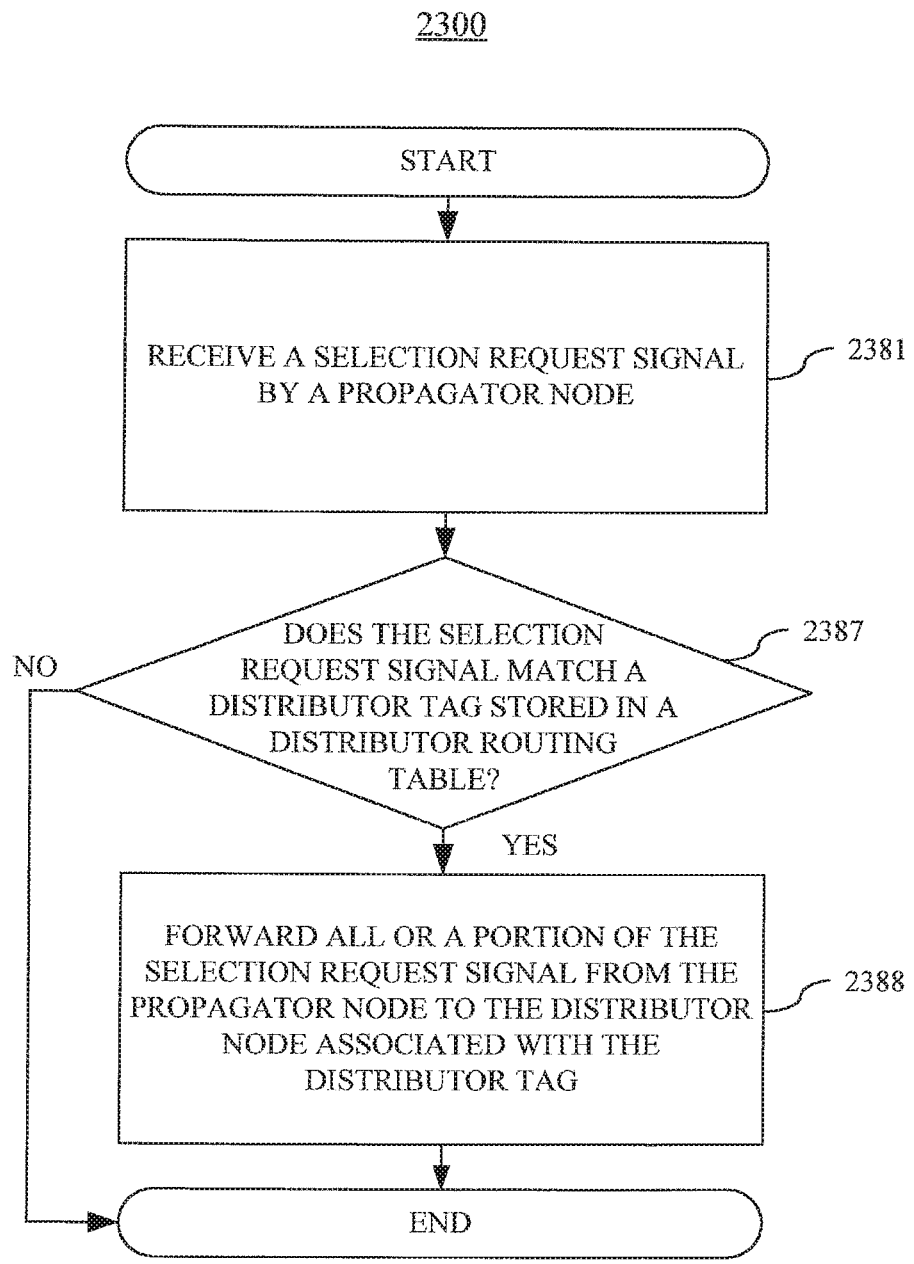
FIG. 23 shows a flow chart of another embodiment of a method of information selection processing in a wireless communication system in accordance with various aspects set forth herein.

FIG. 23 shows a flow chart of another embodiment of a method 2300 of information selection in a wireless communication system in accordance with various aspects set forth herein. In FIG. 23, the method 2300 can start at block 2381, where the method 2300 can receive a selection request signal by a propagator node directly or indirectly from a selector node. The propagator node can receive the selection request signal over a neighbor interface module of the propagator node, wherein the neighbor interface module is directly or indirectly associated with the selector node. At block 2387, the method 2300 can determine whether all or a portion of the selection request signal matches all or a portion of a distributor tag stored in a distributor routing table of the propagator node. If all or a portion of the selection request signal matches all or a portion of a distributor tag, then at block 2388 the method 2300 can forward all or a portion of the selection request signal from the propagator node directly or indirectly to the distributor node associated with the distributor tag. Further, the propagator node can forward all or a portion of the selection request signal over the neighbor interface module of the propagator node associated with the distributor node.

Figure 24:
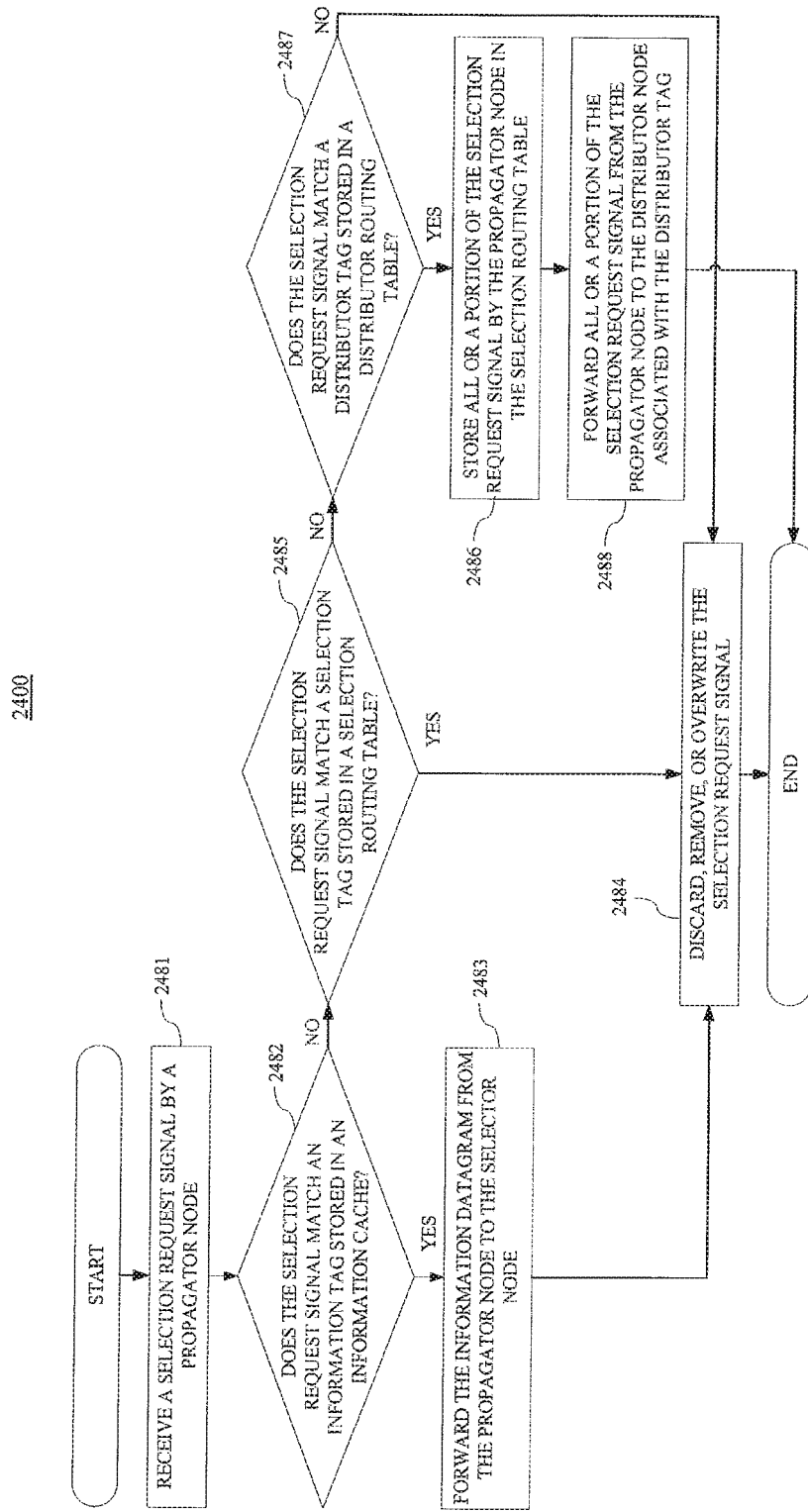
FIG. 24 shows a flow chart of another embodiment of a method of information selection in a wireless communication system in accordance with various aspects set forth herein.

FIG. 24 shows a flow chart of another embodiment of a method 2400 of information selection in a wireless communication system in accordance with various aspects set forth herein. In FIG. 24, the method 2400 can start at block 2481, where the method 2400 can receive a selection request signal by a propagator node directly or indirectly from a selector node. At block 2482, the method 2400 can determine whether all or a portion of the selection request signal matches all or a portion of an information tag associated with an information datagram stored in an information cache of the propagator node. If all or a portion of the selection request signal matches all or a portion of an information tag, then at block 2483 the method 2400 can forward the stored information datagram from the propagator node directly or indirectly to the selector node. Further, at block 2484 the method 2400 can discard, remove, or overwrite the selection request signal.

If all or a portion of the selection request signal does not match all or a portion of a cached information tag, then at block 2485 the method 2400 can determine whether all or a portion of the selection request signal matches all or a portion of a selection tag stored in a selection routing table of the propagator node. If all or a portion of the selection request signal matches all or a portion of a selection tag, then at block 2484 the method 2400 can discard, remove, or overwrite the selection request signal.

If all or a portion of the selection request signal does not match all or a portion of a selection tag stored in the selection routing table, then at block 2487 the method 2400 can determine whether the selection request signal matches a distributor tag stored in a distributor routing table. If all or a portion of the selection request signal matches all or a portion of the distributor tag, then at block 2486 the method 2400 can store all or a portion of the selection request signal in the selection routing table of the propagator node. Further, at block 2488, the method 2400 can forward all or a portion of the selection request signal from the propagator node to the distributor node associated with the distributor tag.

Figure 25:
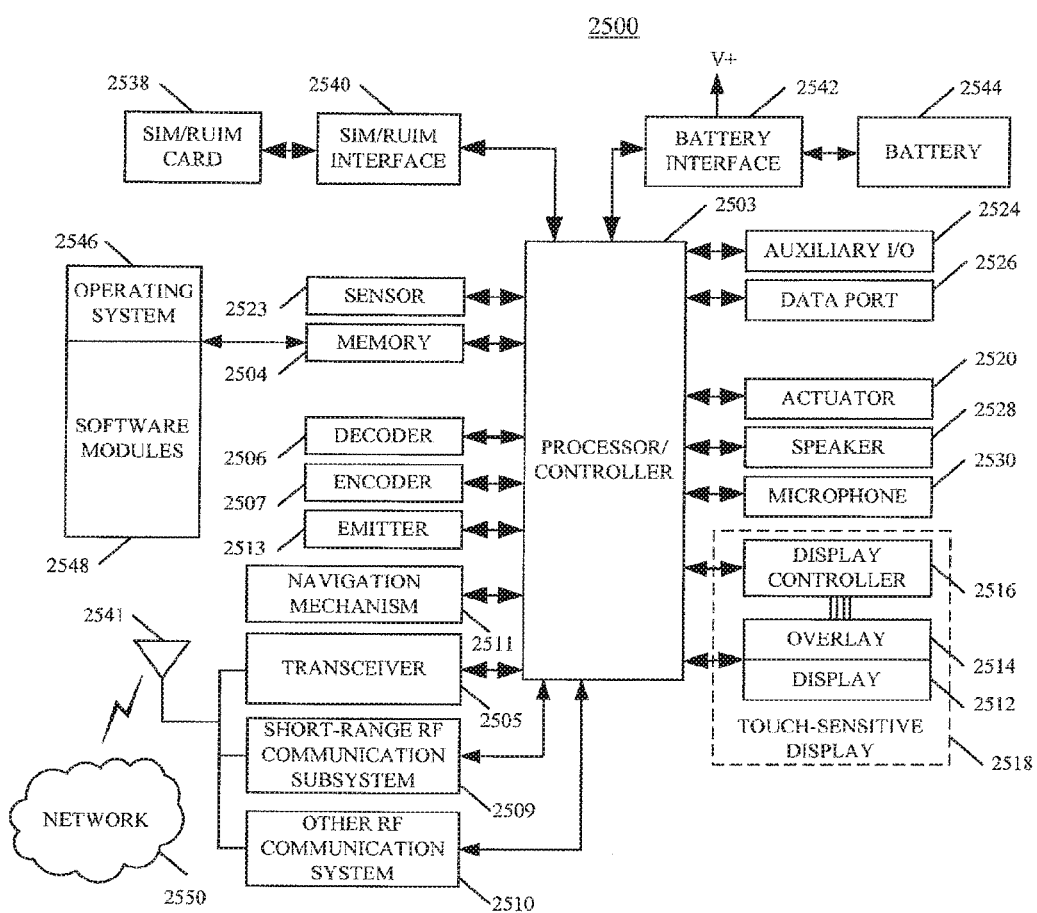
FIG. 25 is a block diagram illustrating one embodiment of a wireless device in accordance with various aspects set forth herein.

FIG. 25 is a block diagram illustrating one embodiment of a wireless device 2500 in accordance with various aspects set forth herein. In FIG. 25, the wireless device 2500 can include a processor 2503 electrically connected to, for instance, a transceiver 2505, a decoder 2506, an encoder 2507, a memory 2504, a navigation mechanism 2511, a display 2512, an emitter 2513, a display overlay 2514, a display controller 2516, a touch-sensitive display 2518, an actuator 2520, a sensor 2523, an auxiliary input/output subsystem 2524, a data port 2526, a speaker 2528, a microphone 2530, a short-range communication subsystem 2509, another Radio Frequency ("RF") communication subsystem 2510, a subscriber identity module or a removable user identity module ("SIM/RUIM") interface 2540, a battery interface 2542, other component, or any combination thereof. The navigation mechanism 2511 can be, for instance, a trackball, a directional pad, a trackpad, a touch-sensitive display, a scroll wheel, or other similar navigation mechanism.

In FIG. 25, the processor 2503 can control and perform various functions associated with the control, operation, or both of the wireless device 2500. The wireless device 2500 can be powered by, for instance, the battery 2544, an alternating current ("AC") source, another power source, or any combination thereof. In FIG. 25, the wireless device 2500 can use, for instance, the battery interface 2542 to receive power from the battery 2544. The battery 2544 can be, for instance, a rechargeable battery, a replaceable battery, or both. The processor 2503 can control the battery 2544 via the battery interface 2542.

In this embodiment, the wireless device 2500 can perform communication functions, including data communication, voice communication, video communication, other communication, or any combination thereof using, for instance, the processor 2503 electrically connected to the auxiliary input/output subsystem 2524, the data port 2526, the transceiver 2505, the short-range communication subsystem 2509, the other RF communication subsystem 2510, or any combination thereof. The wireless device 2500 can communicate between, for instance, the network 2550. The network 2550 may be comprised of, for instance, a plurality of wireless devices and a plurality of infrastructure equipment.

In FIG. 25, the display controller 2516 can be electrically connected to the display overlay 2514, display 2512, or both. For example, the display overlay 2514 and the display 2512 can be electrically connected to the display controller 2516 to form, for instance, the touch-sensitive display 2518. The touch-sensitive display 2518 can also be referred to as a touch-screen display, touch-screen monitor, touch-screen terminal, or other similar term. The processor 2503 can directly control display overlay 2514, indirectly control display overlay 2514 using display controller 2516, or both. The processor 2503 can display, for instance, an electronic document stored in the memory 2504 on the display 2512, the touch-sensitive display 2518, or both of the wireless device 2500.

In the current embodiment, the wireless device 2500 can include the sensor 2523, which can be electrically connected to the processor 2503. The sensor 2523 can be, for instance, an accelerometer sensor, a tilt sensor, a force sensor, an optical sensor, or any combination thereof. Further, the sensor 2523 may comprise multiple sensors which are the same or different. For example, the sensor 2523 can include an accelerometer sensor and an optical sensor. An accelerometer sensor may be used, for instance, to detect the direction of gravitational forces, gravity-induced reaction forces, or both. The accelerometer sensor may include, for instance, a cantilever beam with a proof mass and suitable deflection sensing circuitry. The optical sensor can be the same or similar to the sensor used in, for instance, a desktop mouse. Alternatively, the optical sensor can be, for instance, a camera lens. In FIG. 25, the wireless device 2500 may include the subscriber identity module or a removable user identity module ("SIM/RUIM") card 2538. The SIM/RUIM card 2538 can contain, for instance, user identification information, which can be used to allow access to the network 2550 for the user of the wireless device 2500. The SIM/RUIM card 2538 can be electrically connected to the SIM/RUIM interface 2540, wherein the processor 2503 can control the SIM/RUIM card 2538 via the SIM/RUIM interface 2540. The user identification information may also be stored in the memory 2504 and accessed by the processor 2503.

In this embodiment, the wireless device 2500 can include an operating system 2546 and software modules 2548, which may be stored in a computer-readable medium such as the memory 2504. The memory 2504 can be, for instance, RAM, static RAM ("SRAM"), dynamic RAM ("DRAM"), read only memory ("ROM"), volatile memory, non-volatile memory, cache memory, hard drive memory, virtual memory, other memory, or any combination thereof. The processor 2503 can execute program instructions stored in the memory 2504 associated with the operating system 2546, the software modules 2548, other program instructions, or combination of program instructions. The processor 2503 may load the operating system 2546, the software modules 2548, data, an electronic document, or any combination thereof into the memory 2504 via the transceiver 2505, the auxiliary I/O subsystem 2524, the data port 2526, the short-range RF communication subsystem 2509, the other RF communication subsystem 2510, or any combination thereof.

In another embodiment, a computer-readable medium such as the memory 2504 may store program instructions for execution by the processor 2503 of the wireless device 2500 and may cause the wireless device 2500 to implement any of the methods described herein.

Figure 26:
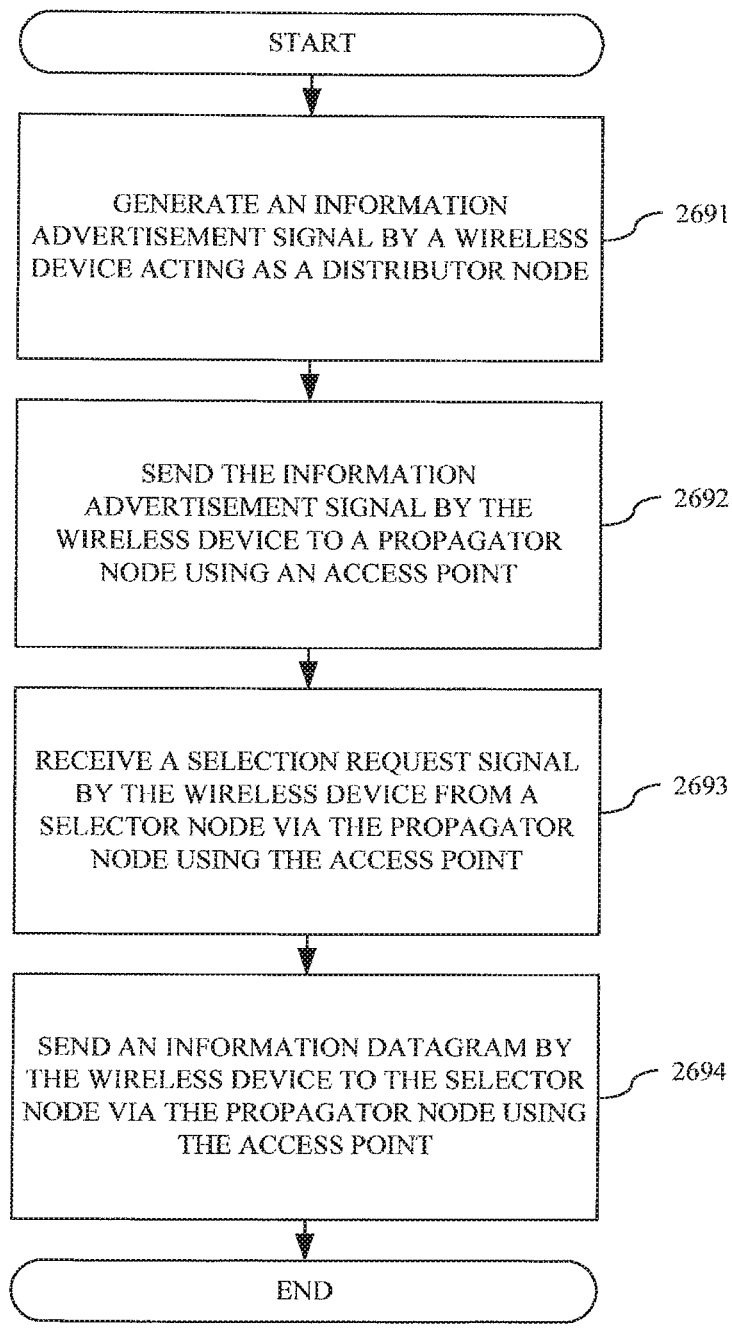
FIG. 26 shows a flow chart of one embodiment of a method of information dissemination in a wireless communication system in accordance with various aspects set forth herein.

FIG. 26 shows a flow chart of one embodiment of a method 2600 of information dissemination in a wireless communication system in accordance with various aspects set forth herein. In FIG. 26, the method 2600 can start at block 2691, where the method 2600 can generate an information advertisement signal by a wireless device acting as a distributor node, wherein the information advertisement signal identifies information available from the wireless device. The information advertisement signal can include a distributor tag. At block 2692, the method 2600 can send the information advertisement signal by the wireless device to a propagator node using an access point, wherein the wireless device is connected to the access point, and the access point is connected to the propagator node. Further, the wireless device can send the information advertisement signal over a neighbor interface module of the wireless device, wherein the neighbor interface module is associated with the propagator node.

In the current embodiment, at block 2693, the method 2600 can receive a selection request signal by the wireless device from a selector node via the propagator node using the access point, wherein the selection request signal identifies information requested by the selector node via the propagator node. Further, the wireless device can receive the selection request signal over the neighbor interface module of the wireless device associated with the propagator node. The selection request signal can include a selection tag.

In FIG. 26, at block 2694, the method 2600 can send an information datagram by the wireless device to the selector node via the propagator node using the access point, wherein the information datagram contains all or a portion of the requested information. Further, the wireless device can send the information datagram over the neighbor interface module of said wireless device associated with said propagator node. Prior to sending the information datagram, the wireless device can segment the requested information into one or more portions of the information. Further, the wireless device can construct one or more of the information datagrams, wherein each information datagram includes an information tag, the portion of said information, or both. The information tag can include an information object identifier, wherein the information object identifier identifies the portion of the information carried by the information datagram. In this embodiment, the selection request signal, the information advertisement signal, the information datagram, or any combination thereof can be cryptographically signed.

Figure 27:
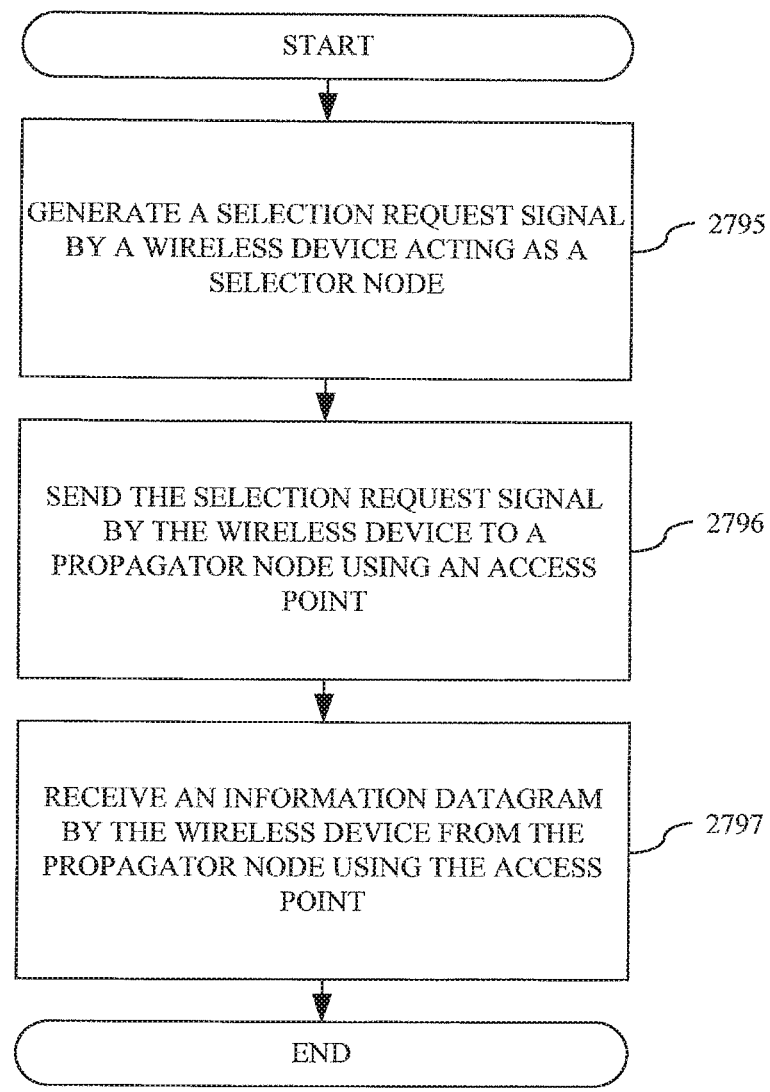
FIG. 27 shows a flow chart of one embodiment of a method of information dissemination in a wireless communication system in accordance with various aspects set forth herein.

FIG. 27 shows a flow chart of one embodiment of a method 2700 of information dissemination in a wireless communication system in accordance with various aspects set forth herein. In FIG. 27, the method 2700 can start at block 2795, where the method 2700 can generate a selection request signal by a wireless device acting as a selector node, wherein the selection request signal identifies information requested by the wireless device. The selection request signal can include a selection tag. At block 2796, the method 2700 can send the selection request signal by the wireless device to a propagator node using an access point, wherein the wireless device is connected to the access point, and the access point is connected to the propagator node. Further, the wireless device can send the selection request signal over a neighbor interface module of the wireless device associated with the propagator node.

In the current embodiment, at block 2797, the method 2700 can receive an information datagram by the wireless device from the propagator node using the access point, wherein the information datagram contains all or a portion of said information. Further, the wireless device can receive the information datagram over the neighbor interface module of said wireless device associated with said propagator node. The information datagram can include an information tag, wherein said information tag includes an information object identifier. The information object identifier can identify the portion of the information carried by the information datagram. In this embodiment, the selection request signal, the information advertisement signal, the information datagram, or any combination thereof can be cryptographically signed.

In another embodiment, the selection request signal, information datagram, or both can include a SIP signaling message.

In another embodiment, the selection request signal, information datagram, or both can include an HTTP signaling message.

Having shown and described exemplary embodiments, further adaptations of the methods, devices, and systems described herein may be accomplished by appropriate modifications by one of ordinary skill in the art without departing from the scope of the present disclosure. Several of such potential modifications have been mentioned, and others may be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation, and function shown and described in the specification and drawings.

As set forth above, the described disclosure includes the aspects set forth below.

What is claimed is:

1. A method of information distribution in a wireless communication system, comprising:
    receiving a first information advertisement signal over a first neighbor interface of a propagator node, wherein the first information advertisement signal identifies information available from a first distributor node;
    storing, by the propagator node, the first information advertisement signal and an indicator of the first neighbor interface in a distributor routing table;
    starting, by the propagator node, a timer after storing the first information advertisement signal in the distributor routing table, wherein the propagator node is configured to discard the first information advertisement signal from the distributor routing table after the timer expires;
    restarting, by the propagator node, the timer if the distributor node retransmits the first information advertisement signal to the propagator node before the timer expires;
    determining, by the propagator node, whether all or a portion of a first selection request signal received over a second neighbor interface of the propagator node matches all or a portion of the first information advertisement signal stored in the distributor routing table when receiving the first selection request signal before the timer expires, wherein the first selection request signal identifies an information object sought by a first selector node;
    responsive to determining that all or a portion of the first information advertisement signal matches all or a portion of the first selection request signal, forwarding all or a portion of the first selection request signal over the first neighbor interface of the propagator node, wherein the first neighbor interface and the second neighbor interface are configured to provide connectivity to a first neighbor node and a second neighbor node, respectively, over different active radio links;
    responsive to the propagator node receiving a second selection request signal from a second selector node over one of the first neighbor interface or the second neighbor interface, determining if all or a portion of the second selection request signal matches all or a portion of an information tag stored in an information cache of the propagator node;
    responsive to the propagator node determining that all or a portion of the second selection request signal matches all or a portion of the information tag, forwarding an information datagram associated with the information tag to the second selector node; and
    responsive to forwarding the information datagram to the second selector node, discarding the second selection request signal unless the second selection request signal is marked as persistent, wherein when the second selection request signal is marked as persistent, the propagator node stores the second selection request signal with a temporary storage indicator indicating when to discard the second selection request signal.

2. The method of claim 1, further comprising:
    responsive to determining that all or a portion of the second selection request signal does not match all or a portion of the information tag, determining whether all or a portion of the second selection request signal matches all or a portion of at least one selection tag stored in a selection routing table of the propagator node.

3. The method of claim 2, further comprising:
    responsive to determining that all or a portion of the second selection request signal does not match all or a portion of any selection tags stored in the selection routing table, determining whether all or a portion of the second selection request signal matches all or a portion of an information advertisement signal stored in the distributor routing table.

4. The method of claim 3, further comprising:
    responsive to determining that all or a portion of the second selection request signal matches all or a portion of the information advertisement signal, forwarding the second selection request signal, over one of the first neighbor interface or the second neighbor interface, to a distributor node associated with the information advertisement signal.

5. The method of claim 3, further comprising:
    responsive to determining that all or a portion of the second selection request signal matches all or a portion of a plurality of information advertisement signals stored in the distributor routing table, forwarding the second selection request signal from the propagator node to a second distributor node over one of the first neighbor interface or the second neighbor interface, the second distributor node being selected from a plurality of distributor nodes from which the propagator node received the plurality of information advertisement signals, respectively, wherein, prior to forwarding the second selection request signal, the propagator node determines whether to forward the second selection request signal to the second distributor node over the first neighbor interface or the second neighbor interface based on which of the first and second neighbor interfaces, has a better forwarding metric with respect to a route through which the second selection request signal is to be forwarded from the propagator node to the second distributor node.

6. The method of claim 5, wherein the forwarding metric is based on link speed, link utilization, link throughput, number of hops, queue length, path latency, path reliability, path bandwidth, path throughput, packet loss rate, interference level, cost metric, or combination(s) thereof.

7. The method of claim 2, further comprising:

responsive to the propagator node receiving an information datagram from the first distributor node, determining if all or a portion of an information tag associated with the information datagram matches all or a portion of at least one selection tag stored in the selection routing table, the selection routing table comprising a plurality of selection tags received from a plurality of selector nodes, respectively;

responsive to determining that the information datagram matches all or a portion of a selection tag stored in the selection routing table, forwarding the information datagram from the propagator node over a neighbor interface to a selector node associated with the selection tag, the neighbor interface being one of the first neighbor interface or the second neighbor interface; and discarding, removing, or overwriting the selection tag from the selection routing table in response to forwarding the information datagram.

8. The method of claim 7, further comprising:

responsive to the propagator node determining that all or a portion of the information tag associated with the information datagram does not match all or a portion of any selection tags in the selection routing table, discarding the information datagram.

9. The method of claim 1, further comprising:

determining, by the propagator node, whether all or a portion of the first information advertisement signal matches all or a portion of a persistent selection tag associated with a selector node;

responsive to determining that all or a portion of the first information advertisement signal matches all or a portion of the persistent selection tag, automatically generating a second selection request signal on behalf of the selector node; and forwarding the second selection request signal by the propagator node to the first distributor node.

10. The method of claim 9, where the persistent selection tag remains in a selection routing table of the propagator node after an information datagram corresponding to the persistent selection tag is transmitted to the selector node, wherein the selection routing table comprises a plurality of selection request signals received from a plurality of selector nodes, respectively.

11. The method of claim 9, wherein the propagator node does not disseminate the persistent selection tag to other nodes in the wireless communication system in order to mitigate bursts of transmissions of information datagrams in the wireless communication system.

12. The method of claim 1, further comprising:

responsive to the propagator node forwarding all or a portion of the first selection request signal, discarding the first selection request signal unless the first selection request signal is marked as persistent, wherein if the first selection request signal is marked as persistent, the propagator node stores the first selection request signal for a temporary duration after forwarding all or a portion of the first selection request signal, and wherein the propagator node stores the first selection request signal for an extended duration if the first selection request signal is retransmitted to the propagator node before the temporary duration ends, wherein the extended duration is a period of time longer than the temporary duration.

13. The method of claim 1, further comprising the propagator node discarding the first information advertisement signal from the distributor routing table upon expiration of the timer.

14. The method of claim 13, further comprising the propagator node:

receiving, prior to expiration of the timer, a signal indicating that the information identified in the first information advertisement signal is no longer available from the distributor node; and discarding, prior to expiration of the timer, the first information advertisement signal from the distributor routing table responsive to receiving the signal indicating that the information identified in the first information advertisement signal is no longer available.

15. The method of claim 1, further comprising:

determining all or a portion of the first information advertisement signal matches all or a portion of a second information advertisement signal stored in the distributor routing table, wherein the propagator node receives the second information advertisement signal from a second distributor node over the second neighbor interface; and recording an information identifier indicating that the first information advertisement signal was received by the propagator node from the first distributor node over the first neighbor interface, wherein the information identifier is stored in the distributor routing table with another information identifier stored in the distributor routing table, the other information identifier indicating that the second information advertisement signal was received by the propagator node from the second distributor node over the second neighbor interface.

16. The method of claim 1, wherein determining whether all or a portion of the second selection request signal matches all or a portion of the information tag stored in an information cache of the propagator node comprises performing, by the propagator node, a longest prefix search of the distributor routing table responsive to the propagator node determining that the second selection request signal contains a qualified object identifier that refers to a source of information sought by the second selector node.

17. The method of claim 1, wherein the propagator node is configured to transition between at least a first access point and a second point, wherein the method further comprises:

sending, from the propagator node, a copy of the first information advertisement signal to the first and second access points;

retrieving, by the propagator node, the information available from the first distributor node via the second access point when the propagator node transitions from the first access point to the second access point; and retrieving, by the propagator node, the information available from the first distributor node via the first access point when the propagator node transitions from the second access point to the first access point.

18. A device acting as a propagator node for information distribution in a wireless communication system, comprising:

a processor coupled to a memory containing processor-executable instructions executable by the processor such that when executed, cause the processor to implement a method comprising:

receiving an information advertisement signal over a first neighbor interface of the propagator node, wherein the information advertisement signal identifies information available from a first distributor node;

storing the information advertisement signal and an indicator of the first neighbor interface in a distributor routing table;

starting a timer after storing the first information advertisement signal in the distributor routing table, wherein the propagator node is configured to discard the first information advertisement signal from the distributor routing table after the timer expires;

restarting the timer if the distributor node retransmits the first information advertisement signal to the propagator node before the timer expires;

responsive to receiving, before the timer expires, a selection request signal over a second neighbor interface of the propagator node identifying an information object sought by a selector node, determining, by the propagator node, whether all or a portion of the selection request signal matches all or a portion of the information advertisement signal stored in the distributor routing table;

responsive to determining that all or a portion of the information advertisement signal matches all or a portion of the selection request signal, forwarding all or a portion of the selection request signal over the first neighbor interface of the propagator node, wherein the first neighbor interface and the second neighbor interface are configured to provide connectivity to a first neighbor node and a second neighbor node, respectively, over different active radio links;

responsive to the propagator node receiving a second selection request signal from a second selector node over one of the first neighbor interface or the second neighbor interface, determining if all or a portion of the second selection request signal matches all or a portion of an information tag stored in an information cache of the propagator node;

responsive to the propagator node determining that all or a portion of the second selection request signal matches all or a portion of the information tag, forwarding an information datagram associated with the information tag to the second selector node; and responsive to forwarding the information datagram to the second selector node, discarding the second selection request signal unless the second selection request signal is marked as persistent, wherein when the second selection request signal is marked as persistent, the propagator node stores the second selection request signal with a temporary storage indicator indicating when to discard the second selection request signal.

19. A computer program product for information distribution in a wireless communication system, comprising:

a non-transitory computer-readable medium comprising instructions executable by a processor of a propagator node such that when executed, cause the propagator node to implement a method comprising:

receiving an information advertisement signal over a first neighbor interface of a propagator node, wherein the information advertisement signal identifies information available from a first distributor node;

storing the information advertisement signal and an indicator of the first neighbor interface in a distributor routing table;

starting, by the propagator node, a timer after storing the first information advertisement signal in the distributor routing table, wherein the propagator node is configured to discard the first information advertisement signal from the distributor routing table after the timer expires;

restarting, by the propagator node, the timer if the distributor node retransmits the first information advertisement signal to the propagator node before the timer expires;

responsive to receiving, before the timer expires, a selection request signal over a second neighbor interface of the propagator node identifying an information object sought by a selector node, determining, by the propagator node, whether all or a portion of the information advertisement signal matches all or a portion of the selection request signal;

responsive to determining that all or a portion of the information advertisement signal matches all or a portion of the selection request signal, forwarding all or a portion of the selection request signal over the first neighbor interface of the propagator node, wherein the first neighbor interface and the second neighbor interface are configured to provide connectivity to a first neighbor node and a second neighbor node, respectively, over different active radio links;

responsive to the propagator node receiving a second selection request signal from a second selector node over one of the first neighbor interface or the second neighbor interface, determining if all or a portion of the second selection request signal matches all or a portion of an information tag stored in an information cache of the propagator node;

responsive to the propagator node determining that all or a portion of the second selection request signal matches all or a portion of the information tag, forwarding an information datagram associated with the information tag to the second selector node; and responsive to forwarding the information datagram to the second selector node, discarding the second selection request signal unless the second selection request signal is marked as persistent, wherein when the second selection request signal is marked as persistent, the propagator node stores the second selection request signal with a temporary storage indicator indicating when to discard the second selection request signal.

* * * * *